US012360689B2

United States Patent
Kim et al.

(10) Patent No.: US 12,360,689 B2
(45) Date of Patent: Jul. 15, 2025

(54) EFFICIENT CACHING AND QUEUEING FOR PER-ALLOCATION NON-REDUNDANT METADATA

(71) Applicant: Intel Corporation, Santa Clara, CA (US)

(72) Inventors: Yonghae Kim, Atlanta, GA (US); David M. Durham, Beaverton, OR (US); Michael LeMay, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 72 days.

(21) Appl. No.: 18/129,822

(22) Filed: Mar. 31, 2023

(65) Prior Publication Data

US 2024/0329861 A1 Oct. 3, 2024

(51) Int. Cl.
*G06F 3/06* (2006.01)
(52) U.S. Cl.
CPC .......... *G06F 3/0631* (2013.01); *G06F 3/0604* (2013.01); *G06F 3/0656* (2013.01); *G06F 3/0673* (2013.01)
(58) Field of Classification Search
None
See application file for complete search history.

(56) References Cited

U.S. PATENT DOCUMENTS 9,727,486 B1 * 8/2017 Yochai .................. G06F 12/121
2023/0393769 A1 12/2023 Durham et al.

FOREIGN PATENT DOCUMENTS

CN 112149114 A * 12/2020 ......... G06F 12/0895

OTHER PUBLICATIONS

Armv8.5—A Memory Tagging Extension; (Aug. 2, 2019); Arm, White Paper; pp. 1-9. Retrieved from https://developer.arm.com/documentation/102925/0100.
Bannister, Steve; Memory Tagging Extension: Enhancing memory safety through architecture; (Aug. 5, 2019); Arm Community Blogs, Architectures and Processor blog; pp. 1-6. Retrieved from https://community.arm.com/arm-community-blogs/b/architectures-and-processors-blog/posts/enhancing-memory-safety.
Bernhard, Lukas et al.; xTag: Mitigating User-After-Free Vulnerabilities via Software-Based Pointer Tagging on Intel x86-64; (Mar. 8, 2022); Cornell University; pp. 1-18. Retrieved from https://arxiv.org/abs/2203.04117.

(Continued)

*Primary Examiner* — Brian R Peugh
(74) *Attorney, Agent, or Firm* — Alliance IP, LLC

(57) ABSTRACT

An apparatus includes circuitry to receive a memory access request based on a memory address in a memory allocation of a program. The memory allocation is assigned to a slot of memory apportioned into a plurality of slots. The circuitry is to calculate an index based, at least in part, on whether a size of the slot exceeds a slot threshold size, and determine whether a buffer communicatively coupled to the circuitry includes a buffer entry corresponding to the index and containing a set of metadata associated with the memory allocation. Based on the slot size, the circuitry is to calculate the index by either determining a metadata virtual address or by determining a virtual address of a midpoint of the slot. The indexed data may include bounds and tag information for the circuitry to determine if a memory access is within the bounds and matches the tag value.

21 Claims, 26 Drawing Sheets

(56) References Cited

OTHER PUBLICATIONS

Bialek, Joe et al.; Security Analysis of Memory Tagging; (Mar. 2020); githubusercontent.com; pp. 1-16. Retrieved from https://raw.githubusercontent.com/microsoft/MSRC-Security-Research/master/papers/2020/Security%20analysis%20of%20memory%20taggin.

Chen, Tony et al.; Pointer Tagging for Memory Safety; (Jul. 19, 2019); microsoft.com; pp. 1-23. Retrieved from https://www.microsoft.com/en-us/research/uploads/prod/2019/07/Pointer-Tagging-for-Memory-Safety.pdf.

Gretton-Dann, Matthew; Arm A-Profile Architecture Developments 2018: Armv8.5-A; (Sep. 17, 2018); Arm Community Blogs, Architectures and Processor blog; pp. 1-7. Retrieved from https://community.arm.com/arm-community-blogs/p/architectures-and-processors-blog/posts/arm-a-profile-architecture-2018-developm.

Mitsunami, Koki; Delivering enhanced security through Memory Tagging Extension; (Jun. 24, 2021); Arm Community Blogs, Architectures and Processor blog; pp. 1-11. Retrieved from https://community.arm.com/arm-community-blogs/b/architectures-and-processors-blog/posts/enhanced-security-through-mte.

Serebryany, Kostya et al.; Memory Tagging and how it improves C/C++ memory safety; (Feb. 26, 2018); arXiv.org; pp. 1-14. Retrieved from https://arxiv.org/pdf/1802.09517.

* cited by examiner

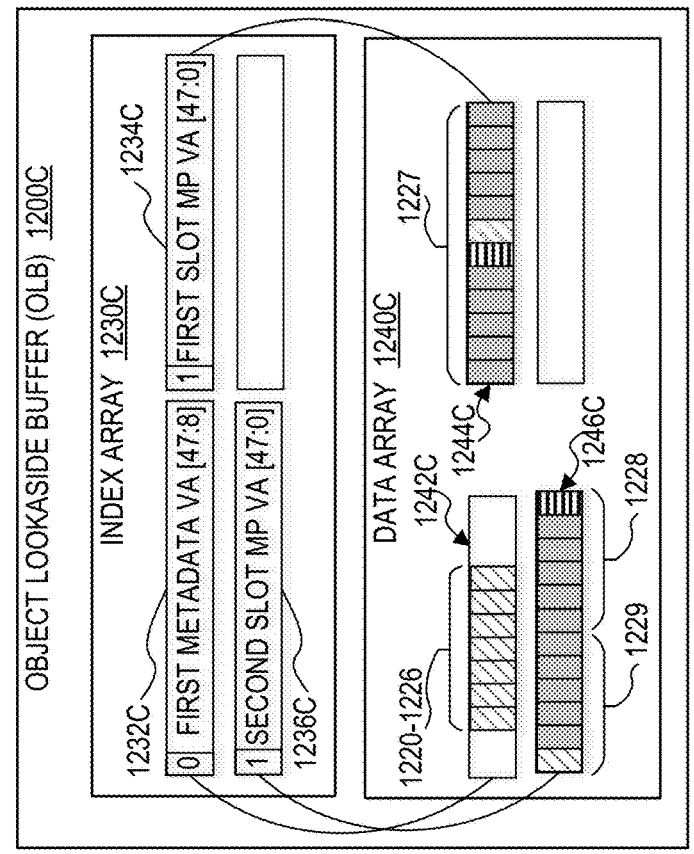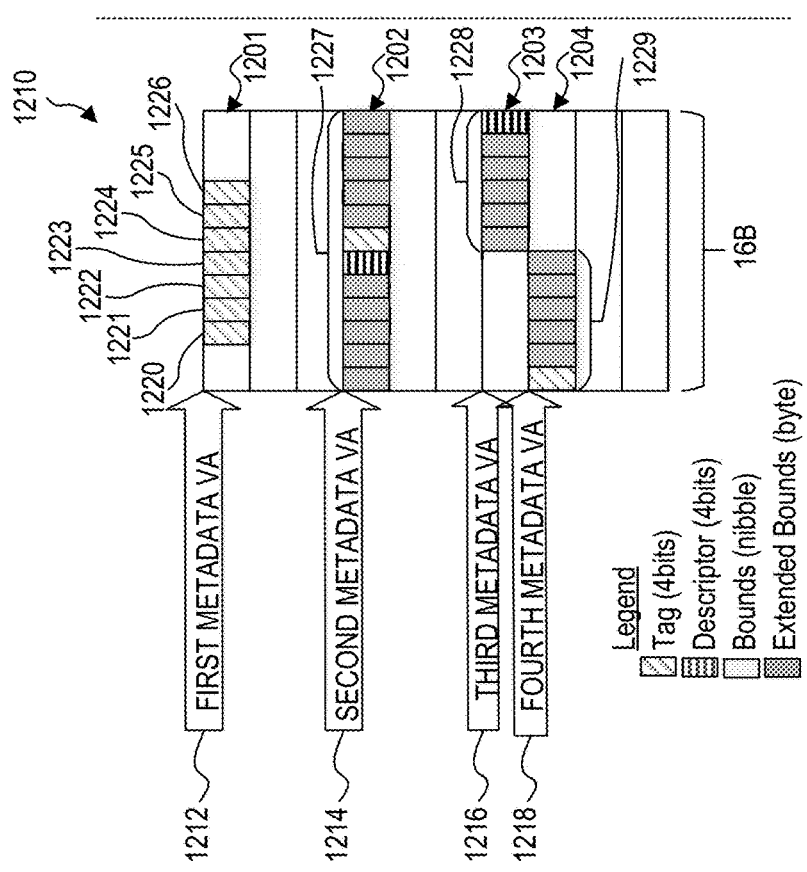
FIG. 12C

EFFICIENT CACHING AND QUEUEING FOR PER-ALLOCATION NON-REDUNDANT METADATA

TECHNICAL FIELD

The present disclosure relates in general to the field of computer security, and more specifically, to efficient caching and queueing for per-allocation non-redundant metadata.

BACKGROUND

Memory tags are values that are associated with every 16-byte region of application memory. At least some memory tagging schemes require setting a memory tag for every 16-byte (or other fixed size) granule of allocated data. In a system that implements such a scheme, every memory allocation or deallocation operation for a 16 MB buffer results in one million tag set instructions. Thus, many tagging schemes introduce tremendous memory overhead costs in computing systems.

BRIEF DESCRIPTION OF THE DRAWINGS

FIG. 12C is a block diagram illustrating yet another mode of indexing an object lookaside buffer implemented in a memory safety system according to examples.

DETAILED DESCRIPTION

Figure 1:
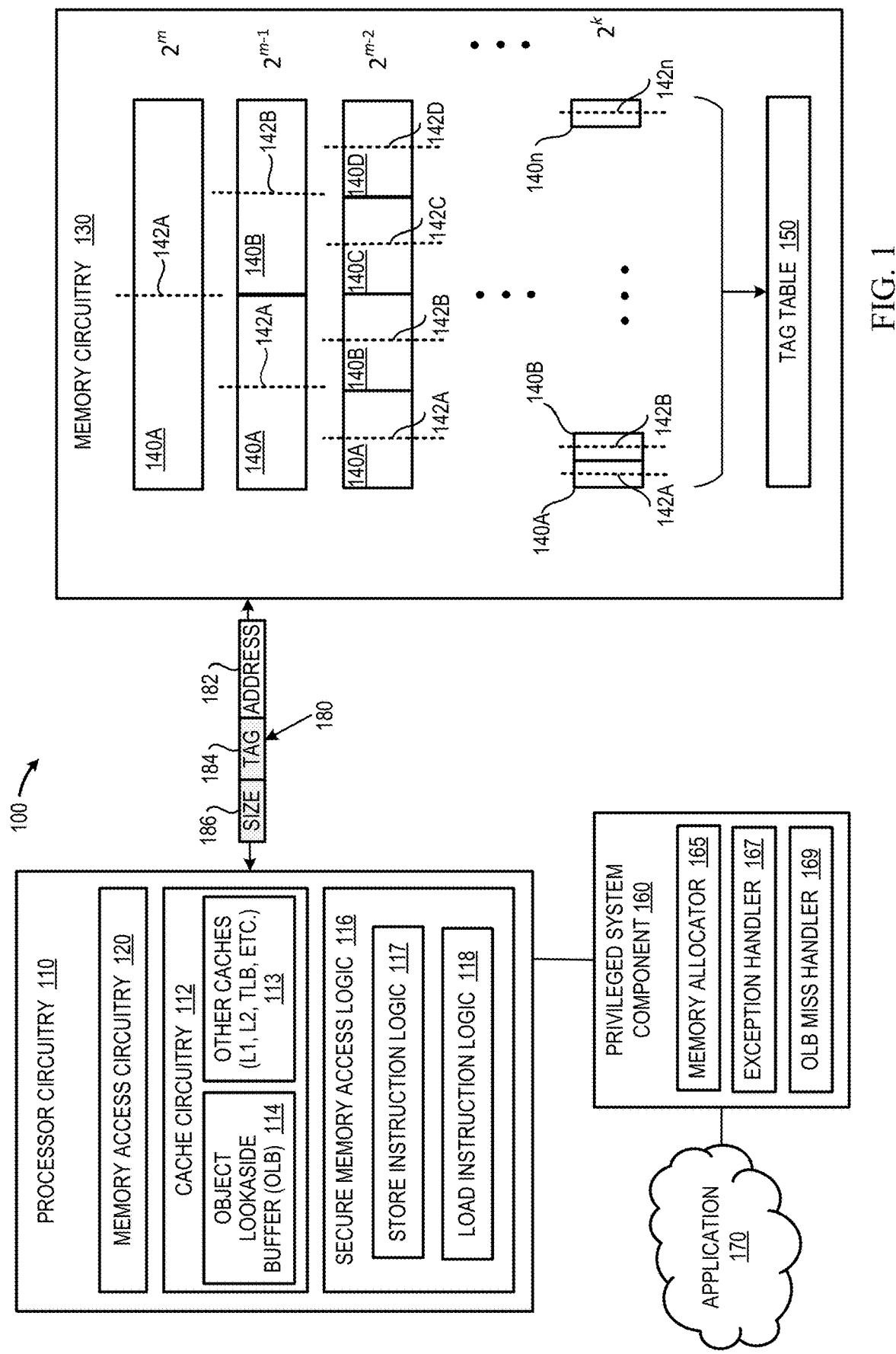
FIG. 1 is a schematic diagram of an illustrative memory safety system for performing memory tag allocation checks according to examples.

The present disclosure provides various possible embodiments, or examples, of systems, methods, apparatuses, architectures, and machine readable media for efficient caching and queueing for per-allocation non-redundant metadata. In particular, examples disclosed herein provide for optimizing metadata caching so that the entire bounds for a large allocation can be stored in a single cache line while still allowing metadata for at least some small allocations to be contained in another single cache line. Examples disclosed herein also avoid fencing overheads while maintaining metadata cache coherency across metadata updates.

For purposes of illustrating the several embodiments that enable efficient caching and queueing for per-allocation non-redundant metadata on a computing system, it is important to first understand possible activities that may occur in the computing system using a per-allocation non-redundant metadata memory tagging approach (also referred to herein as "one-tag memory tagging"). Accordingly, the following foundational information may be viewed as a basis from which the present disclosure may be properly explained.

Memory safety is an area of high importance as the majority of computer vulnerabilities are due to memory safety issues. Memory tagging is a technique that can increase computer security by mitigating vulnerabilities and exploits. Generally, memory tagging involves assigning tags (e.g., metadata) to memory locations. A tag may be a small piece of data of any suitable size based on the particular architecture and needs. In one example, a tag may be four bits wide, although other sizes are also possible. A tag can be assigned to a memory location by associating the tag with a memory address (e.g., pointer) of that memory location. In one example, a tag can be associated with a memory address by encoding upper bits of a memory address in a pointer with the tag. At runtime, a processor (e.g., Central Processing Unit (CPU)) performs a tag check for each memory access request. A tag check compares a tag encoded in a pointer to a memory address of a memory access request (e.g., load, store, etc.) with the tag metadata stored in memory (or cached in a buffer) and corresponding to the memory address. If the tag in the pointer and the tag in memory (or cached) match, then the memory operation is valid and can proceed. Otherwise, a fault may be generated.

Although memory tagging is an important technique for improving the security of computer systems, the memory overhead resulting from memory tagging schemes can result in significant costs to be borne by entities using and/or providing computing systems that implement such schemes. For example, some memory tagging techniques support only a single metadata format of a tag value duplicated for every 16-byte granule of memory. Thus, each line in a metadata cache to hold the metadata tags from memory simply contains metadata in the same format as is used in memory and data caches. The metadata cache design can sometimes result in two or more cache lines being consumed for a single allocation, which necessitates issuing two or more requests to the cache for a single memory access. This introduces additional overhead and design complexity.

Maintaining cache coherency can also result in substantial overhead. Typically maintaining cache coherency is achieved by "fencing" metadata updates. Fencing data can be implemented using an appropriate instruction (e.g., "mfence") to effectively block subsequent instructions in a program until all memory operations preceding the memory fencing instruction have fully completed. This can introduce significant performance overhead as many of the subsequent operations may not even affect cache coherency, but are nevertheless blocked until the conditions are satisfied to resume.

As will be further described in FIG. 1 (and others), a one-tag memory tagging scheme offers the security guarantees of memory tagging but requires only one tag set per allocation regardless of size. Accordingly, a single tag lookup may be performed for a memory access operation (e.g., load/store). Thus, a substantial performance advantage and order-of-magnitude lower memory overhead (e.g., costs) can be achieved. Nevertheless, some metadata caching may still result in multiple metadata cache lines for a single allocation. In addition, using memory fencing to maintain cache coherency may still be used. While a one-tag memory tagging technique can significantly reduce the memory overhead, an efficient microarchitectural implementation of a one-tag memory tagging scheme is needed to attain the benefits of using one tag per allocation for enforcing memory safety with acceptable low overheads and superior performance.

A memory safety system utilizing efficient caching and queuing for per-allocation non-redundant metadata, as disclosed herein, can resolve many of the aforementioned issues (and more). One or more embodiments herein can optimize and improve metadata caching in a per allocation non-redundant metadata (or one-tag) memory tagging scheme so that the entire bounds for a large allocation can be stored in a single cache line while still allowing metadata for multiple small allocations to be contained in another single cache line. The efficient caching and queueing concepts described herein also avoid fencing overheads while maintaining metadata cache coherency across metadata updates.

Reference is now made to the drawings. FIG. 1 is a schematic diagram of an illustrative computing system 100 configured with a memory safety system for validating memory accesses with per-allocation non-redundant metadata tagging and using efficient caching and queueing of metadata. The computing system 100 includes processor circuitry 110, memory access circuitry 120 (e.g., memory controller (MC), integrated memory controller (IMC), memory management unit (MMU)), and memory circuitry 130, with memory apportioned into one or more power of two (i.e., $2^0$ to $2^n$) memory allocation slots 140A-140n, with respective midpoints 142A-142X defined in each the slots. In at least one embodiment, memory allocations obtained by an executing application 170 are assigned to one of the memory allocation slots 140A-140n based on one of the power of two (Po2) sized slots. The encoding of a virtual/linear address (pointer) for a memory allocation identifies a memory allocation slot to which the memory allocation is assigned and optionally, may include a unique tag value that is associated with the memory allocation.

FIG. 1 depicts the memory circuitry 130 allocated into a number of sample memory allocation slots 140A-140n. In embodiments, an instruction that causes the processor circuitry 110 to perform a memory operation causes the memory access circuitry 120 to access the memory circuitry 130 using an encoded pointer 180 that includes at least data representative of the memory address 182 of the memory operation and metadata, such as data representative of a power or exponent (e.g., size metadata 186) that indicates the size of a memory allocation slot to which a memory allocation is assigned. The metadata also includes tag (or version) metadata 184 associated with the memory allocation assigned to a memory allocation slot 140 containing memory address 182.

To prevent use-after-free (UAF) violations, tag metadata 184 can be compared to the tag metadata in a tag table 150 (also referred to herein as a 'metadata table') stored in memory circuitry 130 in memory that may be separate from the memory allocation slots 140A-140n. If the pointer tag metadata 184 matches the stored tag metadata in the tag table 150, the operation at the designated memory address 182 is permitted. If the pointer tag metadata 184 fails to match the stored tag metadata in the tag table 150, an exception is returned to the processor circuitry 110. In some embodiments, bounds checks may also be performed. If the memory to be accessed by the pointer is within the left and/or right bounds specified by the metadata stored in the tag table 150, then the bounds check passes and the memory access may be permitted. Otherwise, if the memory to be accessed by the pointer is outside the range specified by the stored bounds metadata in the tag table 150, then the bounds check fails and memory access may be denied.

The processor circuitry 110 includes any number and/or combination of electrical components, optical components, quantum components, semiconductor devices, and/or logic elements capable of executing machine-readable instructions, such as provided by one or more applications 170. Processor circuitry 110 may include a plurality of processor core circuits. Each of processor core circuits may provide one or more hardware and/or virtual processor threads. The processor circuitry 110 may include any of various commercially available processors, including without limitation an AMD® Athlon®, Duron® and Opteron® processors; ARM® application, embedded and secure processors;

IBM® and Motorola® DragonBall® and PowerPC® processors; IBM and Sony® Cell processors; Intel® Atom®, Celeron®, Core (2) Duo®, Core i3, Core i5, Core i7, Core i9, Itanium®, Pentium®, Xeon®, Xeon Phi® and XScale® processors; and similar processors. According to some examples, the processor circuitry 110 may also be an application specific integrated circuit (ASIC) and at least some modules of processor core circuits may be implemented as hardware elements of the ASIC. According to other examples, the processor circuitry 110 may be a RISC-V Berkeley Out-of-Order Machine (BOOM) core.

Processor circuitry 110 may include additional circuitry and logic. Processor circuitry 110 may include all or a part of memory access circuitry 120 (memory management unit (MMU), address generation unit (AGU), load buffer, store buffer, etc.) and may also include cache circuitry 112. In other hardware configurations, at least a portion of memory access circuitry could be communicatively coupled with, but separate from processor circuitry. Memory access circuitry 120 can include any number and/or combination of electrical components, optical components, quantum components, semiconductor devices, and/or logic elements capable of performing read and/or write operations to the cache circuitry 112 and/or the memory circuitry 130. For example, processor circuitry 110 may further include secure memory access logic 116, which can include store instruction logic 117 for performing memory access operations to store/write data or code to memory and load instruction logic 118 for performing memory access operations to read/load data or fetch code from memory. It should be apparent, however, that read and/or write operations may access the requested data in cache circuitry 112, for example, if the appropriate cache lines were previously loaded into cache circuitry and not yet moved back to memory circuitry 130. In some embodiments, the processor circuitry 110 and/or the memory access circuitry 120 may include memory management unit (MMU) circuitry to store information and/or data used to provide paginated (e.g., via 4 KB pages) address translations.

The cache circuitry 112 of processor circuitry 110 may include an object lookaside buffer (OLB) 114 and various level caches 113 (e.g., level 1 (L1), level 2 (L2), Translation Lookaside Buffer (TLB), etc.). In some implementations, the OLB 114 may be provided for each hardware thread running on processor circuitry 110 (e.g., running on a core of a processor). In at least one implementation, the OLB 114 may be configured in hardware as a processor level cache and used to store metadata for memory allocations (also referred to herein as "allocation metadata" and a "set of metadata") of a program. A set of metadata for an allocation includes a tag. Depending on the particular embodiment as further described herein, and also depending on the size of the allocation, the set of metadata for a particular allocation may also include a descriptor (e.g., an indication of the allocation size) and possibly bounds of the allocation (e.g., left bounds, right bounds, or both left and right bounds). As will be further described herein, OLB 114 is designed to enable efficient caching and queueing of metadata.

In some embodiments, a privileged system component 160, such as an operating system kernel or virtual machine monitor, or instruction set emulator, may facilitate communication between applications, such as application 170 and hardware components such as processor circuitry 110 and/or memory access circuitry 120, for example. Furthermore, privileged system component 160 may be part of a trusted execution environment (TEE), virtual machine, processor circuitry 110, a co-processor (not shown), or any other suitable hardware, firmware, or software of a computing device or securely connected to computing device. A memory allocator 165 may be part of privileged system component 160 and may be embodied as software, firmware, or hardware, or any combination thereof. Memory allocator may be configured to allocate portions of memory circuitry (e.g., based on instructions such as malloc, realloc, calloc, etc.) to the various processes running on the computing device, to deallocate memory (e.g., based on instructions such as delete, free, etc.) or reallocate memory (e.g., based on instructions such as realloc, etc.) for various processes running on the computing device. The memory allocator 165 could be embodied as, for example, a loader, memory manager service, or a heap management service. An exception handler 167 may also be part of the privileged system component 160. The exception handler 167 may be invoked when a tag check or a bounds check fails.

An OLB miss handler 169 may be provided in privileged system component 160 to handle OLB misses. An OLB miss can occur when a program tries to access allocation metadata of a particular memory allocation and the allocation metadata is not cached in the OLB 114. The OLB miss handler 169 retrieves allocation metadata from memory (e.g., from tag table 150) and updates the OLB 114. In some examples, the OLB miss handler 169 may be part of the operating system's kernel, which runs in a privileged mode and is authorized to access the necessary hardware resources, such as the OLB 114. In other examples, the OLB miss handler 169 can be implemented in hardware, firmware, software, or any suitable combination thereof When memory is needed by a program, processor circuitry 110 generates an encoded pointer 180 that includes at least data representative of a memory address (e.g., memory address 182) to be used in one or more memory access operations, data representative of the power or exponent (e.g., size metadata 186) that can be used to determine the size (e.g., based on a power of two) of a slot to which the memory allocation is assigned, and data representative of a tag (e.g., tag metadata 184) associated with the memory allocation slot 140 (e.g., any one of slots 140A-140n) containing the memory address 182. The tag may also be referred to herein as "version" or "color." The encoded pointer 180 may include additional information, such as pointer arithmetic bits that can be manipulated to cause the encoded pointer to reference different locations within the memory allocation as described below in detail with regard to FIG. 2.

The memory circuitry 130 includes any number and/or combination of electrical components, semiconductor devices, optical storage devices, quantum storage devices, molecular storage devices, atomic storage devices, and/or logic elements capable of storing information and/or data. All or a portion of the memory circuitry 130 may include transitory memory circuitry. All or a portion of the memory circuitry 130 may include non-transitory memory circuitry. Memory circuitry 130 may also be referred to as system memory or main memory. The memory circuitry 130 may include one or more storage devices having any storage capacity. For example, the memory circuitry 130 may include one or more storage devices having a storage capacity of about: 512 kilobytes or greater; 1 megabyte (MB) or greater; 100 MB or greater; 1 gigabyte (GB) or greater; 100 GB or greater; 1 terabyte (TB) or greater; or about 100 TB or greater.

In some embodiments, an instruction that causes the processor circuitry 110 to perform a memory allocation operation causes the processor circuitry 110 to apportion the memory circuitry 130 into any power of two number of memory allocation slots 140A-140n. As depicted in FIG. 1, in some embodiments, the processor circuitry 110 may apportion the memory circuitry 130 into a single memory allocation slot 140A (i.e., a power of two=$2^m$, for a value of m that results in the entire system memory being covered). As depicted in another example apportionment in FIG. 1, the processor circuitry 110 may apportion the memory circuitry 130 into two memory allocation slots 140A, 140B (i.e., a power of two=$2^{m-1}$). As depicted in another example apportionment in FIG. 1, the processor circuitry 110 may apportion the memory circuitry 130 into four memory allocation slots 140A-140D (i.e., a power of two=$2^{m-2}$). As depicted in another example apportionment in FIG. 1, the processor circuitry may apportion the memory circuitry 130 into "n" memory allocation slots 140A-140n (i.e., a power of two=$2^k$ for a value k that results in dividing the system memory into "n" memory allocations). In embodiments described herein, power of two memory allocation slots based on different powers or exponents (e.g., $2^k$ ... $2^{m-2}$, $2^{m-1}$, and $2^m$, or any combination thereof) may be used for a single program in which memory allocations for the program are assigned to various sized allocation slots, as will be further described herein.

Importantly, note that the midpoint 142A-142n in each of the memory allocation slots 140 does not align with the midpoint in other memory allocation slots, thereby permitting the assignment of each memory allocation to a unique slot. In addition, metadata associated with memory allocations (e.g., tag values, data bounds values, descriptors that include allocation bounds information) can be stored in tag table 150 and indexed based on slot midpoints 142A-142n of the corresponding memory allocations. Allocation metadata can include a set of metadata, with the set including one or more items of metadata. Depending on the size of a particular allocation within an assigned slot, allocation metadata associated with the particular allocation may be stored in one or more entries of the tag table 150 in a particular entry arrangement (e.g., format). In some embodiments, allocation metadata for smaller allocations (e.g., 1 granule) include only a tag, allocation metadata for slightly larger allocations (e.g., 2 granules) include a tag and a descriptor, and larger allocations (e.g., 3 granules or more) can include a tag, a descriptor, and left and/or right bounds. In other embodiments, even a single granule allocation may include a tag and a descriptor.

The encoded pointer 180 includes the memory address 182 to perform a memory operation (fetch, load, store/write, etc.). The memory address 182 may include any number of bits. For example, the memory address 182 may include: 8-bits or more; 16-bits or more, 32-bits or more; 48-bits or more; or 64-bits or more; 128-bits or more. In embodiments, the size metadata 186 carried by the encoded pointer 180 may include any number of bits. For example, the size metadata 186 may include 4-bits or more, 8-bits or more, 16-bits or more, or 32-bits or more. In embodiments, the tag metadata 184 carried by the encoded pointer 180 may include any number of bits. For example, the tag metadata 184 may include 4-bits or more, 8-bits or more, 16-bits or more, or 32-bits or more. In one or more embodiments, all or a portion of the address and/or tag metadata carried by the encoded pointer 180 may be encrypted.

Additionally, in one or more embodiments, the encoded pointer or a portion thereof may be used as input to a cryptographic algorithm (e.g., as a tweak or part of a tweak to a counter mode block cipher) to encrypt data or code to be stored in the memory allocation or to decrypt data or code loaded from the memory allocation. The cryptographic algorithm may also use a key (e.g., secret or non-secret) as input to encrypt/decrypt the data or code. For example, data or code within a bounded allocation may be encrypted (e.g., when stored/written) or decrypted (e.g., when loaded/read) using a tweakable block cipher such as Advanced Encryption Standard (AES) XOR-encrypt-XOR (XEX)-based tweaked-codebook mode with ciphertext stealing (XTS) mode (or equivalent) using the memory address for the current data load/store operation and/or a key as input and/or a tweak as input that includes at least the tag metadata 184 from encoded pointer 180. The tag metadata itself may be encrypted or in plaintext (i.e., unencrypted). Furthermore, the tweak may include the entire encoded pointer (e.g., with some parts encrypted), an entire decrypted and decoded pointer, selected portions of the encoded pointer (e.g., upper address bits, encrypted address bits, decrypted address bits, other metadata), other metadata or context information not encoded in the pointer, or any suitable combination thereof.

In some embodiments, memory accesses are performed upon successful verification of the tag values stored in tag table and indexed (e.g., by allocation slot midpoints) to correspond to associated memory allocations containing the data targeted in the memory access operations. Also in some embodiments, memory accesses are not performed unless the targeted address range is determined to be within the bounds of the allocation, which may be stored in the tag table 150 along with the tag values associated with the same targeted address range. In one example, a bounds check may be performed by evaluating upper and/or lower allocation bounds information stored in the tag table 150 with the associated tag value for the same memory allocation being targeted.

Figure 2:
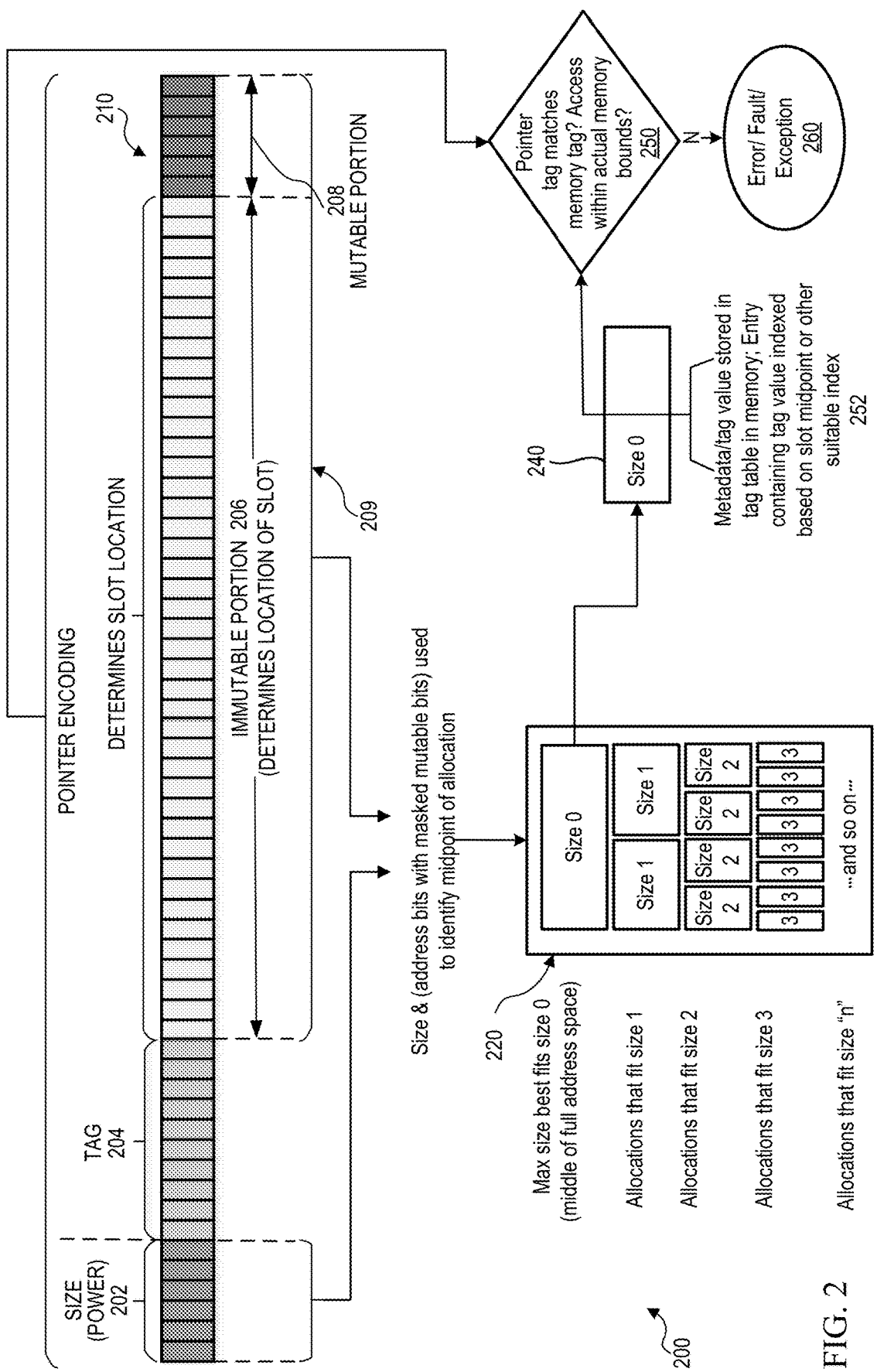
FIG. 2 is a schematic diagram of an illustrative encoded pointer architecture according to examples.

Turning to FIG. 2, FIG. 2 is a schematic diagram of an example encoded pointer architecture and tag checking operation 200. FIG. 2 illustrates an encoded pointer 210 that may be used in one or more embodiments of a memory safety system disclosed herein. The encoded pointer 210 may be configured as any bit size, such as, for example, a 64-bit pointer (as shown in FIG. 2), or a 128-bit pointer, or a pointer that is larger than 128-bits. The encoded pointer, in one embodiment, may include an x86 architecture pointer. The encoded pointer 210 may include a greater (e.g., 128-bits), or lesser (e.g., 16-bits, 32-bits) number of bits.

FIG. 2 shows a 64-bit pointer (address) in its base format, using exponent size (power) metadata. The encoded pointer 210 includes a multi-bit size (power) metadata field 202, a multi-bit tag field 204, and a multi-bit address field 209 that includes an immutable portion 206 and a mutable portion 208 that can be used for pointer arithmetic. The encoded pointer 210 is an example configuration that may be used in one or more embodiments and may be the output of special address encoding logic that is invoked when memory is allocated (e.g., by an operating system, in the heap or in the stack, in the text/code segment) and provided to executing programs in any of a number of different ways, including by using a function such as malloc, alloc, calloc, or new; or implicitly via the loader; or statically allocating memory by the compiler, etc. As a result, an indirect address (e.g., a linear address) that points to the allocated memory, is encoded with metadata, which may also be referred to herein as 'pointer metadata' or 'address metadata' (e.g., power/exponent in size metadata field 202, tag value in tag field 204) and, in at least some embodiments, is partially encrypted.

In embodiments, the number of bits used in the immutable portion 206 and mutable portion 208 of the address field 209 may be based on the size of the respective memory allocation as expressed in the size metadata field 202. For example, in general, a larger memory allocation ($2^0$) may require a lesser number of immutable address bits than a smaller memory allocation ($2^1$ to $2^n$). The immutable portion 206 may include any number of bits, although, it is noted that, in the shown embodiment of FIG. 2, the size number in fact does not correspond to the Po2 slot size. For example, the immutable portion 206 may accommodate memory addresses having: 8-bits or more; 16-bits or more, 32-bits or more; 48-bits or more; 52-bits or more; 64-bits or more; 128-bits or more.

In the example shown, the address field 209 may include a linear address (or a portion thereof). The size metadata field 202 may indicate a number of bits in mutable portion 208 of the encoded pointer 210. A number of low order address bits that comprise the mutable portion (or offset) 208 of the encoded pointer 210 may be manipulated freely by software for pointer arithmetic. In some embodiments, the size metadata field 202 includes data representative of a power (exponent) that indicates a slot size based on a power of two. A slot size corresponds to a particular number of granules in memory, where a granule is the smallest size (e.g., in bytes) of allocatable memory. For example, if the data in the size metadata field 202 has a value of 3, then based on a power of two slot size, the integer 3 can be used as an exponent of the integer 2 to determine that the power size of the slot is 8 granules ($2^3=8$). In other words, the slot is sized to contain 8 granules. If one granule is 16 bytes, then the slot size is 128 bytes (16×8=128). Other embodiments may use a different power base other than a power of two. For ease of illustration, encoded pointer 210 of FIG. 2 will be assumed to have a power of two (Po2) size metadata encoding.

Another metadata field, such as tag field 204, can include a tag (also referred to herein as 'tag value' and 'object tag') that is unique to the particular pointer within the process for which the pointer was created. In some embodiments, other metadata may also be encoded in encoded pointer 210 including, but not necessarily limited to, one or more of a domain identifier or other information that uniquely identifies the domain (e.g., user application, library, function, etc.) associated with the pointer, version, or any other suitable metadata.

The size metadata field 202 may indicate the number of bits that compose the immutable portion 206 and the mutable plaintext portion 208. In certain embodiments, the sizes of the respective address portions (e.g., immutable portion 206 and mutable portion 208) are dictated by the size metadata field 202. By way of example, for a 48-bit address and size metadata that indicates a size based on a power of two, if the size metadata value is 0 (bits: 000000), no mutable plaintext bits are defined and all of the address bits in the address field 109 form an immutable portion. As further examples, if the size metadata value is 1 (bits: 000001), then a 1-bit mutable plaintext portion and a 47-bit immutable portion are defined, if the size metadata value is 2 (bits: 000010), then a 2-bit mutable portion and a 46-bit immutable portion are defined, and so on, up to a 48-bit mutable plaintext portion with no immutable bits. In some embodiments, a minimum granularity may be defined, e.g., 16 bytes, and size values below that minimum may be reserved. In other embodiments that encrypt pointers, size values below that minimum may be increased to the minimum metadata granularity for the purpose of looking up metadata, and the smaller size value may still be used for purposes of encrypting and decrypting the pointer.

In the example of FIG. 2, the size metadata value equals 6 (bits: 000110), resulting in a 6-bit mutable portion 208 and a 42-bit immutable portion 206. The mutable portion 208 may be manipulated by software, e.g., for pointer arithmetic or other operations. In some cases, the size metadata field 202 could be provided as a separate parameter in addition to the pointer; however, in some cases (e.g., as shown) the bits of the size metadata field 202 may be integrated with the encoded pointer 210 to provide legacy compatibility in certain cases.

In at least one embodiment, in encoded pointer 210, the address field 209 is in plaintext, and encryption is not used. In other embodiments, however, an address slice (e.g., upper 16 bits of address field 209, or other suitable number of bits) may be encrypted to form a ciphertext portion of the encoded pointer 210. In some scenarios, other metadata encoded in the pointer (but not the size metadata) may also be encrypted with the address slice. The ciphertext portion of the encoded pointer 210 may be encrypted with a small tweakable block cipher (e.g., a SIMON, SPECK, BipBip, or tweakable K-cipher at a 16-bit block size, 32-bit block size, or other variable bit size tweakable block cipher). Thus, the address slice to be encrypted may use any suitable bit-size block encryption cipher. If the number of ciphertext bits is adjusted (upward or downward), the remaining address bits to be encoded (e.g., immutable and mutable portions) may be adjusted accordingly. The tweak may include one or more portions of the encoded pointer. For example, the tweak may include the size metadata in the size metadata field 202, the tag metadata in the tag field 204, some or all of the immutable portion 206. If the immutable portion of the encoded pointer is used as part of the tweak, then the immutable portion 206 of the address cannot be modified by software (e.g., pointer arithmetic) without causing the ciphertext portion to decrypt incorrectly. Other embodiments may utilize an authentication code in the pointer for the same.

When a processor is running in a cryptographic mode and accessing memory using an encoded pointer such as encoded pointer 210, to get the actual linear/virtual address memory location, the processor takes the encoded address format and decrypts the ciphertext portion. Any suitable cryptography may be used and may optionally include as input a tweak derived from the encoded pointer. In one example, a tweak may include the variable number of immutable plaintext bits (e.g., 206 in FIG. 2) determined by the power/exponent represented in the size metadata bits (e.g., 202 of FIG. 2) and a secret key. In some instances, the size metadata and/or other metadata or context information may be included as part of the tweak for encrypting and decrypting the ciphertext portion (also referred to herein as "address tweak"). In one or more embodiments, all of the bits in the immutable portion 206 may be used as part of tweak. If the address decrypts incorrectly, the processor may cause a general protection fault (#GP) or page fault due to the attempted memory access with corrupted linear/virtual address.

A graphical representation of a memory space 220 illustrates possible memory slots to which memory allocations for various encodings in the Po2 size metadata field 202 of encoded pointer 210 can be assigned. Each address space portion of memory, covered by a given value of the immutable portion 206 contains a certain number of allocation slots (e.g., one Size 0 slot, two Size 1 slots, four Size 2 slots, etc.) depending on the width of the Po2 size metadata field 202.

Referring still to FIG. 2, the size metadata field 202, in combination with the information in the address fields (e.g., immutable portion 206 with masked mutable portion 208), can allow the processor to find the midpoint of a given slot defined in the memory space 220. The size metadata, which is expressed as a power of two in this example, is used to select slot that best fits the entire memory allocation. For a power of two scheme, where the size metadata includes exponent (power) information, as the exponent (power) becomes larger (for larger slots, such as Size 0), fewer upper address bits (e.g., immutable portion 206) are needed to identify a particular slot (since with larger slots, there will be fewer slots to identify). In such a case, more of the bits at the end of the pointer, in the bits of mutable portion 208 (e.g., where pointer arithmetic can be performed), can be used to range within a given slot. The latter leads to a shrinking of the address field and an expanding of the pointer arithmetic field.

FIG. 2 illustrates a pointer format for locating tag metadata for any allocation. Tag metadata in a pointer allows multiple versions of a pointer to be used pointing to the same slot, while still ensuring that the pointer version being used to access the slot is in fact the pointer with the right to access that slot. The use of tag metadata can be useful for mitigating user-after-free (UAF) attacks for example. Where a dangling pointer is involved, but where tag metadata is used, changing tags with each version of the pointer would result in a mismatch with an allocation sought to be accessed by a dangling pointer, leading to errors and thus protecting the new allocation from unauthorized access by the dangling pointer. As will be further described herein, one or more embodiments provide for a tag table that enables a single tag to be used for each allocation. For a given allocation, the power (e.g., in the size metadata field) and upper address bits of the memory address encoded in the pointer generated for the allocation can be used to locate the one instance of tag metadata stored in the tag table for the allocation.

As depicted in FIG. 2, upon execution of an instruction that includes a memory operation, according to one embodiment, processor circuitry (e.g., 110) and/or an integrated memory controller (IMC) (e.g., 120) and/or a separate memory controller compares at 250 the tag value included in the tag field 204 with the tag metadata 252 stored in metadata storage in memory or cached in an object lookaside buffer (e.g., 114). In one example, the metadata storage may include a tag table (e.g., 150) in memory. The tag metadata 252 may be indexed in the tag table based on a midpoint of a slot 240 in memory to which the memory allocation is assigned, or based on any other suitable index. As will be further discussed herein, for each memory allocation, the tag table stores allocation metadata in metadata storage in memory. The allocation metadata for a particular memory allocation includes tag metadata (e.g., 252), which represents the memory allocation. For larger allocations, the allocation metadata may also include a descriptor, or a descriptor and appropriate bounds information. If the tag metadata included in the tag field 204 matches (e.g., exact match, complementary, or otherwise corresponding to as determined by a particular implementation) the tag value in the tag metadata 252 stored in the metadata storage in memory, and if any other metadata checks (e.g., memory access bounds checks) also succeed, then the processor circuitry and/or the IMC completes the requested memory operation in the memory circuitry/cache circuitry. If the tag metadata included in the tag field 204 fails to match the tag value in the tag metadata 252 stored in the metadata storage in memory, then the IMC reports an error, fault, or exception 260 to the processor circuitry.

In one or more embodiments, a single tag is stored for a memory allocation, resulting in a single tag lookup to verify that the encoded pointer is accessing the correct allocation. Using the power represented in the size metadata field of the pointer together with a memory address based on the higher order address bits encoded in the pointer, a slot to which the memory allocation is assigned can be located. For example, the higher order address bits include immutable address bits that are not used in pointer arithmetic to point to different bytes of data within the allocation. These higher order address bits represent a memory address at a power of two boundary in memory that coincides with the power of two slot to which the allocation is assigned. The power represented in the size metadata field can be used to determine the size of the slot. For example, the value of the data in the size metadata field can be used as an exponent (n) of the integer 2 ($2^n$ because the slot size is based on the power-of-two) to determine the number of granules that the slot is sized to contain. The number of granules may be multiplied by the bytes per granule (e.g., 16 bytes/granule) to determine the byte size of the slot that begins at the memory address identified from the higher order bits. A midpoint of the slot can be used to search metadata storage (e.g., tag table 150) to find the location of the allocation metadata (e.g., tag, descriptor, bounds information) for the given allocation. For memory allocation operations, such as alloc, realloc, and free, only one memory access is needed to set/reset the tag data. Additionally, as few as one memory access is needed for pointer lookups on load/store operations.

Figure 3:
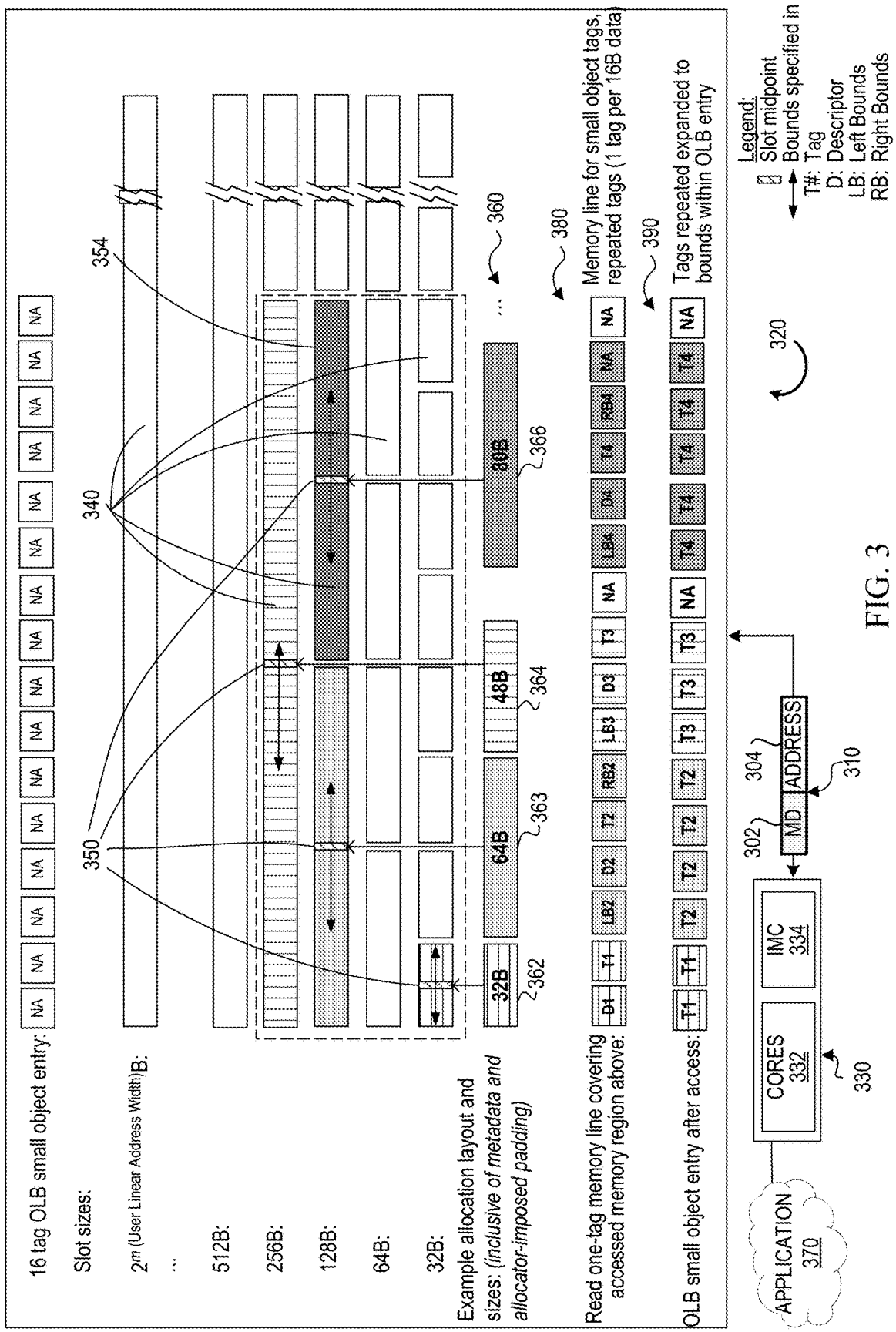
FIG. 3 is a schematic illustration of a memory allocation system using tag metadata according to examples.

FIG. 3 is a schematic diagram of an illustrative memory/cache 320 to allow tag metadata checks on memory allocations accessed by encoded pointers (e.g., encoded pointer 210), some of which are described herein. The schematic diagram also shows processor circuitry 330 including cores 332 and memory access circuitry 334 (e.g., memory controller (MC), integrated memory controller (IMC), memory management unit (MMU)), which are communicatively coupled to memory/cache 320. The processor 330, IMC 334, and memory/cache 320 are examples, respectively, of processor circuitry 110, memory access circuitry 120, and memory circuitry 130 of FIG. 1. Although embodiments are not so limited, in the shown embodiment of FIG. 3 the memory/cache 320 may be apportioned, conceptually, into one or more power of two (i.e., $2^0$ to $2^m$) slots 340 in which the respective midpoints 350 (e.g., midpoint addresses) are associated with respective memory allocations 360 within slots 340, in accordance with at least one embodiment described herein. In some implementations, the midpoints may include respective regions at the midpoints (e.g., before, after, or both before and after the midpoints) that contain certain metadata (e.g., integrity value, etc.) associated with the corresponding allocation. Additionally, "allocation" and "memory allocation" are intended to refer to an addressable portion of memory in which an object, such as data or code, is stored. As used herein, "slot" is intended to refer to a unit of memory in a cacheline or across multiple cachelines.

In some embodiments, an instruction that causes the processor circuitry 330 to allocate memory causes an encoded pointer 310 (which may be similar to encoded pointer 180, 210) to be generated. The encoded pointer may include at least data representative of the linear address associated with the targeted memory allocation 360 and metadata 302 (such as power/exponent in size field 202 and tag value in tag field 204) associated with the respective memory allocation 360 corresponding to memory address 304. Also, an instruction that causes the processor circuitry 330 to perform a memory operation (e.g., LOAD, MOV, STORE) that targets a particular memory allocation (e.g., 366) causes the memory access circuitry 334 to access that memory allocation, which is assigned to a particular slot (e.g., 354) in memory/cache 320 using the encoded pointer 310.

In the embodiments of the memory/cache 320 of FIG. 3, each memory allocation 360 is fully assigned to a given slot (i.e., one memory allocation per slot and one slot per memory allocation), in this way ensuring that the midpoint 350 can be easily associated with the memory allocation to which it pertains. Embodiments, however, are not so limited, and include within their scope the provision of metadata (e.g., tag table information) within a slot that includes none, some, or all of the memory allocation to which the metadata pertains. The memory allocations 360 are shown in FIG. 3 once at the bottom of the figure and represented correspondingly by double pointed arrows within the respective slots 340 to which the memory allocations are assigned. Even though the memory allocations 360 may be assigned to slots larger than the allocations themselves, the allocations may, according to one embodiment, not need padding in order to be placed within the larger slots.

According to some embodiments, a memory allocation may be assigned to a slot that most tightly fits the allocation, given the set of available slots and allocations. In the shown embodiment of FIG. 3, for example, the 32B allocation 362 is assigned to a 32B slot, the 56B allocation 363 to a 128B slot, the 48B allocation 364 to a 256B slot, and the 80B allocation to a 128B slot. In the shown example of FIG. 3, because the 48B allocation would have crossed an alignment boundary within three differently sized slots (e.g., 32B slots, 64B slots, and 128B slots), it is assigned to the larger 256B slot. Although the example of FIG. 3 shows the memory allocations as spanning through the slots in a contiguous fashion (tightly packed), clearly, embodiments are not so limited, and include within their scope a scheme of memory allocations to respective, dedicated memory slots as long as a midpoint address of the slot is crossed by the allocation, where some slots may be free, especially for example in UAF scenario where a dangling pointer is involved. According to some embodiments, memory allocation sizes may be no smaller than half the width of a smallest slot in order for them to cross (i.e., to at least partially cover) the midpoint when assigned to a slot.

Based on the above allocation scheme, where each memory allocation is uniquely assigned to a dedicated slot, and crosses the slot midpoint of that dedicated slot, the processor is able to find the midpoint 350 of a particular slot easily and quickly and the midpoint is ensured to be contained within the memory allocation that is assigned to that particular slot. The power-of-two (Po2) approach, used according to one embodiment, allows a unique mapping of each memory allocation to a Po2 slot, where the slot is used to provide the possibility to uniquely encode and encrypt objects stored in the respective memory allocations.

At least some encoded pointers indicate the size of the slot, such as the Po2 size of the slot based on an exponent (power) represented in the size metadata field of the pointer, that the allocation to be addressed fits into. The value encoded in the size metadata field can be used to determine the size of the slot. For example, the value of the data in the size metadata field can be used as the exponent of 2 (because the slot size is based on the power-of-two) to determine the power size of the slot (e.g., number of granules that the slot is sized to contain). The number of granules may be multiplied by the bytes per granule (e.g., 16 bytes/granule) to determine the byte size of the slot (or power size). A memory address represented by higher order address bits (e.g., immutable address portion 206) determines the specific address bits to be referred to by the processor. The calculated slot size together with the memory address represented by the higher order address bits determine the slot being referred to. Having identified the specific slot, the processor can go directly to the midpoint of the slot, which can be used as an index into a tag table (e.g., 150), for example, a content addressable memory (CAM) or similar indexed caching circuitry, to locate a tag (and possibly other metadata, such as bounds, permission bits, a compartment identifier (ID), privilege level, accessed and/or dirty bits, identifier for code authorized to access the data such as a hash value, key, KeyID, tweak value or IV/counter value used by the processor circuitry to encrypt/decrypt data and/or other metadata, an aggregate cryptographic MAC value, Integrity-Check Value (ICV), or ECC code for the data allocation, element size, e.g., to allow generating an error if an attempt is made to access an allocation at an offset that is not an even multiple of the element size, and data object size, e.g., to permit generating an exception when accessing invalid locations outside of the data object, even if the space reserved for the allocation is larger than the size needed for the data object) that is associated with the allocation assigned to the specific slot. Embodiments are, however, not limited to Po2 schemes for the slots, and may include a scheme where the availability of slots of successively increasing sizes may be based on a power of an integer other than two, or based on any other scheme.

Although the memory access circuitry 334 is depicted in FIG. 3 as a separate box from the cores 332, the cores 332 may include all or a portion of the memory access circuitry 334. Also, although the memory access circuitry 334 is depicted in FIG. 3 as part of processor circuitry 330, in some embodiments, the processor circuitry 330 may include all, a portion, or none of the memory access circuitry 334. This may also be referred as a memory management unit.

In response to execution of a memory access instruction, the processor circuitry 330 uses an encoded pointer 310 that includes at least data representative of the memory address 304 involved in the operation and data representative of the metadata 302, which includes a tag associated with the particular memory allocation (of the memory allocations 360) corresponding to the memory address 304. The encoded pointer 310 may include additional information, such as data representative pointer arithmetic bits (e.g., mutable plaintext portion 208) to identify the particular address being accessed within the memory allocation. In one or more embodiments, the midpoint of the slot to which the targeted memory allocation is assigned is used to locate metadata (e.g., a tag, a descriptor, right bounds, left bounds, extended right bounds, extended left bounds) in a tag table.

The memory/cache 320 may include any number and/or combination of electrical components, semiconductor devices, optical storage devices, quantum storage devices, molecular storage devices, atomic storage devices, and/or logic elements capable of storing information and/or data. All or a portion of the memory/cache 320 may include transitory memory circuitry, such as RAM, DRAM, SRAM, or similar. All or a portion of the memory/cache 320 may include non-transitory memory circuitry, such as: optical storage media; magnetic storage media; NAND memory; and similar. The memory/cache 320 may include one or more storage devices having any storage capacity. For example, the memory/cache 320 may include one or more storage devices having a storage capacity of about: 512 kilobytes or greater; 1 megabyte (MB) or greater; 100 MB or greater; 1 gigabyte (GB) or greater; 100 GB or greater; 1 terabyte (TB) or greater; or about 100 TB or greater.

In the shown example of FIG. 3, the memory/cache 320 is apportioned into any power of two number of slots 340. The memory/cache 340 may be apportioned conceptually by IMC 334 or other memory access circuitry 120, cache circuitry 112, memory circuitry 130, or software (e.g., privileged software such as an operating system). In some examples, the memory/cache 320 is apportioned into a single memory slot 340 (i.e., a power of two=$2^m$, for a value of m that results in the entire system memory being covered). In other examples, the memory/cache 320 is apportioned into two memory slots 340 (i.e., a power of two=$2^{m-1}$). In other examples, the memory/cache 320 is apportioned into four memory slots 340 (i.e., a power of two=$2^{m-2}$). In other examples, the memory/cache 320 is apportioned into "n" memory allocations 360 (i.e., a power of two=$2^k$ for a value k that results in dividing the memory space into "n" slots).

Importantly, note that the midpoint address 350 in each of the memory slots 340 does not align with the midpoint address in other memory slots, thereby permitting the indexing of allocation metadata (e.g., tag, descriptor, bounds) in a tag table that is unique to the respective memory slot 340s. It is also true that the tightest fitting slot for any memory allocation, e.g., as software apportioned from a heap structure, that encompasses the entire allocation, that memory allocation will traverse the midpoint of the slot. Example contents 380 of a tag table are illustrated. As will be further described herein, in some embodiments, allocation metadata (or a set of allocation metadata) is assigned to each allocation. The allocation metadata assigned to an allocation of a single granule (e.g., 16B or another designated granule size) includes a single tag value (e.g., 4 bits or another designated number of bits). The allocation metadata assigned to an allocation larger than a granule, but not larger than two granules includes a tag value and a descriptor. The allocation metadata assigned to an allocation larger than two granules includes a tag value, a descriptor, and bounds for the allocation. The number of right bounds and the number of left bounds are dependent on the size and placement of the allocation relative to the midpoint of the slot to which the allocation is assigned. Each set of allocation metadata is stored in a tag table as illustrated by example contents 380 of a tag table in FIG. 3. In the example contents 380, four sets of allocation metadata correspond to the four allocations 362, 363, 364, and 366, and tags are indicated by "T #", descriptors are indicated by "D #", left bounds are indicated by "LB #", and right bounds are indicated by "RB #".

Additionally, example corresponding contents 390 of an object lookaside buffer (OLB) are illustrated. An OLB (e.g., 114) can be populated by a set of allocation metadata for an allocation when a tag table is read during a memory access operation on that allocation. FIG. 3 illustrates the contents 390 of an OLB if memory access operations have been performed on each of the allocations 362, 363, 364, and 366. As will be further described herein, in some embodiments, some sets of allocation metadata in the tag table are not duplicated exactly in the OLB. For example, for an allocation that is not larger than a designated small allocation size (e.g., 256B in FIG. 3), the OLB may be populated by replacing the descriptor and bounds (if any) with the tag value. By way of example, for allocation 366, the tag table includes one left bound (LB4), one right bound (RB4), one descriptor (D4), and one tag (T4). Instead of copying the set of allocation data (e.g., LB4, D4, T4, RB4) from the tag table into the OLB, the tag T4 may be duplicated and stored in the OLB instead of storing the descriptor D4 and bounds LB4 and RB4. In this example, during a memory access operation, the pointer indicates whether the memory to be accessed is a small object or large object (e.g., based on slot size). If the object is determined to be small (e.g., 256B slot, 512B slot or other designated size slot), then the allocation metadata from memory (e.g., in a tag table) can be modified to populate a buffer entry in the OLB with one tag value (for a single granule allocation) or duplicated tag values (for allocations with descriptors and possibly bounds in the allocation metadata).

In yet other embodiments, in sets of allocation metadata for small allocations, the descriptor and bounds metadata may also be omitted from the tag table. Instead, the tag value for small allocations may be duplicated in the tag table if a descriptor and possibly bound(s) could otherwise be included in the set of allocation metadata. In the example of FIG. 3, the contents of the tag table could be the same as the contents of the OLB. In this example, during a memory access operation, the pointer indicates whether the memory to be accessed is a small object or large object (e.g., based on slot size). If the object is determined to be small (e.g., 256B slot, 512B slot or other designated size slot), then a buffer entry in the OLB can be populated with the same allocation metadata obtained from memory (e.g., tag table) for the allocation being accessed. Advantageously, using only tag metadata for small objects allows one OLB entry to carry tag information about multiple memory allocations that fit within the slot.

Large objects may be considered objects stored in a slot that is greater in size than the designated small slot size. In this example, during a memory access operation, the pointer indicates whether the memory to be accessed is a small object or large object (e.g., based on slot size). If the object is determined to be large (e.g., wider than a 256B slot, wider than a 512B slot or wider than another designated small slot size), then a buffer entry in the OLB can be populated with the same allocation metadata obtained from memory (e.g., tag table) for the allocation being accessed.

The encoded pointer 310 is created for one of the memory allocations 360 (e.g. . . . , 32B allocation, 64B allocation, 48B allocation, or 80B allocation) and includes memory address 304 for an address within the memory range of that memory allocation. When memory is initially allocated, the memory address may point to the lower bounds of the memory allocation. The memory address may be adjusted during execution of the application 370 using pointer arithmetic to reference a desired memory address within the memory allocation to perform a memory operation (fetch, load, store, etc.). The memory address 304 may include any number of bits. For example, the memory address 304 may include: 8-bits or more; 16-bits or more, 32-bits or more; 48-bits or more; or 64-bits or more; 128-bits or more; 256-bits or more, 512-bits for more, up to 2 to the power of the linear address width for the current operating mode, e.g., the user linear address width-bits in terms of slot sizes being addressed. In embodiments, the metadata 302 carried by the encoded pointer 310 may include any number of bits. For example, the metadata 302 may include 4-bits or more, 8-bits or more, 16-bits or more, or 32-bits or more. In embodiments, all or a portion of the address and/or tag metadata carried by the encoded pointer 310 may be encrypted.

Figure 4:
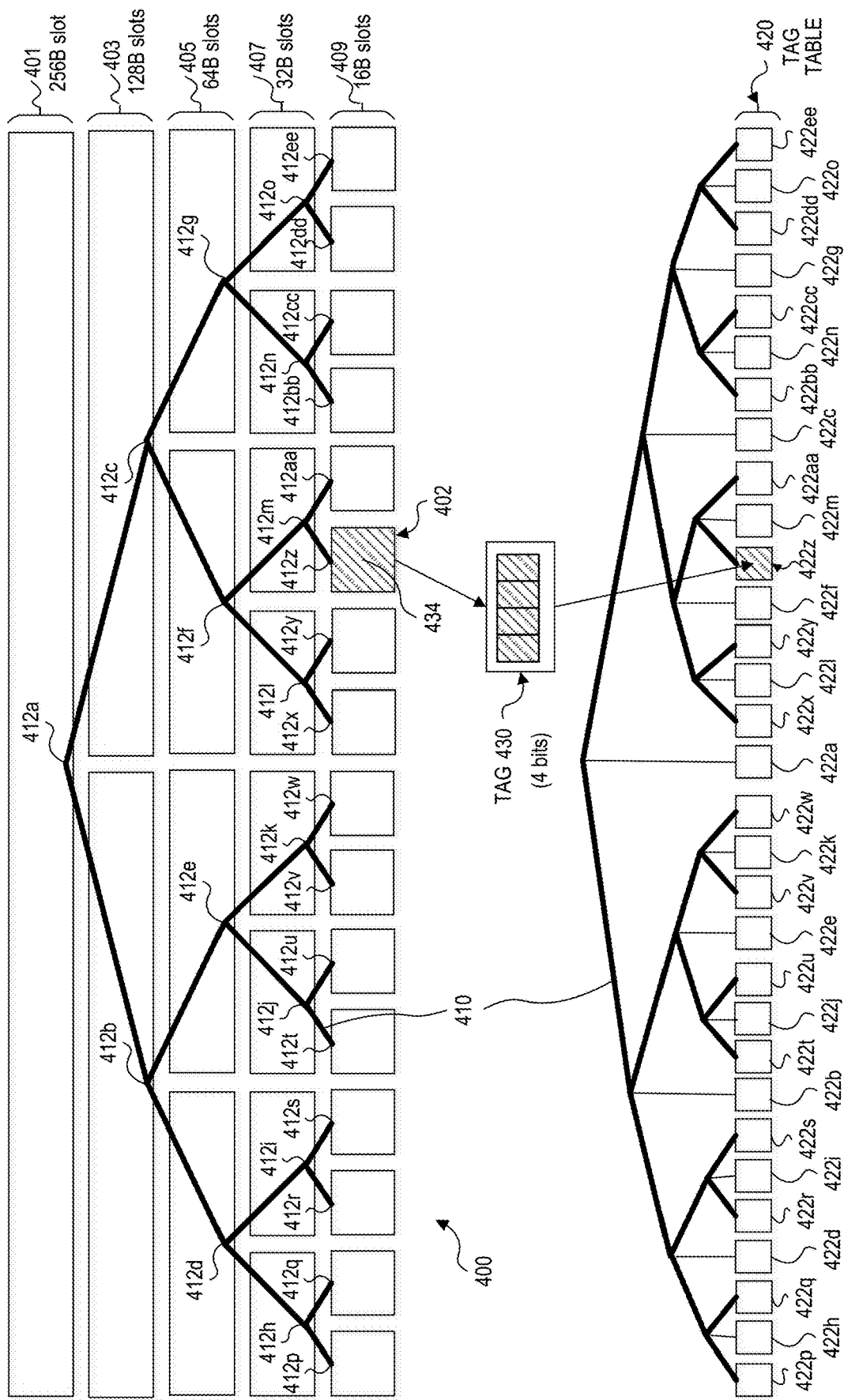
FIG. 4 is a graphical representation of an allocation in a memory space illustrating a binary tree and corresponding allocation metadata in a tag table.

FIG. 4 is a graphical representation of a memory space 400 and the selection of an index of a metadata location in a tag table for a particular memory allocation in the memory space 400. Memory space 400 illustrates memory (e.g., heap) that is conceptually divided into overlapping power of two sized slots with a binary tree 410 illustrated thereon. For each power of two size, the memory space 400 can be divided into a different number of slots. For example, the memory space can be divided into one 256-byte (256B) slot 401, two 128-byte (128B) slots 403, four 64-byte (64B) slots 405, eight 32-byte (32B) slots 407, and sixteen 16-byte (16B) slots 409.

As shown and described herein (e.g., with reference to FIG. 3), non-overlapping memory allocations can be assigned to respective slots. The slot size of the particular slot to which a given memory allocation is assigned can be specified in a Po2 size metadata portion (e.g., 202) of an encoded pointer (e.g., 210) generated for the given memory allocation. The particular slot can be identified based on the Po2 size metadata and the linear address in the encoded pointer of the memory allocation.

The midpoints of the slots in memory space 400 form a binary tree 410 illustrated thereon. As shown and described herein (e.g., with reference to FIG. 3), non-overlapping memory allocations can be assigned to respective slots. For example, an allocation 434 in memory space 400 is assigned to a single 16-byte slot 402. The slot size of the particular slot to which a given memory allocation is assigned can be determined based on a Po2 size metadata encoded in size metadata portion (e.g., 202) of an encoded pointer (e.g., 210) generated for the given memory allocation. The location of the slot can be determined based on the Po2 size metadata and the address bits corresponding to the immutable portion (e.g., 206) of an address portion (e.g., 209) of the encoded pointer generated for the memory allocation.

In one embodiment shown in FIG. 4, a tag table 420 can be created to hold a tag for each allocation assigned to a slot in contiguous memory. Tag table 420 is one example of tag table 150 shown in memory circuitry 130 of FIG. 1. Depending on the particular architecture, the tag table 420 may be created for different types of contiguous memory. In one architecture, the tag table 420 may be generated to hold a single tag for each allocation assigned to a slot in a contiguous linear address space (e.g., of a program), which is a contiguous range of linear addresses. In this example, the tag table 420 is also linearly contiguous and may be stored in the contiguous linear address space for the program. In another architecture, the tag table 420 may be generated to hold a single tag for each allocation assigned to a slot in contiguous physical memory, which is a contiguous range of physical addresses (e.g., of a program). In this example, the tag table 420 may also be physically contiguous and may be stored in the contiguous physical memory for the program. In yet another architecture, the tag table 420 may be generated to hold a single tag for each page of memory, as the page is physically contiguous. In this example, the tag table 420 may be correspondingly contiguous (e.g., in another page of memory). Generally, the techniques described herein could be applied to any region of memory that is embodied as a contiguous set of memory, in which one tag is set for the entire region.

The binary tree 410 shown on memory space 400 is formed by branches that extend between a midpoint of each (non-leaf) slot and the midpoints of two corresponding child slots. For example, left and right branches from midpoint 412a of a 256-byte slot 401a extend to respective midpoints 412b and 412c of 128-byte slots 403a and 403b that overlap the 256-byte slot 401a. The binary tree 410 can be applied to tag table 420, such that each midpoint of binary tree 410 corresponds to an entry in tag table 420. For example, midpoints 412a-412ee correspond to tag table entries 422a-422ee, respectively.

For the minimum power, corresponding to an allocation 404 fitting within a 16-byte slot, metadata entry 422z in tag table 420 contains 4 bits constituting a tag 430. If the pointer power (e.g., in a size metadata field) is, for example zero (0), this can indicate the metadata entry 422z contains just the tag 430. In at least one embodiment, a tag without additional metadata is used for a minimum sized data allocation (e.g., fitting into a 16-byte slot) and is represented as a leaf e.g., 422z in the midpoint binary tree 410 applied to (e.g., superimposed on) tag table 420.

Because every allocation regardless of size can fit into one slot uniquely, for each load and store operation of data or code in an allocation, a single tag can be looked up and compared to the tag metadata encoded in the encoded pointer to the data or code. Instead of individual tags for each 16-byte granule (or other designated size of granule).

Figure 5:
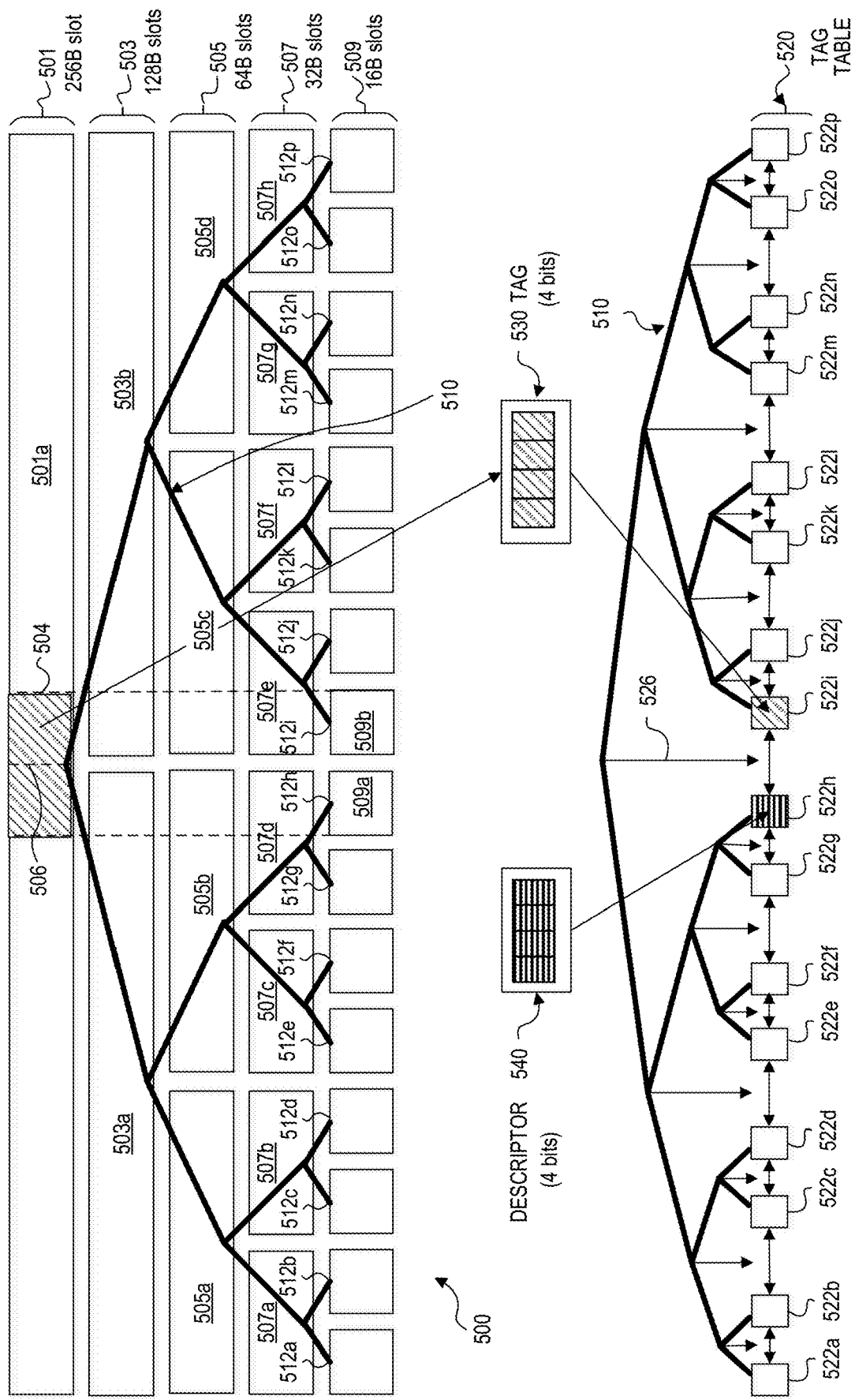
FIG. 5 of another allocation in a memory space illustrating a binary tree and corresponding allocation metadata in a tag table.

FIG. 5 is a graphical representation of a memory space 500 and the selection of an index of a metadata location in a tag table for a particular memory allocation having a power size of two granules (e.g., 32B) in the memory space 500. Memory space 500 illustrates memory (e.g., heap) that is conceptually divided into overlapping power of two sized slots, as previously described with reference to memory circuitry 130 and 320 of FIGS. 1 and 3 and memory space 400 of FIG. 4. For each power of two size, the memory space 500 can be divided into a different number of slots. For example, the memory space can be divided into one 256-byte (256B) slot 501, two 128-byte (128B) slots 503, four 64-byte (64B) slots 505, eight 32-byte (32B) slots 507, and sixteen 16-byte (16B) slots 509.

The midpoints of the slots in memory space 500 form a binary tree 510 superimposed thereon, which is similar to the binary tree 410 over memory space 400 of FIG. 4. As shown and described herein (e.g., with reference to FIG. 2), non-overlapping memory allocations can be assigned to respective slots. Each memory allocation crosses a midpoint of the slot to which the memory allocation is assigned. For example, a memory allocation 504 in memory space 500 is assigned to a single 256-byte slot 501a. Memory allocation 504 crosses a midpoint 506 of the 256-byte slot 501a. The slot size of the particular slot to which a given memory allocation is assigned can be determined based on a Po2 size metadata encoded in size metadata portion (e.g., 202) of an encoded pointer (e.g., 210) generated for the given memory allocation. The location of the slot can be determined based on the Po2 size metadata and the address bits corresponding to the immutable portion (e.g., 206) of an address portion (e.g., 209) of the encoded pointer generated for the memory allocation.

In an embodiment shown in FIG. 5, a tag table 520 can be created to hold a tag for each allocation assigned to a slot in contiguous memory. Tag table 520 is one example of tag table 150 shown in memory circuitry 130 of FIG. 1. As previously described with reference to tag table 420 of FIG. 4, the techniques described herein can be applied to any region of memory that is embodied as a contiguous set of memory (e.g., linear space, physical memory, memory pages, etc.), in which one tag is set for the entire region.

If an allocation is assigned to a slot with a power size larger than a single granule (e.g., 16 bytes), then at least two adjacent granules of the allocation cross the midpoint of the slot. In FIG. 5 for example, memory allocation 504 is assigned to a slot 501a having a power size of 16 granules (or 256 bytes), which is larger than the power size of a single 16-byte granule. Memory allocation 504 includes exactly two granules that cross the midpoint of the slot 501*a*. The size of memory allocation 504, which contains exactly two granules, is illustrated by dashed lines from the memory allocation to 16-byte slots 509*a* and 509*b*.

Because allocations cannot overlap, the two entries in the tag table 520 for each granule adjacent to the midpoint of the larger slot can be merged to represent all slots of two or more granules. Therefore, the tag table 520 only needs to represent the leaf entries and may omit the entries corresponding to midpoints of slots having a power size greater than one granule. For example, entries 522*a* and 522*b* can be used in combination to represent an allocation assigned to slot 507*a*, entries 522*b* and 522*c* can be used in combination to represent an allocation assigned to slot 505*a*, entries 522*c* and 522*d* can be used in combination to represent an allocation assigned to slot 507*b*, entries 522*d* and 522*e* can be used in combination to represent an allocation assigned to slot 503*a*, entries 522*e* and 522*f* can be used in combination to represent an allocation assigned to slot 507*c*, entries 522*f* and 522*g* can be used in combination to represent an allocation assigned to slot 505*b*, entries 522*g* and 522*h* can be used in combination to represent an allocation assigned to slot 507*d*, entries 522*h* and 522*i* can be used in combination to represent an allocation assigned to slot 501*a*, and so on for entries 522*i*-522*p* and the remaining slots 503*b*, 505*c*, 505*d*, and 507*e*-507*h*. This reduces the table size from NlogN to just N, where N corresponds to the number of leaf slots 509.

If the power size is larger than just one granule, then the midpoint slot includes (at a minimum) both adjacent table entries (to the midpoint) of the lowest power by definition as the allocation will always cross the midpoint of the best fitting slot. For the example of memory allocation 504, both entries 522*h* and 522*i* adjacent to a superimposed midpoint 526 corresponding to the midpoint 506 of slot 501*a* are used. A descriptor 540 is stored in the left entry 522*h* and a tag 530 is stored in the right entry 522*i*. The descriptor 540 can describe or indicate the rest of memory allocation 504, which crosses the midpoint 506 of slot 501*a*. In this example, memory allocation 504 is not larger than two granules so the descriptor can indicate that there are no bounds to the left or right because the allocation is not larger than two granules (e.g., 2×16-byte granules).

Figure 6:
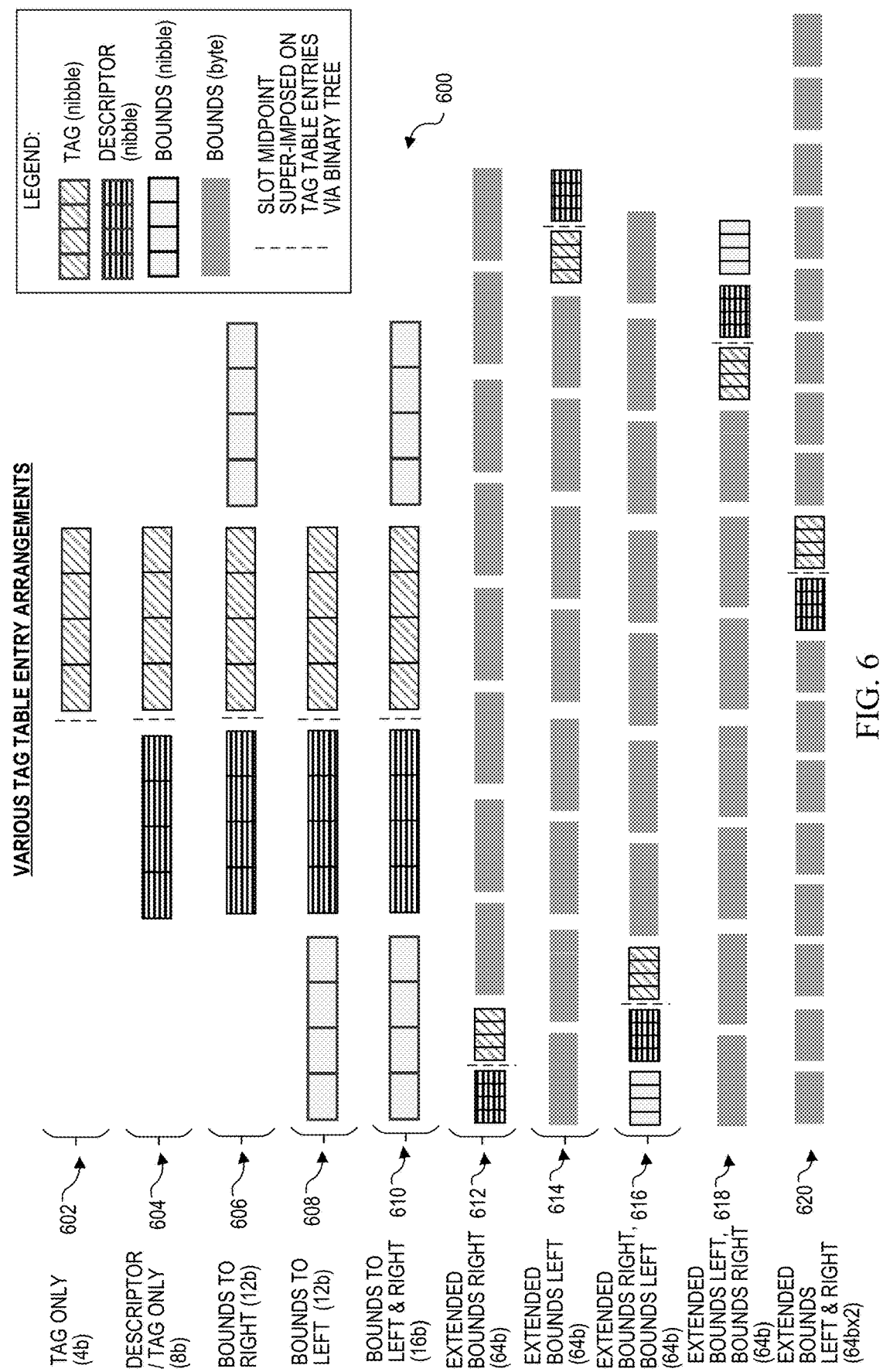
FIG. 6 is a table illustrating possible tag table entry arrangements according to at examples.

FIG. 6 is a table illustrating possible tag table entry arrangements depending on the size of an allocation. An entry arrangement in a tag table is includes allocation metadata generated for each allocation in a memory space and may be stored in a tag table of the memory space. Allocation metadata includes one or more metadata items. In one example, allocation metadata can include a tag, a descriptor, one or more right bounds, one or more left bounds, or a suitable combination thereof depending on the size of the allocation. A tag is included in every entry arrangement. In some embodiments, a descriptor is included in every entry arrangement corresponding to an allocation that is larger than the smallest granule (e.g., 16 bytes) and, therefore, assigned to a slot having a power size that is greater than the minimum power size of a single granule. For example, in FIG. 5, a descriptor is included for each allocation assigned to a slot in one of the 32-byte slots 507, the 64-byte slots 505, the 128-byte slots 503, or the 256-byte slot 501. Right bounds may be included in a tag table entry arrangement when an allocation extends more than one granule to the right of a midpoint in a slot to which the allocation is assigned. Conversely, left bounds may be included in a tag table entry arrangement when an allocation extends more than one granule to the left of a midpoint in a slot to which the allocation is assigned. Right bounds can include normal right bounds and extended right bounds. Left bounds can include normal left bounds and extended left bounds.

A descriptor defines how additional adjacent entries (if any) in a tag table entry arrangement are interpreted. Because memory may be allocated in various sizes in a program, several descriptor enumerations are possible. In one embodiment, a descriptor for a given allocation may provide one of the following definitions of adjacent table entries corresponding to a particular allocation: 1) for tag table entry arrangement 604, descriptor and tag only represent two granules; 2) for tag table entry arrangement 606, normal bounds to the right, 3) for tag table entry arrangement 608, normal bounds to the left, 4) for tag table entry arrangement 610, normal bounds to the left and the right, 5) for tag table entry arrangement 612, extended bounds to the right (multiple nibbles because it is a large bounds), 6) for tag table entry arrangement 614, extended bounds to the left, 7) for tag table entry arrangement 616, extended bounds to the right, normal bounds to the left, 8) for tag table entry arrangement 618, extended bounds to the left, normal bounds to the right, and 9) for tag table entry arrangement 620, extended bounds to the left and the right.

With reference to the table 600 of FIG. 6, various tag table entry arrangements 602-620 are illustrated. Each of the tag table entry arrangements 602-620 illustrates one or more tag table entries and the contents thereof (e.g., a set of metadata) that collectively represent an allocation having a particular size. For example, in some embodiments, a descriptor may not be used for an allocation of the smallest size (e.g., single 16-byte granule or any other size based on the particular implementation and/or architecture), which is assigned to a slot having a slot size indicated by the minimum power (e.g., zero) in the size metadata field of an encoded pointer (e.g., 180, 210, 310) generated for the allocation. A corresponding tag table entry arrangement 602 may include a tag in a tag table entry adjacent to a midpoint of the slot indicated in a binary tree (e.g., 410, 510) of memory space (e.g., 400, 500) applied to the tag table (e.g., 420, 520). Allocation 404 and corresponding tag 430 in tag table 420 is an example of a tag only entry arrangement 602. In this scenario, the set of metadata stored in the tag table for the memory allocation includes only a tag.

An allocation having two granules (e.g., 32 bytes) is assigned to the smallest slot available that can hold the allocation (e.g., slots 501-507 of memory space 500 in FIG. 5). A corresponding tag table entry arrangement 604 includes only a tag and a descriptor in respective tag table entries located on either side of the slot's midpoint indicated in a binary tree applied to the tag table. In this scenario, the set of metadata stored in the tag table for the memory allocation includes a tag and a descriptor.

It should be noted that bounds are needed in a tag table entry arrangement when the allocation size extends at least one more granule in the left and/or right direction (e.g., 3 granules, 48 bytes for a system with the smallest allocatable granule being 16 bytes). The extension of the allocation size by at least one more granule frees the granule's associated entry in the tag table for use to indicate the bounds. In one embodiment, a 4-bit normal bounds entry may be used. A normal bounds entry may be used to the left and/or to the right of the slot midpoint (e.g., left of the descriptor entry and/or right of the tag entry). Since a 4-bit bounds entry can represent a maximum of 16 granules, the normal left bounds entry can indicate up to 16 bytes to the left of the slot midpoint, and the normal right bounds entry can indicate up to 16 bytes to the right of the slot midpoint.

An allocation having three or more granules but not more than a maximum number of granules within normal bounds, is assigned to the smallest slot available that can hold the allocation (e.g., slots 501-505 of memory space 500 in FIG. 5), and a corresponding tag table entry arrangement can include a left bounds entry, a right bounds entry, or both. In a first scenario, an allocation assigned to a slot has one granule to the left of the slot's midpoint and has two or more granules but less than an extended number of granules to the right of the slot's midpoint. In this scenario, the corresponding tag table entry arrangement 606 can include a tag and a descriptor in respective tag table entries located on either side of the slot's midpoint indicated in a binary tree (e.g., 410, 510) applied to the tag table (e.g., 420, 520). In addition, the tag table entry arrangement 606 can include a right bounds entry adjacent to (e.g., to the right of) the tag. The right bounds entry can indicate how many granules in the allocation extend to the right of the slot's midpoint. In this scenario, the set of metadata stored in the tag table for the memory allocation includes a tag, a descriptor, and a single right bounds.

In a second scenario, an allocation assigned to a slot has one granule to the right of the slot's midpoint and has two or more granules but less than an extended number of granules to the left of the slot's midpoint. In this scenario, the corresponding tag table entry arrangement 608 can include a tag and a descriptor in respective tag table entries located on either side of the slot's midpoint indicated in a binary tree (e.g., 410, 510) applied to the tag table (e.g., 420, 520). In addition, the tag table entry arrangement 608 can include a left bounds entry adjacent to (e.g., to the left of) the descriptor. The left bounds entry can indicate how many granules in the allocation extend to the left of the slot's midpoint. In this scenario, the set of metadata stored in the tag table for the memory allocation includes a tag, a descriptor, and a single left bounds.

In a third scenario, an allocation assigned to a slot stretches in both directions from the slot midpoint. The allocation has two or more granules to the right of the slot's midpoint and has two or more granules to the left of the slot's midpoint, but less than an extended number of granules in either direction. In this scenario, the corresponding tag table entry arrangement 610 can include a tag and a descriptor in respective tag table entries located on either side of the slot's midpoint indicated in a binary tree (e.g., 410, 510) applied to the tag table (e.g., 420, 520). In addition, the tag table entry arrangement 610 can include a left bounds entry adjacent to (e.g., to the left of) the descriptor. The tag table entry arrangement 610 can also include a right bounds entry adjacent to (e.g., to the right of) the tag. The left bounds entry can indicate how many granules in the allocation extend to the left of the slot's midpoint, and the right bounds entry can indicate how many granules in the allocation extend to the right of the slot's midpoint. In this scenario, the set of metadata stored in the tag table for the memory allocation includes a tag, a descriptor, a single right bounds, and a single left bounds.

For larger allocations, the extension of an allocation beyond the granules in the normal bounds frees the granules' associated entries in the tag table for use to indicate the extended bounds. Accordingly, freed entries associated with granules in an extended allocation may be used for representing the extended bounds.

By way of example, but not of limitation, for a 4-bit normal bounds entry, a single first extension (also referred to herein as 'normal bounds') can only be up to 16 (4 bits)×the smallest granule size. For example, if the smallest granule that can be allocated is 16 bytes, as shown in FIGS. 4 and 5, a single first extension can only be up to 16*16B, which equals 256B. For an extension beyond the first extension (e.g., 256B), extended bounds entries can be included in the tag table entry arrangement corresponding to the allocation. Multiple extended bounds entries in a tag table entry arrangement can be used to define the bounds of the allocation up to the maximum allocation size. A normal bounds entry on the right covers 16 granules to the right. Therefore, for extended bounds to the right, the descriptor can indicate that the bounds metadata to the right includes 64 bits across 16 entries to the right: 16 entries*4 bits/entry, which equals 64 bits. This covers allocations to the right for an entire 64-bit address space. Similarly, for extended bounds to the left, the descriptor can indicate that the bounds metadata to the left includes 64 bits across 16 entries to the left: 16 entries*4 bits/entry, which equals 64 bits. This covers allocations to the left for an entire 64-bit address space.

In a first scenario of an allocation with extended bounds, the allocation is assigned to a slot and has extended bounds to the right of the slot's midpoint and a single granule to the left of the slot's midpoint. In this scenario, the corresponding tag table entry arrangement 612 can include a tag and a descriptor in respective tag table entries located on either side of the slot's midpoint indicated in a binary tree (e.g., 410, 510) applied to the tag table (e.g., 420, 520). Since a 4-bit normal right bounds entry covers 16 granules to the right, the descriptor can indicate that the bounds metadata to the right extends for 64 bits across 16 entries to the right: 16 entries*4 bits/entry, which equals 64 bits. This covers allocations to the right for the entire 64-bit address space. Thus, the tag table entry arrangement 612 can also include sixteen right bounds entries to the right of the tag. The right bounds entries indicate how many granules in the allocation extend to the right of the slot's midpoint. In this scenario, the set of metadata stored in the tag table for the memory allocation includes a tag, a descriptor, and extended right bounds.

In a second scenario of an allocation with extended bounds, the allocation is assigned to a slot and has extended bounds to the left of the slot's midpoint and a single granule to the right of the slot's midpoint. In this scenario, the corresponding tag table entry arrangement 614 can include a tag and a descriptor in respective tag table entries located on either side of the slot's midpoint indicated in a binary tree (e.g., 410, 510) applied to the tag table (e.g., 420, 520). Since a 4-bit normal left bounds entry covers 16 granules to the left, the descriptor for extended bounds to the left can indicate that the allocation bounds are extended to the left (e.g., 16 entries*4 bits to cover the entire 64-bit address space). Thus, the tag table entry arrangement 614 can also include sixteen left bounds entries to the left of the descriptor. The left bounds entries indicate how many granules in the allocation extend to the left of the slot's midpoint. In this scenario, the set of metadata stored in the tag table for the memory allocation includes a tag, a descriptor, and extended left bounds.

In a third scenario of an allocation with extended bounds, the allocation is assigned to a slot and has extended bounds to the right and left of the slot's midpoint. In this scenario, the corresponding tag table entry arrangement 620 can include a tag and a descriptor in respective tag table entries located on either side of the slot's midpoint indicated in a binary tree (e.g., 410, 510) applied to the tag table (e.g., 420, 520). Since a 4-bit normal right or left bounds entry covers 16 granules to the right or left, respectively, the descriptor for extended bounds to the right and left can indicate that the allocation bounds are extended to the right and left (e.g., 16 entries*4 bits on both the left and right of the slot's midpoint to cover the entire 64-bit address space for the right extension and for the left extension). Thus, the tag table entry arrangement 620 can also include sixteen left bounds entries to the left of the descriptor and sixteen right bounds entries to the right of the tag. The left bounds entries indicate how many granules in the allocation extend to the left of the slot's midpoint. The right bounds entries indicate how many granules in the allocation extend to the right of the slot's midpoint. In this scenario, the set of metadata stored in the tag table for the memory allocation includes a tag, a descriptor, extended left bounds, and extended right bounds.

In further scenarios, an allocation assigned to a slot may include normal bounds on one side of the slot's midpoint and extended bounds on the other side of the slot's midpoint. In a first scenario of an allocation with mixed bounds, the allocation is assigned to a slot and has extended bounds to the right of the slot's midpoint and normal (not extended) bounds to the left of the slot's midpoint. In this scenario, the corresponding tag table entry arrangement 616 can include a tag and a descriptor in respective tag table entries located on either side of the slot's midpoint indicated in a binary tree (e.g., 410, 510) applied to the tag table. The descriptor in the tag table entry arrangement 616 can indicate that extended right bounds entries (e.g., 64 bits) and a single normal left bounds entry (e.g., 4 bits) correspond to the allocation. The left bounds entries indicate how many granules in the allocation extend (within normal bounds) to the left of the slot's midpoint. The right bounds entries indicate how many granules in the allocation extend to the right of the slot's midpoint (as extended bounds). In this scenario, the set of metadata stored in the tag table for the memory allocation includes a tag, a descriptor, a single left bounds, and an extended right bounds.

In a second scenario of an allocation with mixed bounds, the allocation is assigned to a slot and has extended bounds to the left of the slot's midpoint and normal (not extended) bounds to the right of the slot's midpoint. In this scenario, the corresponding tag table entry arrangement 618 can include a tag and a descriptor in respective tag table entries located on either side of the slot's midpoint indicated in a binary tree (e.g., 410, 510) applied to the tag table. The descriptor in the tag table entry arrangement 618 can indicate that extended left bounds entries (e.g., 64 bits) and a single normal right bounds entry (e.g., 4 bits) correspond to the allocation. The left bounds entries indicate how many granules In the allocation extend to the left of the slot's midpoint (as extended bounds). The right bounds entries indicate how many granules in the allocation extend (within normal bounds) to the right of the slot's midpoint. In this scenario, the set of metadata stored in the tag table for the memory allocation includes a tag, a descriptor, a single right bounds, and an extended left bounds.

Figure 7:
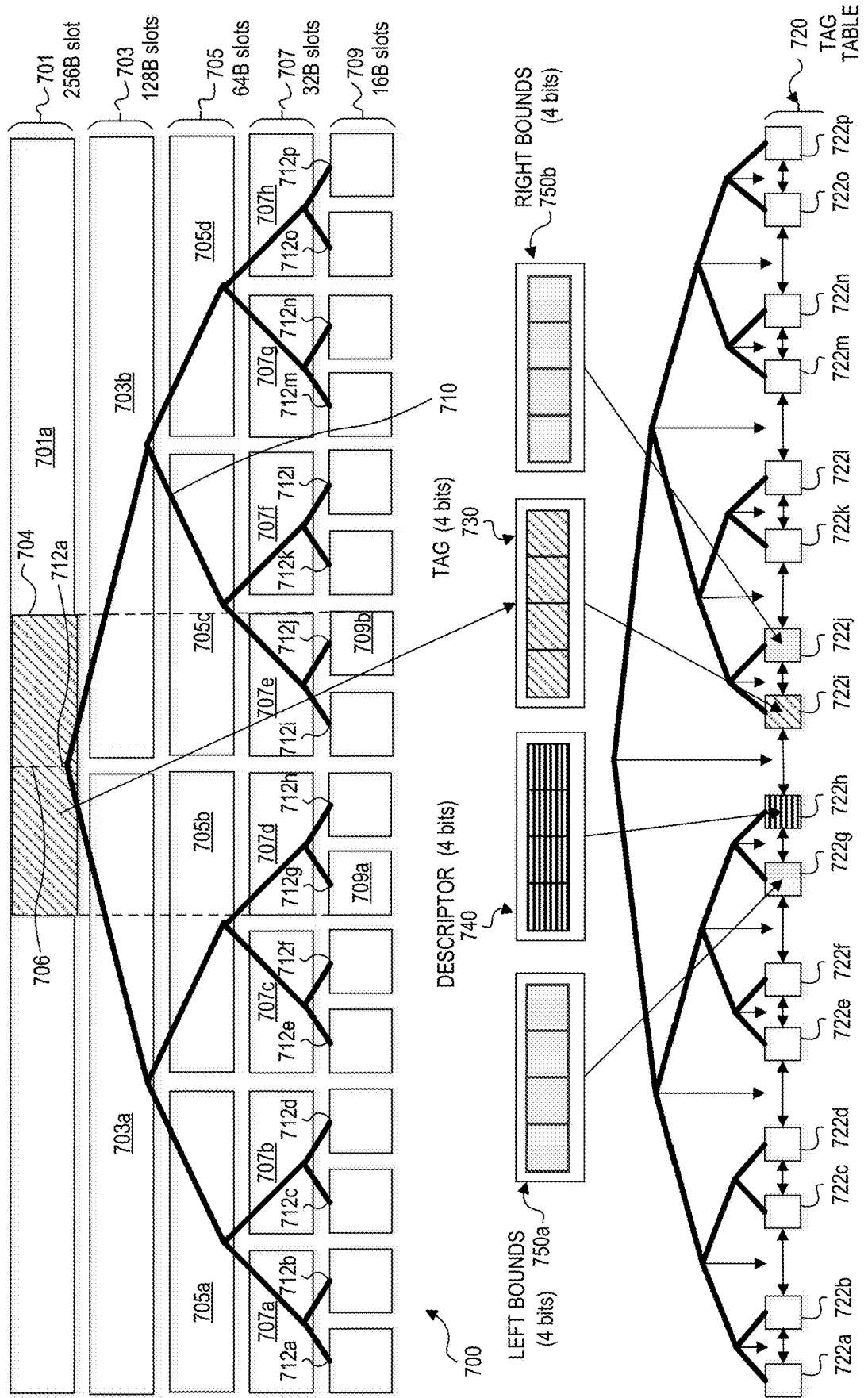
FIG. 7 of yet another allocation in a memory space illustrating a binary tree and corresponding allocation metadata in a tag table.

FIG. 7 is a graphical representation of a memory space 700 and the selection of an index of a metadata location in a tag table for a particular memory allocation having a power size that can include at least four granules (e.g., 64B) but not more than a maximum number of granules (e.g., 16 granules or 256B) within normal bounds in the memory space 700. Memory space 700 illustrates memory (e.g., heap) that is conceptually divided into overlapping power of two sized slots, as previously described with reference to memory space 400 of FIG. 4 and memory space 500 of FIG. 5. For each power of two size, the memory space 700 can be divided into a different number of slots. For example, the memory space can be divided into one 256-byte (256B) slot 701, two 128-byte (128B) slots 703, four 64-byte (64B) slots 705, eight 32-byte (32B) slots 707, and sixteen 16-byte (16B) slots 709.

The midpoints of the slots in memory space 700 form a binary tree 710 superimposed thereon, which is similar to the binary tree 410 over memory space 400 of FIG. 4 and binary tree 510 over memory space 500 of FIG. 5. As shown and described herein (e.g., with reference to FIG. 2), non-overlapping memory allocations can be assigned to respective slots. Each memory allocation crosses a midpoint of the slot to which the memory allocation is assigned. For example, a memory allocation 704 in memory space 700 is assigned to a single 256-byte slot 701a. Memory allocation 704 crosses a midpoint 706 of the 256-byte slot 701a. The slot size of the particular slot to which a given memory allocation is assigned can be determined based on a Po2 size metadata encoded in size metadata portion (e.g., 202) of an encoded pointer (e.g., 210) generated for the given memory allocation. The location of the slot can be determined based on the Po2 size metadata and the address bits corresponding to the immutable portion (e.g., 206) of an address portion (e.g., 209) of the encoded pointer generated for the memory allocation.

In one embodiment shown in FIG. 7, a tag table 720 can be created to hold a tag for each allocation assigned to a slot in contiguous memory. Tag table 720 is one example of tag table 150 shown in memory circuitry 130 of FIG. 1. Tag table 720 may have the same or similar configuration as tag table 520 of FIG. 5, where the tag table 520 only needs to represent the leaf entries and may omit entries corresponding to midpoints of slots having a power size greater than one granule. Also, as previously described with reference to tag table 420 of FIG. 4, the techniques described herein can be applied to any region of memory that is embodied as a contiguous set of memory (e.g., linear space, physical memory, memory pages, etc.), in which one tag is set for the entire region.

In FIG. 7, memory allocation 704 is assigned to a slot 701a having a power size of 16 granules (or 256 bytes), which is larger than the power size of a single 16-byte granule. Memory allocation 704 includes exactly four granules that cross the midpoint of the slot 701a. The size of memory allocation 704 is illustrated by dashed lines from the allocation to 16-byte slots 709a and 709b. Because the power size for slot 701a is larger than just one granule, the slot 701a includes both adjacent table entries (to the midpoint) of the lowest power by definition as the allocation will always cross the midpoint of the best fitting slot. For memory allocation 704, both entries 722h and 722i adjacent to the midpoint of slot 701a are used as part of a tag table entry arrangement. A descriptor 740 is stored in the left entry 722h and a tag 730 is stored in the right entry 722i. The descriptor 740 can define how additional adjacent entries in tag table 720 are interpreted vis a vis the memory allocation 704. Right bounds information 750b is stored in a third entry 722j to indicate the right bounds of memory allocation 704 (e.g., how many (16B) granules the memory allocation 704 extends to the right of the slot midpoint). Left bounds information 750a is stored in a fourth entry 722g to indicate the left bounds of memory allocation 704 (e.g., how many (16B) granules the allocation 704 extends to the left of the slot midpoint). In this scenario, the number of granules that the memory allocation 704 extends to the left of the slot midpoint is two, and the number of granules that the memory allocation 704 extends to the right of the slot midpoint is two. In other embodiments, the bounds of a memory allocation may be counted in other units such as bytes, for example. Accordingly, the bounds information provides a value that corresponds to the particular unit being counted.

A discussion of memory accesses using embodiments described herein now follows. When a load/store operation for an encoded pointer is beyond the bounds, as measured by the midpoint of the slot determined by the pointer's power and address, an error condition is created. An error condition is also created when the power of two slot does not encompass the bounds. For example, a bound can specify a valid range beyond the slot size. This can occur when a pointer is incremented to the next slot and invalid data is loaded from the table. Zero may be defined as an invalid tag.

Bounds information and tag data for a particular allocation (e.g., bounds information in entries 722g and 722j, descriptor in entry 722h, and tag in entry 722i corresponding to memory allocation 704 in FIG. 7) may be cached at the processor core to avoid additional memory lookups for the same pointer or when pointer arithmetic is performed within the same data allocation. For example, software enumerating a 16-megabyte (MB) array may only require lookup of one tag from the memory tag table that can be cached along with its bounds information for the that same array pointer. This offers significant performance gains over potentially a million additional memory lookups by other memory tagging schemes that use memory tags for every granule (e.g., 16-kilobyte).

Figure 8:
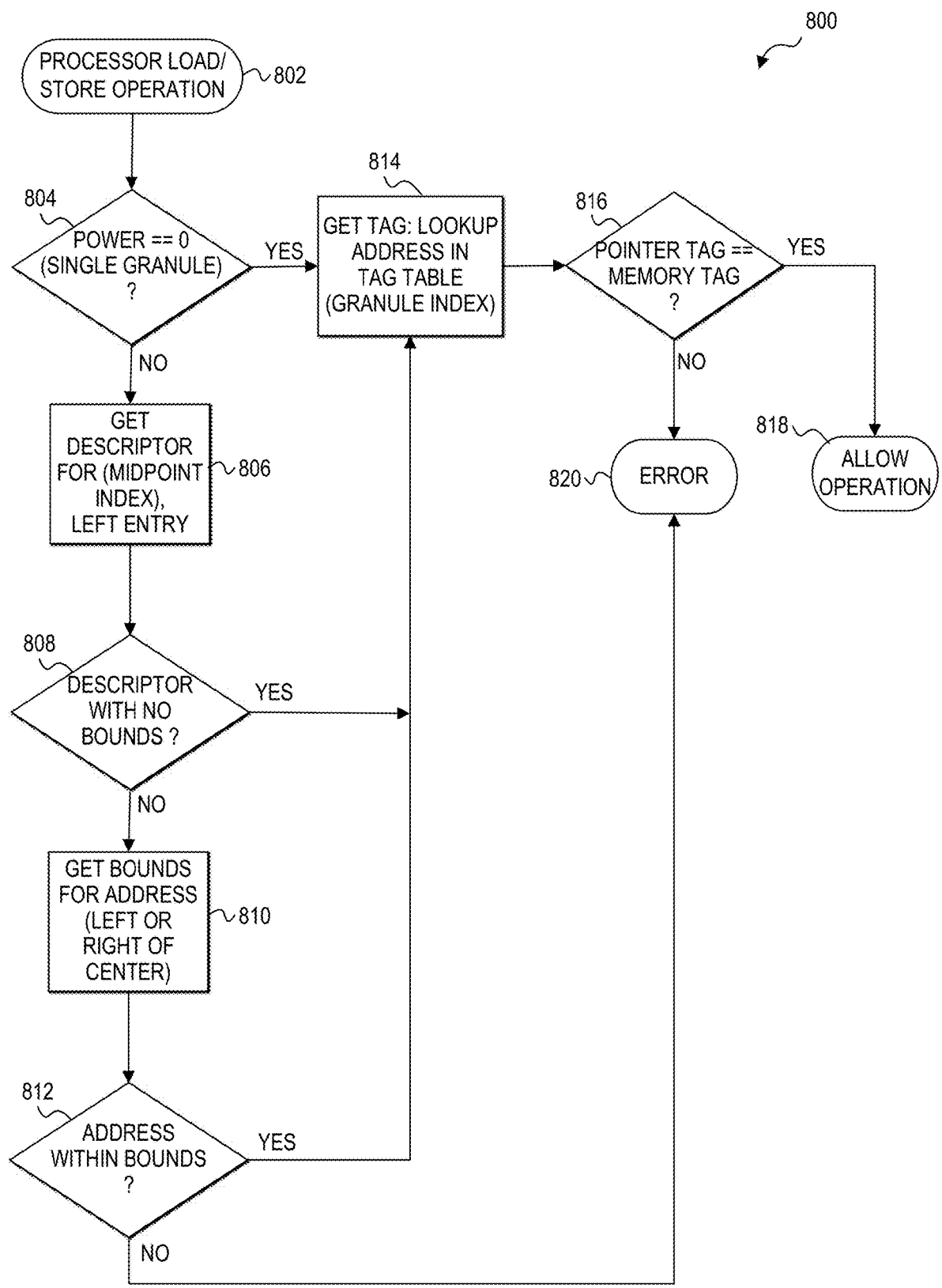
FIG. 8 is a flow diagram illustrating an example process for performing a tag check during a load or store operation according to at least one embodiment.

FIG. 8 is a flow diagram illustrating an example process 800 of a tag check during a load or store operation according to at least one embodiment. In at least one embodiment, process 800 is one possible embodiment of a tag check at 250 shown in FIG. 2. Process 800 may be performed upon execution of an instruction that includes a memory operation, such as a load instruction (e.g., 118) or a store instruction (e.g., 117), according to one embodiment. In one or more implementations, processor circuitry (e.g., 110) and/or an integrated memory controller (IMC) (e.g., 120) and/or a separate memory controller and/or memory access circuitry 120 performs one or more operations illustrated in process 800. In embodiments, this may also be called the memory management unit (MMU).

At 802, a memory operation request in the form of a load or store operation, for example, may be received by a processor. The load or store operation may be based on an encoded pointer (e.g., 180, 210, 310) to a memory address in a memory allocation where data or code is to be read or stored.

At 804, a determination is made as to whether the power represented in the size metadata field (e.g., 202) in the encoded pointer corresponds to a single granule in memory. For example, if the size metadata field contains data having a value of zero (0), the data represents the zeroth ($0^{th}$) power, which corresponds to a single granule ($2^0=1$). A single granule is the smallest size of allocatable memory. In this example, a single granule is 16 bytes. Therefore, if a memory allocation is 16 bytes, then the data in a size metadata field of an encoded pointer to the memory allocation could have a value of zero (0) representing the zeroth power. Accordingly, if the data in a size metadata field equals zero, then this indicates that the load/store operation is targeting an allocation of a single granule.

At 814, a memory tag corresponding to the allocation referenced by the encoded pointer is obtained from an entry in a tag table based on a midpoint index of a slot to which the allocation is assigned. The tag table is a table created for a memory space of an application. The tag table contains memory tags stored in respective tag table entries for allocations in the memory space. The midpoint index of the slot corresponds to two adjacent entries in the tag table. In at least one embodiment, the right entry holds the memory tag. If the tag table entry arrangement contains a descriptor, then the left entry holds the descriptor. The memory tag for the allocation can be obtained from the right entry based on the midpoint index.

At 816, the memory tag can be compared to the tag obtained from the encoded pointer. If no conflict is detected (e.g., if the memory tag matches or otherwise corresponds to the pointer tag), then at 818, the load/store operation is allowed. However, if at 816 a conflict is detected (e.g., if the memory tag and the pointer tag do not match or otherwise do not correspond), then at 820 an error condition is created. An error condition may trigger an error, exception, and/or fault so that software, such as a software exception handler, can handle the error.

With reference again to 804, if the size metadata field contains data that does not equal zero (e.g., is greater than zero), then this indicates that the allocation, and the slot to which the allocation is assigned are larger than a single granule. Accordingly, a descriptor and possibly bounds information is also checked. At 806, a descriptor is obtained from a left entry based on the midpoint index of the slot to which the allocation is assigned.

At 808, a determination is made as to whether the descriptor indicates that bounds entries are present in the set of metadata in the tag table entry arrangement corresponding to the allocation. If the descriptor indicates that no bounds entries are present, this indicates that the allocation is only two granules in size. Thus, flow may pass to 814, where the memory tag is obtained. The tag check is then performed at 816. If the tag check passes, then the operation is allowed at 818. If the tag check fails, then an error condition is met at 820, and appropriate action is taken (e.g., error is raised, program is terminated, etc.).

With reference again to 808, if a determination is made that the descriptor indicates that one or more bounds entries are present, this indicates that the allocation extends to the left, to the right, or to both the left and right of the slot midpoint. The descriptor may define how to interpret the additional adjacent entries. For example, the descriptor may indicate whether the allocation extends to the left of the slot midpoint, to the right of the slot midpoint, or to both the left and right of the slot midpoint. The descriptor may also indicate that a single bounds entry corresponds to the allocation extending to the left of the midpoint and/or that a single bounds entry corresponds to the allocation extending to the right of the midpoint. The descriptor may further indicate that multiple bounds entries correspond to the allocation extending to the left of the midpoint and/or that multiple bounds entries correspond to the allocation extending to the right of the midpoint. At 810, the bounds are obtained from the tag table based on the information determined from the descriptor.

At 812, once the presence of bounds metadata of the allocation is determined based on the descriptor and the relevant bounds entry or entries are obtained from the tag table, a determination is made as to whether the address referenced in the encoded pointer is within the bounds indicated by the bounds metadata. If the address is not within the bounds indicated by the bounds metadata, then an error condition is met at 820, and appropriate action is taken (e.g., error is raised, program is terminated, etc.).

If the address is within the determined bounds, however, then flow may pass to 814, where the memory tag is obtained. The tag check is then performed at 816, to determine whether the tag encoded in the pointer matches the tag obtained from the tag table. If the tag check passes, then the operation is allowed at 818. If the tag check fails, then an error condition is met at 820.

In one or more embodiments, a pointer used in a load or store operation can include a tag and a locator (e.g., memory address). The pointer may be cryptographically encoded or non-cryptographically encoded. For example, a portion of an encoded pointer (e.g., 210) may be encrypted to produce a cryptographically encoded pointer. In one example, tag metadata (e.g., 204) and/or a some or all of the immutable portion (e.g., 206) may be encrypted. Encryption may be performed using a tweakable block cipher using a key and a tweak as input. The tweak may include portions of the encoded pointer (e.g., size metadata field 202, a portion of the immutable address bits that are not being encrypted). These cryptographically encoded pointers or non-cryptographically encoded pointers may be used in load and store operations according to one or more embodiments disclosed herein. In one example, the tag and at least a portion of the locator (e.g., memory address) may be encrypted using cryptographic computing to make the pointers and the tags unforgeable.

In an alternative embodiment, a terminator memory tag may be used to indicate the end of the bounds to the left and/or to the right. If a memory tag is used to indicate the end of bounds to the left, the tag table entries can be checked to the left of the midpoint index for bound entries and the tag entry. If a memory tag is used to indicate the end of bounds to the right, the tag table entries can be checked to the right of the midpoint index for bound entries and the memory tag entry. If bound entries contain all ones (e.g., 7) then this indicates that the bound of the allocation continues. The next set of nibbles is read to get extended bounds.

In one embodiment, the tag table can be protected using cryptography (e.g., encryption and decryption). In another embodiment, the tag table can be protected with memory range registers to ensure that only special Instruction Set Architecture (ISA) can set the tags in the tag table. For example, a new instruction (e.g., MOVTAG) may be used to store tag data and bounds information in the appropriate entries in a tag table. Cryptography or memory range registers may be used to protect the tag table to ensure that only special instruction set architecture (ISA) instructions can set tags (e.g., new instruction MOVTAG (tag, bounds)).

Bounds information can also be used to expand tag space. For example, small allocations can be managed so that they are not mapped to large tag slots and vice versa. In one embodiment, the algorithm to enable the use of one tag per allocation is based on contiguous linear addresses and an associated linear tag table. In other embodiments, the algorithm to enable the use of one tag per allocation is based on contiguous physical addresses and an associated physical tag table. In yet other embodiments, the algorithm may enable the use of tags based on any other contiguous memory (e.g., memory pages).

Figure 9A:
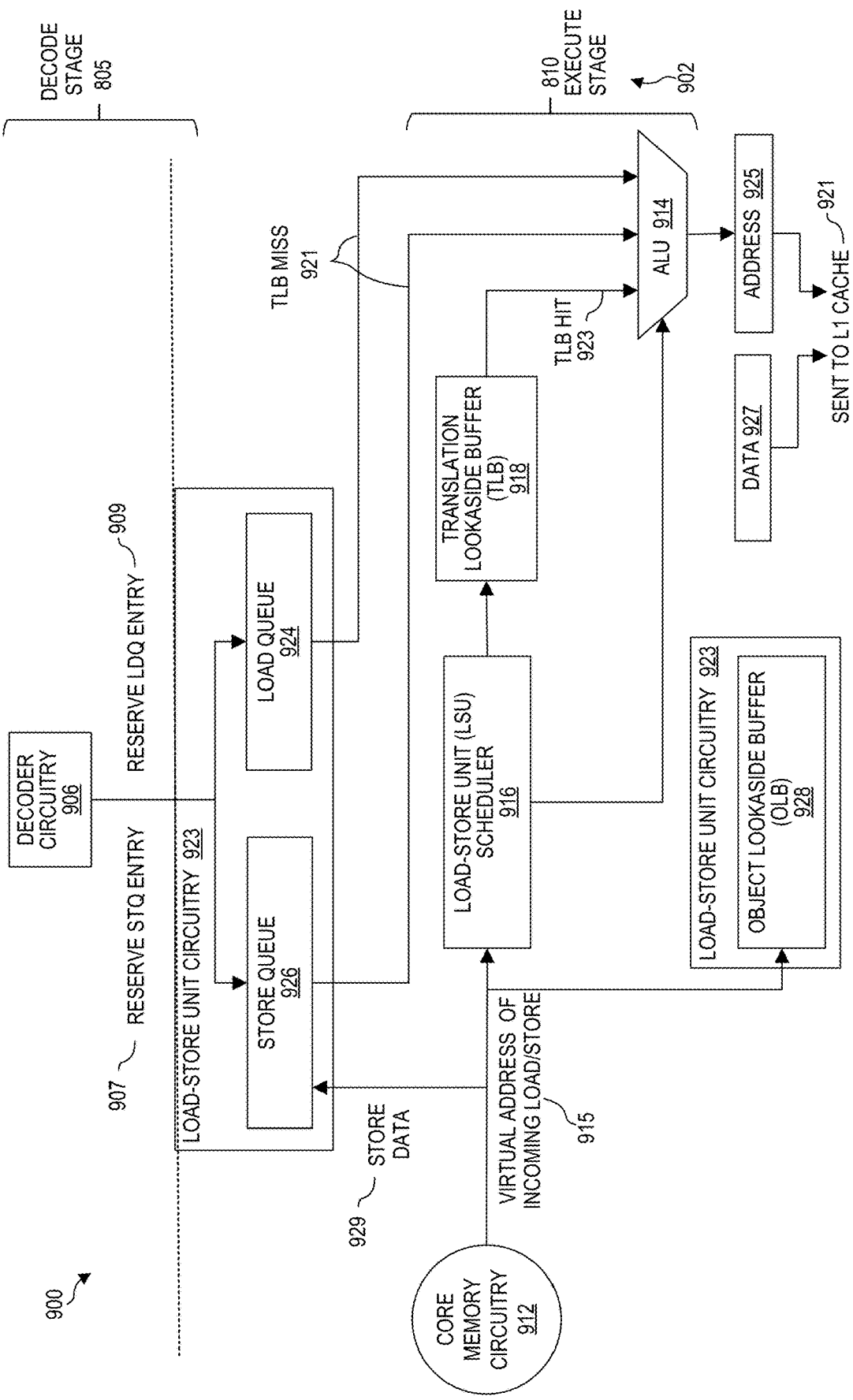
FIG. 9A is a block diagram illustrating a portion of a memory pipeline of an example processor for implementing a memory safety system according to examples.

FIG. 9A is a block diagram illustrating a selected (and simplified) portion of a memory pipeline of an example processor 900. Processor 900 illustrates a simplified and selected portion of processor circuitry (e.g., similar to processor circuitry 110). Like processor circuitry 110, processor 900 is configured with a memory safety system for validating memory accesses with one-tag tagging and using efficient caching and queueing of metadata. In at least one example, processor 900 is configured as a simplified BOOM core, which is an open-source RISC-V (Reduced Instruction Set Computer) written in the Chisel language. A BOOM core implements pipeline stages similar to other modern out-of-order processors.

Example components of the processor 900 include decoder circuitry 906 and core memory circuitry 912. Core memory circuitry 912 represents the portion of processor 900 that manages memory access requests (e.g., load, store, fetch, etc.) and includes a load/store unit scheduler 916, and an arithmetic logic unit (ALU) 914. Processor 900 also includes memory components such as a load queue 924, a store queue 926, a translation lookaside buffer (TLB) 918, and an object lookaside buffer (OLB) 928. In at least some examples, load queue 924, store queue 926, TLB 918, and OLB 928 may be part of load-store unit circuitry 923, and OLB 928 may be located in parallel with the LSU scheduler 916. It should be apparent that the concepts disclosed herein could be implemented in any other suitable processors, including processors providing an in-order pipeline.

In some examples the load queue 924 and the store queue 926 may be combined into a single load-store queue. The load queue 924 is a data structure that holds memory load operations that have been issued by the processor but not yet completed. The address of the data to be loaded may be added to the load queue along with other information needed to perform the operation. The store queue 926 is a data structure that holds memory store operations that have been issued by the processor but not yet completed. The address in memory where the data is to be stored may be added to the store queue along with other information needed to perform the operation.

The object lookaside buffer 928 is a hardware memory component, such as cache or content addressable memory (CAM), and may be configured in load-store unit circuitry 923 in at least some examples. The OLB 928 is used to store allocation metadata generated for a memory allocation. A memory allocation is associated with each memory access instruction (e.g., load or store). A memory allocation is associated with a store instruction if an address range of the memory allocation contains the address of the memory location where the data is to be stored. A memory allocation is associated with a load instruction if an address range of the memory allocation contains the address of the memory location from which the data is to be obtained. A single memory allocation is associated with each memory access instruction that accesses a memory location within that allocation. Sets of metadata of respective memory allocations are used to populate the OLB 928 when the memory allocations are accessed. The sets of metadata of respective memory allocations can include: i) tag values, ii) tag values and descriptors, and/or iii) tag value, descriptors, and bounds. As will be further described herein, the OLB 928 is designed to enable efficient queueing and caching for memory tag check operations performed for load and store operations.

FIG. 9A illustrates a simplified portion 902 of an example out-of-order pipeline for processor 900. The pipeline portion 902 includes a decode stage 905 and an execute stage 910. One or more operations can be performed in each of these processor pipeline stages. For example, decoder circuitry 906 obtains machine language instructions from memory and produces output that corresponds to a set of commands that the processor (e.g., CPU) can perform. When a load (e.g., load, read, fetch, etc.) memory instruction is decoded, the decoded instruction is assigned an index for a load queue (LDQ) entry 909 in the load queue 924 of load-store circuitry 923. When a store (e.g., store, write, etc.) memory instruction is decoded, the decoded instruction is assigned an index for a store queue (STQ) entry 907 in the store queue 926 of load-store unit circuitry 923. In some implementations, the load queue 924 and store queue 926 may be provided in a combined load-store queue. After the memory unit calculates a memory address 915 and data 929, this information is passed to the load-store unit circuitry 923. Then, the incoming load or store is scheduled through the load-store unit scheduler 916.

A TLB lookup may be performed in the TLB 918 for the virtual address of the decoded memory access (e.g., load or store) instruction. If a TLB miss 921 occurs, the corresponding instruction can be retried after the TLB miss 921 is resolved. The TLB miss 921 can be resolved by, for example, performing a page walk on virtual address translation page tables to determine a physical address that is mapped to the virtual address of the load or store instruction. Once the TLB is resolved, the data 927 is sent to cache (e.g., level 1 (L1) cache) at 921. The physical address 925 may also be provided to the cache because typically, the L1 cache operates on the physical address (e.g., uses the physical address to index the data stored in the cache). For a load operation, the data in the cache may then be loaded into a register and used by subsequent instructions. For a store operation, the data in the cache may eventually be stored in physical memory.

Figure 9B:
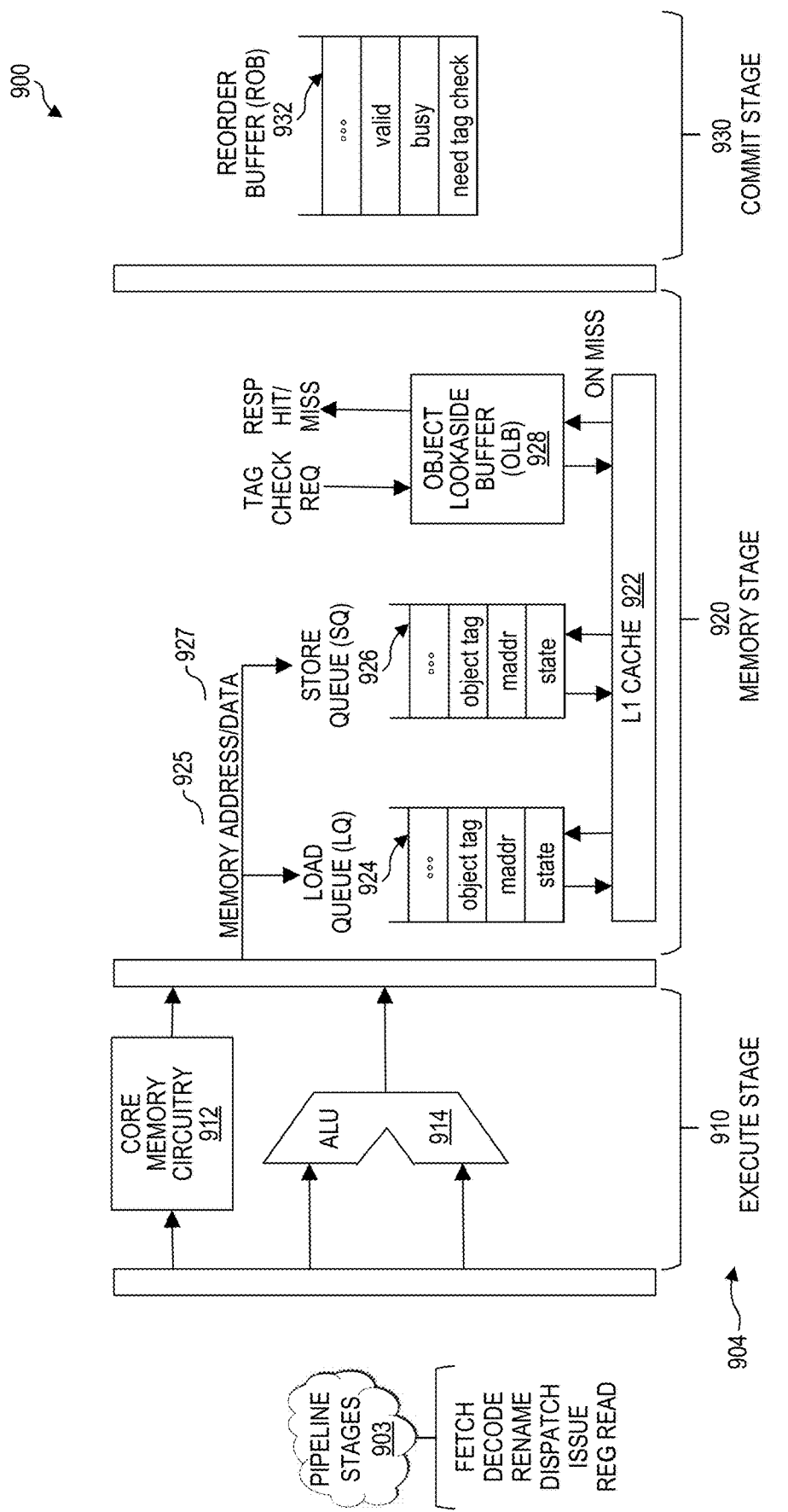
FIG. 9B is a block diagram illustrating additional components and pipeline stages of the example processor of FIG. 9A implementing the memory safety system according to examples.

FIG. 9B is a block diagram illustrating additional components and hardware configuration of the example processor 900 of FIG. 9A to implement a memory safety system with one-tag tagging with efficient queueing and caching. The additional components of processor 900 shown in FIG. 9A include memory access circuitry 911, a level 1 (L1) cache 922, and a reorder buffer 932. In at some examples, a memory access circuitry 911 may be configured to pass the full bitwidth of a memory address (e.g., 64 bits) to the load-store unit circuitry (e.g., load queue 924 and store queue 926). The load queue 924 and store queue 926 may be extended with additional fields such as an object tag, a memory address, and state. In addition, the entries of the reorder buffer 932 may be extended with at least one additional bit to support precise exception. Additionally, at least one bit may be added to indicate whether an instruction requires a tag check.

FIG. 9B further illustrates another selected (and simplified) portion 904 of a memory pipeline of processor 900. The selected portion 904 of the pipeline stages includes the execute stage 910, a memory stage 920, and a commit stage 930. In addition, other pipeline stages 903 occurring prior to the selected execute, memory, and commit stages include fetch, decode, rename, dispatch, issue, and register read stages.

In the prior pipeline stages 903, a memory access instruction may fetched and decoded, among other possible operations (e.g., renaming, dispatching, issuing, register reading). The virtual address of the memory access instruction may be derived from a pointer encoded with metadata (e.g., size and tag). In the execute stage 910, the core memory circuitry 912 may be configured to pass the entire bitwidth (e.g., 64 bits) of the virtual address 915 to the load queue 924 or store queue 926, depending on whether the memory access instruction is a load or store instruction. The core memory circuitry 912 may also pass data to store queue 926 for store instructions.

In the memory stage 920, various information needed to execute the load or store operations is stored in the load queue 924 or store queue 926. Such information can include, but is not necessarily limited to, virtual address of the memory access instruction, data (for a store instruction), an object tag, the virtual address size (maddr), and state information. The state can indicate the state (e.g., initial state, ready state, wait state, and done state) of a tag check operation for the memory access instruction. The object tag (e.g., 184, 204, 302) may be derived from the encoded pointer (e.g., 180, 210, 310) of the memory access instruction. The object tag is assigned to the memory allocation that includes the memory address to be accessed. The memory allocation could be an allocation returned from a memory allocator or an object on stack.

The OLB 928 is populated with allocation metadata from memory. When a tag check is to be performed for a memory access instruction, the OLB 928 can receive a tag check request and the OLB 928 can be searched using an appropriate index to locate allocation metadata of the memory allocation to be accessed. If allocation metadata corresponding to the memory allocation to be accessed is not found in the OLB 928 (e.g., an 'OLB miss'), then memory can be searched. For example, a tag table (e.g., 150) in memory may be searched. Once found, the allocation metadata may be used to populate the OLB 928 and indexed. The allocation metadata can include an object tag and, for at least some allocations, a descriptor and/or bounds. The L1 cache 922 can be used to store load data that is loaded based on a load instruction in the load queue 924, data to be stored based on a store instruction in the store queue 926, and allocation metadata from memory that is used to populate the OLB 928.

In commit stage 930, the results of the executed instructions can be written back to a register file (e.g., load instruction) or memory (e.g., store instruction). In a processor having an out-of-order pipeline, such as processor 900, the reorder buffer 932 tracks dependencies between instructions to ensure that the instructions are executed in the correct order. In the commit stage 930, the reorder buffer 932 is illustrated with 'need tag check' entry (e.g., 1 bit, 2 bits, or more) to indicate whether a tag check is needed for a memory access instruction.

A tag mismatch indicates that an unauthorized read/load/fetch or write/store happened. Typically, a tag mismatch triggers an exception and the error is reported to users. In one or more examples, however, other exception modes may be utilized to improve performance.

A first example for exception handling is a lazy exception mode. In the lazy exception mode, reporting a tag mismatch to users can be delayed. This means a time window can be opened between the time when an unauthorized memory access happens and the time when the CPU indeed detects the error.

A second example for exception handling is a precise exception mode. In the precise exception mode, an instruction retirement can be delayed until tag checks are finished. This can ensure that any architectural state changes by unauthorized load/store/fetch instructions are prevented. In this example, a new condition can be added to the existing commit conditions so that any memory instruction can be committed only after the instruction is validated. For example, currently an instruction can be committed when the instruction becomes a reorder buffer head or a 'busy' bit in the reorder buffer is not set (e.g., '0'). A new condition can be implemented with the 'needTC' bit. If the needTC bit is set, then a tag check for the instruction is still needed. If the needTC bit is not set, however, then the tag check has already been performed and the instruction can be retired assuming other conditions are met.

Figure 9C:
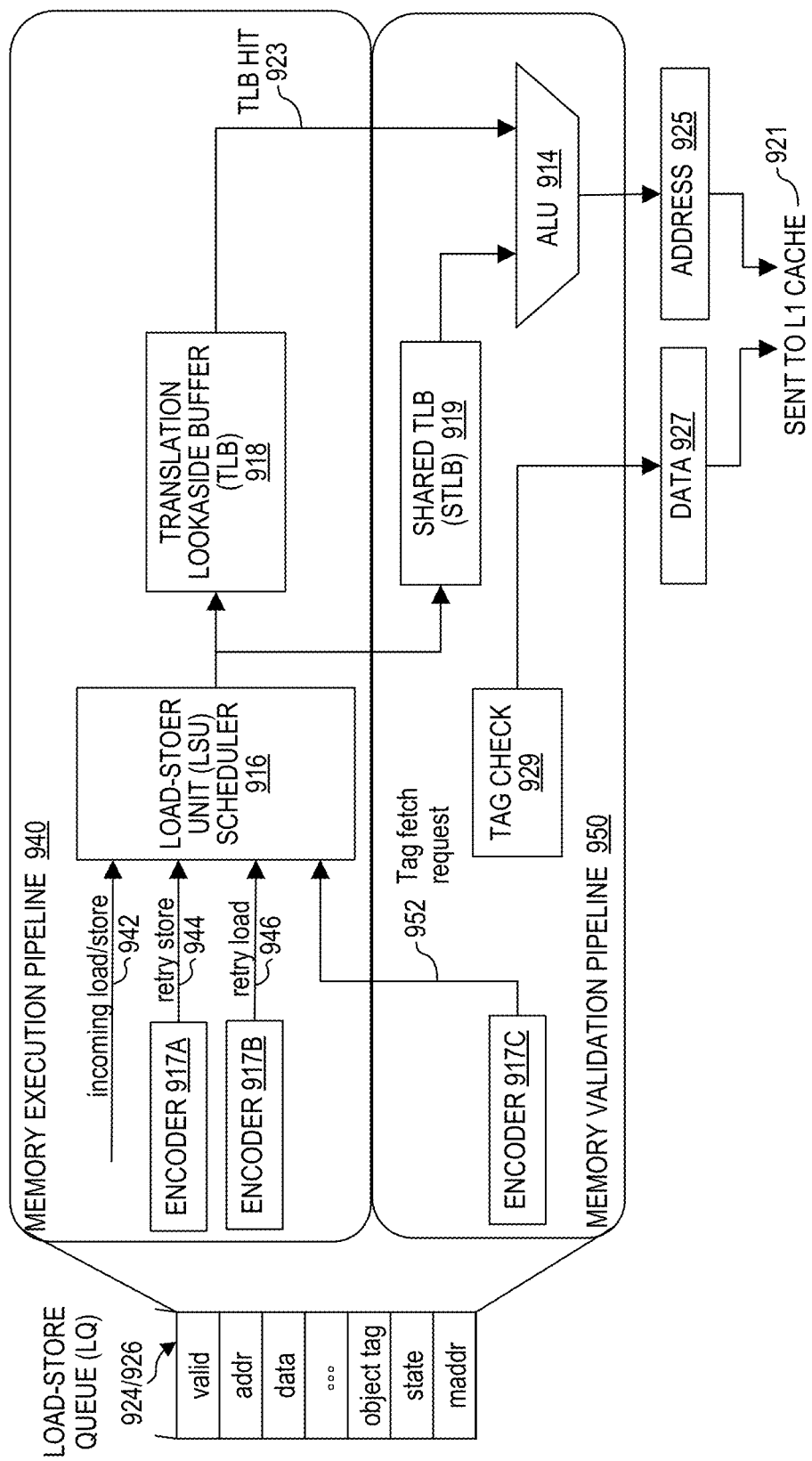
FIG. 9C is a block diagram illustrating a memory execution pipeline and validation pipeline according to examples.

FIG. 9C is a block diagram illustrating a memory execution pipeline 950 and a memory validation pipeline 940 of the processor 900 of FIGS. 9A and 9B according to examples. The memory execution pipeline 940 and memory validation pipeline 950 may be part of the execute state (e.g., 920). In this example, the object lookaside buffer 928 is omitted.

Various types of memory access requests are scheduled through the LSU scheduler. For example, an incoming load/store instruction 942, a store instruction to be retried 944, and a load instruction to be retried 946. Encoders 917A and 917B may be provided to prepare unsuccessfully executed load and store instructions to be retried. Retry requests 944 and 946 are generated for TLB-missed entries. For load instructions, encoder 917A selects an oldest, ready entry to execute. The load-store unit scheduler 916 is responsible for resource management and memory access request arbitration. The LSU scheduler 916 is responsible for resource contention management and memory access request arbitration. Since all the hardware units have limited input bandwidth, arbitrating signals such as memory access requests within the allowed bandwidth is crucial.

Tag-checking operations of a tag check algorithm 929 can be performed in the memory validation pipeline 950 operating in parallel with the existing memory execution pipeline 940. The memory execution pipeline 950 can be implemented by extending the load-store queue(s) 924/926 with additional fields (e.g., object tag, state, virtual address size) and provisioning an encoder 917C that keeps track of entries requiring tag checks. If a load instruction or store instruction in an entry in the load-store queue(s) 924/926 is determined to require a tag check, the encoder 917C may generate a tag fetch request 952 and have the request scheduled through the LSU scheduler 916. The tag fetch request 952 is a request for allocation metadata of a memory allocation associated with the load or store instruction in the load-store queue(s) 924/926 that was determined to need a tag check.

Once the tag fetch request 952 passes the LSU scheduler and is scheduled, the request can be handled in the existing execution paths. The allocation metadata can be fetched from memory (e.g., from a tag table 150). In one example, the existing execution path may include a shared TLB (STLB) 919. The shared TLB 919 can be used to perform virtual address to physical address translations of the virtual addresses of allocation metadata. For example, the virtual address of the tag table may be translated, and the allocation metadata may be located in the tag table based on a suitable index (e.g., virtual address of the allocation corresponding to the allocation metadata).

In this example, some resource-contention points may occur and increase performance overhead. For example, resource-contention points could include i) when the tag fetch request 952 is being arbitrated by the LSU scheduler 916, ii) when a lookup is performed in the TLB 918 for the virtual address of the tag fetch request, and/or iii) when the L1 cache 922 is accessed to obtain the allocation metadata fetched in response to the tag fetch request. These resource-contention points may cause non-trivial performance overhead by delaying the execution of regular memory instructions.

Figure 10:
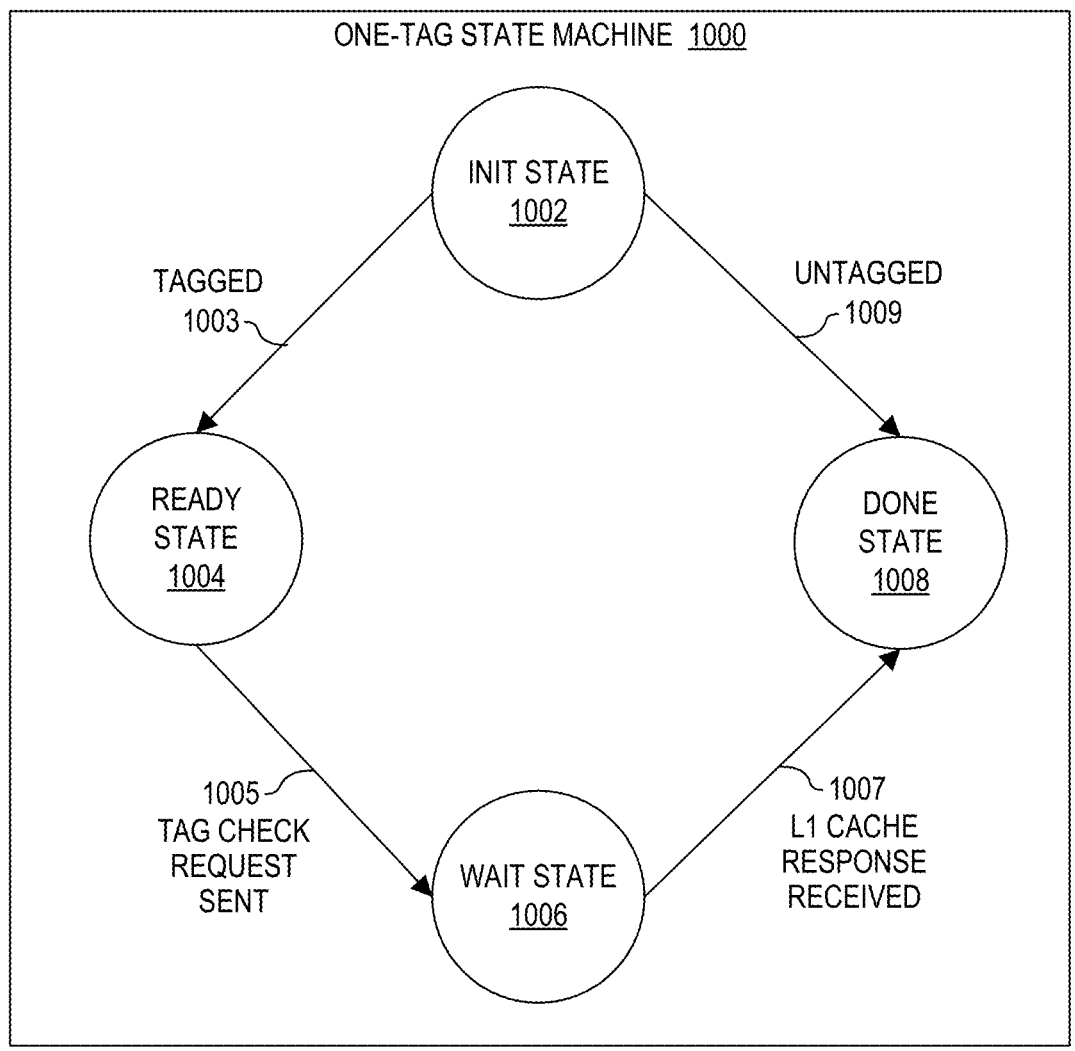
FIG. 10 is a block diagram illustrating an example state machine for per-allocation non-redundant metadata tag checks according to examples.

FIG. 10 is a block diagram illustrating an example state machine 1000 for per-allocation non-redundant metadata (e.g., one-tag) tag checks in a memory safety system according to examples. In a memory safety system with one-tag tagging, the state of a tag check for each entry in the load-store queue(s) 924/926 is tracked in state machine 1000. In an init state 1002, every memory access instruction in the load-store queue(s) 924/926 is checked to determine whether the instruction is tagged or untagged. For example, if a tag value is encoded in a memory address (e.g., in a pointer) of the memory access instruction, then the instruction is tagged. If a memory access instruction is tagged, then at 1003, the state goes to a ready state 1004 where a tag fetch request is generated. After the tag fetch request is scheduled and sent to the L1 cache 922, the state it transitions at 1007 to a wait state 1006. After the L1 cache response arrives, the state transitions at 1007 to the done state 1008. Alternatively, if a tag value is not encoded in a memory address (e.g., in a pointer) of the memory access instruction, then the instruction is not tagged. If the memory access instruction is not tagged, then at 1009, the state transitions to the done state 1008.

Figure 11:
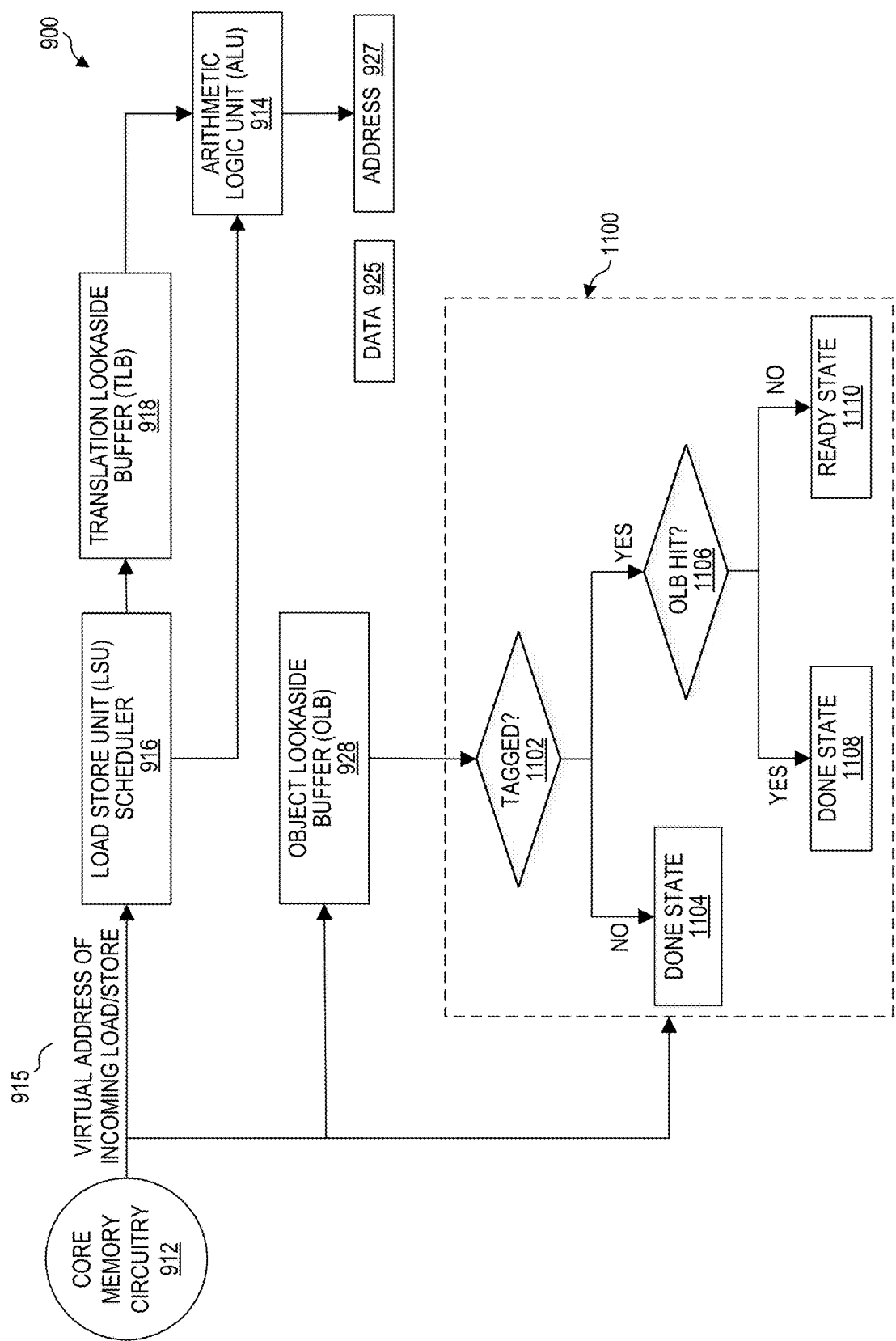
FIG. 11 is a block diagram illustrating the portion of the memory pipeline of the example processor of FIG. 9A with additional details related to determining state according to examples.

FIG. 11 is a block diagram illustrating a selected (and simplified) portion of the memory pipeline of the example processor of FIGS. 9A-9C with additional details related to determining state according to examples. FIG. 11 illustrates the core memory circuitry 912, the LSU scheduler 916, the TLB 918, and the ALU 914 during the execute stage. In addition, FIG. 11 illustrates the OLB 928 and state logic 1100 of the OLB 928 for determining the tag check state of a memory access instruction. The OLB 928 may be configured with state logic 1100 to mitigate resource-contention points in the memory validation pipeline 950 shown in FIG. 9C.

In one or more examples, an object lookaside buffer, such as OLB 928, can be configured to minimize possible resource contentions. In one example, OLB 928 can be virtually-indexed and virtually-tagged. Since the OLB 928 is located in parallel with the LSU scheduler 916, the OLB can receive virtual addresses of incoming load and stores. At 1102, the OLB can determine whether a received virtual address of an incoming load or store is tagged. A virtual address is tagged, for example, if the virtual address (or pointer) is encoded with a tag value (e.g., 184, 204, 302). The OLB is searched for based on the virtual indexing of the OLB, which will be further described herein. At 1106, a determination is made as to whether a tag hit or tag miss has occurred. A 'tag hit' occurs when an index associated with the virtual address is found in the OLB, and a 'tag miss' occurs when an index associated with the virtual address is not found in the OLB. When a tag hit occurs, then a tag check can be performed using the allocation data found in the OLB. In this scenario, the state of the memory access instruction transitions to a done state at 1108. If a tag miss occurs, then a tag check is not performed and the state of the memory access instruction transitions to a ready state at 1110. If the OLB determines that the virtual address is not tagged, then a tag check is not performed and does not need to be performed. Accordingly, the state of the memory access instruction transitions to the done state at 1104.

During the runtime of a program, as memory access instructions are executed for memory addresses in various memory allocations, the OLB is populated with sets of metadata (e.g., allocation metadata) for each memory allocation accessed by a memory access instruction. Thus, whenever the OLB contains a set of metadata for a memory allocation to be accessed by a load or store instruction, the OLB enables a tag check to be performed without generating extra memory requests, and no address translation is required. As a result, resource contentions can be minimized.

Figure 12A:
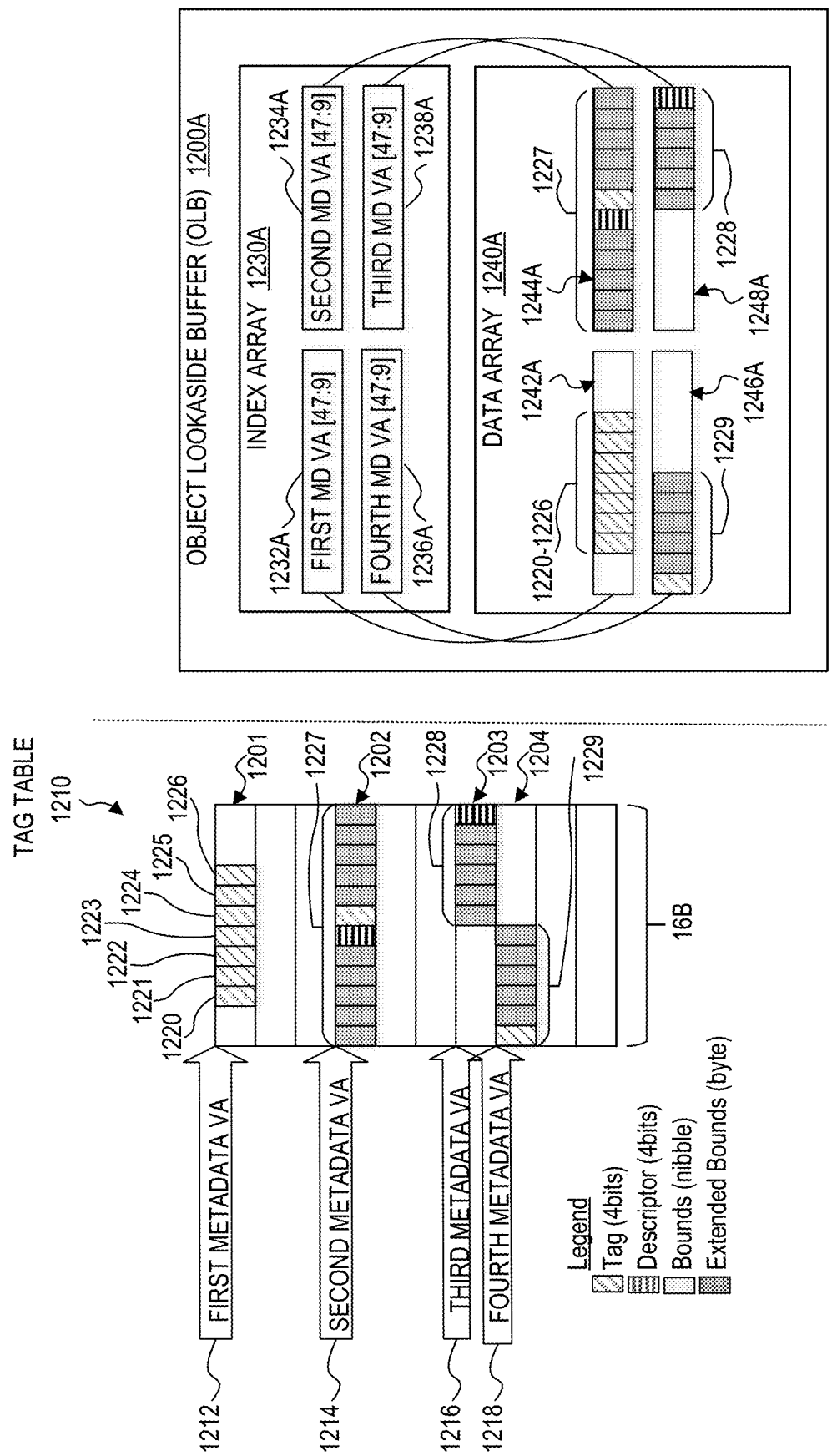
FIG. 12A is a block diagram illustrating one mode of indexing an object lookaside buffer implemented in a memory safety system according to examples.
Figure 12B:
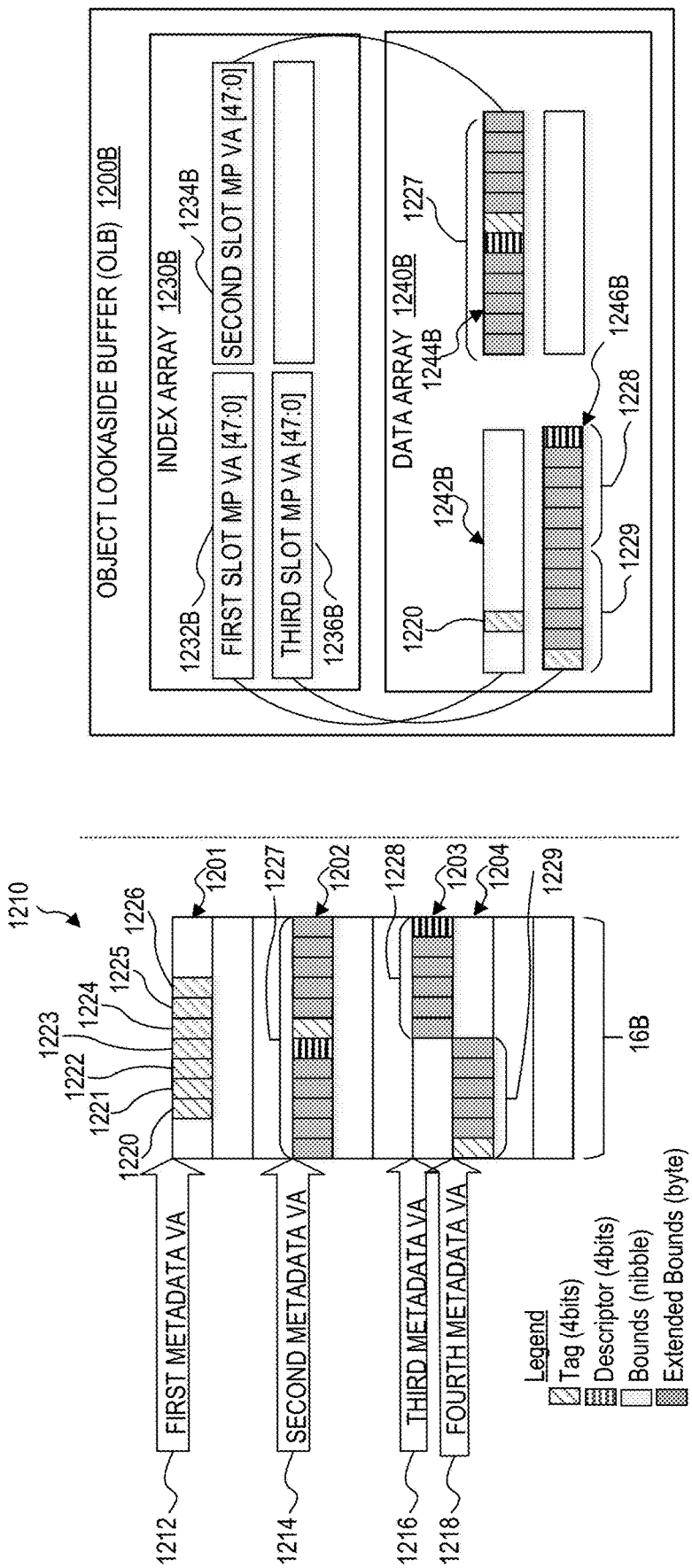
FIG. 12B is a block diagram illustrating another mode of indexing an object lookaside buffer implemented in a memory safety system according to examples.

Turning to FIGS. 12A-12C, FIGS. 12A-12C are block diagrams illustrating various examples for indexing an object lookaside buffer implemented in a memory safety system as previously described herein. FIGS. 12A-12C illustrate a tag table 1210 with examples of possible allocation metadata generated for memory allocations of a program. Tag table 1210 represents an example implementation of tag tables stored in memory that have been previously described herein (e.g., 150, 420, 520, 720). In the example scenario shown in FIGS. 12A-12C, tag table 1210 includes ten 16-byte tag table lines for holding allocation metadata. It should be noted that for brevity and to simplify the illustration, tag table 1210 is not drawn to scale and the tag table lines do not include a visual depiction of every byte in the 16-byte tag table lines. Furthermore, the tag table lines containing metadata are referenced as first, second, third, and fourth 16-byte lines to correspond to first, second, third, and fourth metadata virtual addresses of those lines for ease of description.

The tag table 1210 contains multiple sets of metadata (across four tag table lines) for multiple memory allocations, respectively, of a program. A first metadata virtual address 1212 points to a first 16-byte line 1201 of the tag table 1210 containing seven sets of metadata 1220-1226 for seven respective memory allocations of the program. A second metadata virtual address 1214 points to a second 16-byte line 1202 of the tag table 1210 containing an eighth set of metadata 1227 for an eighth memory allocation of the program. A third metadata virtual address 1216 points to a third 16-byte line 1203 of the tag table 1210 containing a left portion 1228 of a ninth set of metadata of a ninth memory allocation of the program. A fourth metadata virtual address 1218 points to a fourth 16-byte line 1204 of the tag table 1210 containing a right portion 1229 of the ninth set of metadata.

The location in the tag table 1210 of each set of metadata is determined as previously described herein. For a tag assigned to a particular memory allocation, the midpoint of a slot to which the particular memory allocation is assigned is determined. The midpoint of the slot is used to index the tag table to determine a location of the set of metadata. In this example, tags are provided in nibbles (4 bits) and therefore, the midpoint index may be the beginning or middle of a byte. The tag in the set of metadata is located to the right of the midpoint index.

In the example tag table 1210, the seven sets of metadata 1220-1226 corresponding to seven memory allocations are contained in the first 16-byte line 1201 at the first metadata virtual address 1212. Each set of metadata 1220-1226 includes a single tag (e.g., without a descriptor and without bounds), indicating that the corresponding memory allocation is a single granule, and thus a small allocation. Each tag 1220-1226 is located within the first 16-byte line 1201 based on translating the midpoints of the slots to which each of the corresponding memory allocations are assigned. It should be noted that, in other scenarios, a tag table line such as line 1201 could store the allocation metadata for other small objects (e.g., larger than a granule but not large enough to have extended bounds), where the allocation metadata in the tag table line has various formats including, for example: (i) a tag only, (ii) a tag and a descriptor, (iii) a tag, a descriptor, and normal bounds right, (iv) a tag, a descriptor, and normal bounds left, (v) a tag, a descriptor, normal bounds right, and normal bounds left, and/or (vi) any suitable combination thereof.

The eighth set of metadata 1227 corresponding to the eight memory allocation is contained in a second 16-byte line 1202 at second metadata virtual address 1214. The eighth set of metadata 1227 includes one tag, one descriptor, multiple right bounds (to the right of the tag), and multiple left bounds (to the left of the descriptor). The eighth set of metadata 1227 fills the second 16-byte tag table line 1202.

The ninth set of metadata corresponding to the ninth memory allocation is split between the third 16-byte line 1203 at the third metadata virtual address 1216 and the fourth 16-byte line 1204 at the fourth metadata virtual address 1218. A first metadata portion 1228 of the ninth set of metadata includes one descriptor and multiple left bounds (to the left of the tag). A second metadata portion 1229 of the ninth set of metadata includes one tag and multiple right bounds (to the right of the tag). The first and second metadata portions 1228 and 1229 fill a 16-byte line when combined. The allocation metadata for the ninth memory allocation may be stored on different lines 1203 and 1204 in the tag table because the slot midpoint translates to a boundary of a line in the tag table. For example, in the memory space 700 of FIG. 7, an object stored in a 1024-byte slot (e.g., covering the 256-byte slot 701 and three adjacent 256-byte slots) would have a slot midpoint at a 512B boundary that translates to the boundary of one of the 16-byte lines of the tag table. Thus, the allocation metadata split between two tag table lines 1203 and 1204 indicates that the associated ninth allocation is assigned to a large slot (e.g., 1024-byte slot or potentially larger).

FIG. 12A further illustrates an object lookaside buffer (OLB) 1200A that is configured to hold cached sets of metadata from the tag table 1210 that are indexed based on metadata virtual addresses of the sets of metadata in memory (e.g., in tag table 1210). In FIG. 12A, the example configuration of OLB 1200A includes a data array 1240A with buffer entries 1242A, 1244A, 1246A, and 1248A containing cached sets of metadata corresponding respectively to memory allocations of a program. The cached sets of metadata may have populated the OLB in response to their corresponding memory allocations being accessed by the program. In some cases, however, an entire line in the tag table may be used to populate a buffer entry even if some sets of metadata in the line are associated with memory allocations that have not yet been accessed by the program.

The OLB 1200A can be populated with a particular set of metadata in response to a memory access request for an object (or portion thereof) in a memory allocation associated with that particular set of metadata. Generally, to populate the OLB 1200A with a particular set of metadata corresponding to a memory allocation, the particular set of metadata may be fetched from a tag table (e.g., 1210) and cached in the OLB (if not already cached in the OLB). For smaller slots that do not exceed a certain slot threshold size (e.g., 512B in this example architecture), a set of metadata may be fetched from a line in the tag table and stored in a buffer entry of data array 1240B corresponding to the tag table line. For a larger slot that exceeds the slot threshold size (e.g., 512B in this example architecture), a set of metadata may be fetched from multiple lines in the tag table and stored in corresponding multiple buffer entries. Depending on the size of the OLB and the number of memory allocations of a program, stale (old) sets of metadata may be evicted when OLB 1200A is full.

OLB 1200A also includes an index array 1230A containing indexes into the data array 1240A for accessing the cached sets of metadata. In this example, the indexes in the index array 1230A are based on metadata virtual addresses. The index array 1230A contains indexes 1232A, 1234A, 1236A, and 1238A corresponding respectively to buffer entries 1242A, 1244A, 1246A, and 1248A in data array 1240A. In one example, a portion of a metadata virtual address (e.g., [47:9], or other suitable portion) is stored in index array 1230A per line (or buffer entry) containing one or more corresponding sets of metadata (or a portion of a corresponding set of metadata).

In response to a memory access request for data in a particular memory allocation, a midpoint virtual address of a slot to which the particular memory allocation is assigned can be determined. The slot midpoint virtual address can then be used to calculate a metadata virtual address and to index the OLB (e.g., the data array 1240A in OLB 1200A) based on the metadata virtual address. In one example, the slot midpoint virtual address can be translated to a location in a line of the tag table. The virtual address of the line is determined to be the metadata virtual address. Some embodiments may align each metadata virtual address to the size of each line of the tag table for the purpose of looking up the tag table line corresponding metadata byte. Storing the (potentially aligned) metadata virtual addresses (or portions thereof) in the OLB index array 1230A enables slot midpoint addresses to be used to lookup the individual buffer entries (or lines) in the OLB. For example, the midpoint of a slot is used to determine the metadata virtual address as illustrated and described, for example, with respect to FIGS. 5 and 7-8. An offset (the rest of the virtual address) is needed to determine the matching tag cached in the OLB 1200A. In one example, the offset may be calculated by translating the slot midpoint to a location within the tag table (e.g., 422z of FIG. 4, 522i of FIG. 5, 722i of tag table 720), and using the relative location within the aligned tag table line as the offset. If the object is small (e.g., one granule) and only a tag is stored, the offset selects the individual tag (e.g., nibble) in the array to be matched with the address tag. If the object is two granules or more, the offset can still be used to select the tag in the set of metadata for the allocation to be matched to the address tag, and is also used to locate the descriptor. The descriptor indicates the bounds of the allocation. The memory address in the pointer can be compared to the bounds to determine whether the targeted memory is within the allocated range. The individual tag is compared to In this example the starting metadata virtual addresses for each tag table line are 16-byte aligned. In other implementations, other suitable byte alignments may be used.

In the example scenario shown in FIG. 12A, the OLB 1200A depicts the contents of index array 1230A and data array 1240A after each of the nine sets of metadata (e.g., 1220, 1221, 1222, 1223, 1224, 1215, 1226, 1227, and combined 1228 and 1229) in tag table 1210 have been fetched (e.g., in response to an OLB miss) and cached and indexed in OLB 1200A. The first seven tags 1220-1226 in tag table 1210 are stored in a first buffer entry 1242A, the eighth set of metadata 1227 is stored in a second buffer entry 1244A, the second portion 1229 of the ninth set of metadata is stored in a third buffer entry 1246A, and the first portion 1228 of the ninth set of metadata is stored in a fourth buffer entry 1248A.

In the index array 1230A of FIG. 12A, the first index 1232A includes a portion (e.g., [47:9]) of the first metadata virtual address 1212 to index the seven sets of metadata 1220-1226 cached in the first buffer entry 1242A. The second index 1234A in index array 1230A includes a portion (e.g., [47:9]) of the second metadata virtual address 1214 to index the eighth set of metadata 1227 cached in the second buffer entry 1244A. The third index 1236A in index array 1230A includes a portion (e.g., [47:9]) of the fourth metadata virtual address 1218 to index the second portion 1229 of the ninth set of metadata cached in the third buffer entry 1246A. The fourth index 1238A in index array 1230A includes a portion (e.g., [47:9]) of the third metadata virtual address 1216 to index the first portion 1228 of the ninth set of metadata cached in the fourth buffer entry 1248A.

For large slot sizes, such as a slot to which the ninth memory allocation corresponding to the ninth set of metadata is assigned, allocation metadata can be stored across different 16-byte lines (e.g., granules) due to the byte alignment of the slot midpoint. In the example of FIG. 12A, large slot sizes exceed 512-bytes. In other examples, the tag table lines and OLB entries may be a different size (e.g., 8 bytes, 32, bytes, etc.) and thus, the slot threshold size may be correspondingly different. For allocations assigned to large slots, the state machine can be modified to generate a second fetch request to fetch the entire set of metadata, which results in two separate OLB entries (or potentially more) for one allocation.

With reference to an example scenario of a large slot indicated in FIG. 12A, the ninth memory allocation, which corresponds to the ninth set of metadata, is assigned to a large (e.g., 512B) slot. This is evident because the ninth set of metadata is split across two tag table lines 1203 and 1204 as portions 1228 and 1229. In response to a memory access request to a memory location within the ninth memory allocation, the ninth set of metadata is fetched. To fetch the entire ninth set of metadata (e.g., 1228 and 1229), a first load/fetch request is used to fetch the first portion 1228 of the ninth set of metadata, and a second load/fetch request is used to fetch the second portion 1229 of the ninth set of metadata. This results in two separate OLB entries 1229 and 1228 being used to store, respectively, the two portions 1229 and 1228 of the ninth set of metadata.

Using the metadata virtual address for indexing an OLB (e.g., 1200A) can be efficient for small memory allocations, but less efficient for large memory allocations. Small memory allocations can share the same buffer entry across multiple small slots to which the small memory allocations are assigned. Thus, for small memory allocations, the entry space utilization can be maximized by indexing the OLB with metadata virtual addresses. Large memory allocations by a program, however, can result in large slots to which a memory allocation is assigned occupying two buffer entries instead of one. Thus, for large memory allocations, space (e.g., multiple buffer entries) and resources (e.g., additional fetches for multiple buffer entries or tag table lines) can be wasted.

FIG. 12B illustrates the same tag table 1210 and contents as shown and described with respect to FIG. 12A. FIG. 12B further illustrates another object lookaside buffer (OLB) 1200B that is configured overcome the problem of some allocation metadata being split across multiple lines when the metadata could be contained in a single line (or fewer lines). In this example, OLB 1200B is configured to assign buffer entries per slot by using the slot midpoint virtual address as an index. Thus, each buffer entry can hold one cached set of metadata from the tag table 1210, and each cached set of metadata is indexed based on a midpoint virtual address of a slot to which a memory allocation associated with that cached set of metadata is assigned. The example configuration of OLB 1200B includes a data array 1240B with buffer entries 1242B, 1244B, and 1246B. Each buffer entry in the data array 1240B contains one cached set of metadata corresponding to one memory allocation of a program. The cached sets of metadata stored in the buffer entries 1242B, 1244B, and 1246B correspond respectively to memory allocations that have been accessed by the program.

The OLB 1200B can be populated with a particular set of metadata in response to a memory access request for an object (or portion thereof) in a memory allocation associated with that particular set of metadata. Generally, to populate the OLB 1200B with a particular set of metadata corresponding to a memory allocation, the particular set of metadata may be fetched from a tag table (e.g., 1210) and cached in a respective buffer entry of the OLB (if not already cached in the OLB). For a smaller slot that does not exceed a slot threshold size (e.g., 512B in this example architecture), a set of metadata may be fetched from a line in the tag table and stored in a single buffer entry of data array 1240B for that slot. For a larger slot that exceeds a slot threshold size (e.g., 512B in this example architecture), a set of metadata may be fetched from multiple lines in the tag table and stored consecutively in a single buffer entry (or possibly consecutive buffer entries if the set of metadata is larger than a buffer entry). Depending on the size of the OLB and the number of memory allocations of a program, stale (old) sets of metadata may be evicted when OLB 1200B is full.

OLB 1200B also includes an index array 1230B containing indexes into the data array 1240B for accessing the cached sets of metadata. In this example, the indexes of the index array 1230B are based on virtual addresses of midpoints of slots to which memory allocations associated with the respective sets of metadata are assigned. The index array 1230A contains indexes 1232B, 1234B, and 1236B corresponding respectively to buffer entries 1242A, 1244A, and 1246A in data array 1240A. In one example, a slot midpoint virtual address (e.g., [47:0], or suitable portion thereof) is stored in index array 1230B per line (or buffer entry) containing one corresponding set of metadata.

In response to a memory access request for data in a particular memory allocation, a midpoint virtual address of a slot to which the particular memory allocation is assigned can be determined. The slot midpoint virtual address can then be used as an index into the OLB (e.g., the data array 1240B in OLB 1200B). Storing the slot midpoint virtual addresses (or portions thereof) in the OLB index array 1230B enables slot midpoint virtual addresses to be used to lookup the individual buffer entries (or lines) in the OLB. An offset may be needed to determine the matching tag cached in the OLB 1200B, or the metadata may have a fixed justification in each OLB entry, e.g., being justified to start at the first byte in the OLB entry or to end at the last byte in the OLB. In one example, an offset may be calculated by translating the slot midpoint to a location within the tag table (e.g., 422z of FIG. 4, 522i of FIG. 5, 722i of tag table 720), and using the relative location within the aligned tag table line as the offset. If the object is small (e.g., one granule) and only a tag is stored, the offset selects the individual tag (e.g., nibble) in the array. If the object is bigger than one granule but not a large object, then an offset selects the individual tag (e.g., nibble) in the array. A descriptor can be identified based on its location relative to the tag, and the bounds indicated by the descriptor can be determined. If the object is large, then the first nibble of the buffer entry contains the tag. The descriptor is located at the end of the cached set of metadata and used to determine the bounds. Comparisons are made to both the tag and bounds (if any) cached in the OLB 1200B, to determine whether the memory access request is valid. Once the tag is identified in the buffer entry, the identified tag can then be used to compare to the tag encoded in the memory address (e.g., pointer) of the memory access request to determine if the memory access request is valid. If the memory allocation is larger than one granule, then once the bounds are identified in the buffer entry, the identified bounds can be compared to the memory address of the memory access request to determine whether the memory address being accessed is within the allocated range. In this example the slot midpoint virtual addresses are 16-byte aligned. In other implementations, the slot midpoints may assume another byte alignment.

In the example scenario shown in FIG. 12B, the OLB 1200B depicts the contents of the index array 1230B and the data array 1240B after the first set of metadata 1220, the eighth set of metadata 1227, and the ninth set of metadata (e.g., combined 1228 and 1229) in tag table 1210 have been fetched (e.g., in response to an OLB miss) and cached and indexed in OLB 1200B. The first tag 1220 in tag table 1210 is stored in a first buffer entry 1242B, the eighth set of metadata 1227 is stored in a second buffer entry 1244B, the second portion 1229 of the ninth set of metadata is stored in a third buffer entry 1246B, and the first portion 1228 of the ninth set of metadata is also stored in the third buffer entry 1246B. In this example of using slot midpoint virtual addresses for indexing the OLB, each buffer entry corresponds to a single slot and therefore, each set of metadata consumes the entirety of a buffer entry and no other sets of metadata are stored in the same buffer entry.

In the index array 1230B of FIG. 12B, the first index 1232B includes a first slot midpoint virtual address to index the first set of metadata 1220 cached in the first buffer entry 1242B. The second index 1234B in index array 1230B includes a second slot midpoint virtual address to index the eighth set of metadata 1227 cached in the second buffer entry 1244B. The third index 1236B in index array 1230B includes a third slot midpoint virtual address to index the ninth set of metadata (e.g., inclusive of portions 1228 and 1229) cached in the third buffer entry 1246B.

For large slot sizes, such as a slot to which the ninth memory allocation corresponding to the ninth set of metadata is assigned, allocation metadata split across different 16B granules can be fetched and put together in a single buffer entry. Thus, one buffer entry can represent the entire slot allocation. For small slots, however, the buffer entry space could potentially be wasted. For example, a 16-byte slot would require only a 4-bit tag in this example. Regardless of the tag size, however, the entire buffer entry is dedicated to the single tag. Thus, the remaining 124 bits would be unused.

FIG. 12C illustrates the same tag table 1210 and contents as shown and described with respect to FIGS. 12A and 12B. FIG. 12C further illustrates another object lookaside buffer (OLB) 1200C that is configured to overcome the issues of allocation metadata being split across multiple buffer entries and wasted buffer entry space for small allocations. In this example, OLB 1200C is configured to apply a hybrid indexing mode. OLB 1200B adaptively utilizes OLB indexing based on metadata virtual addresses (e.g., OLB 1200A of FIG. 12A) and OLB indexing based on slot midpoint virtual addresses (e.g., OLB 1200B of FIG. 12B). For small slot sizes, the OLB is indexed using the metadata virtual address, which fully utilizes the data array buffer entry space. For large slot sizes, the OLB is indexed using the slot midpoint virtual address, which results in data array entries representing the whole allocations.

OLB 1200C includes an index array 1230C containing indexes into the data array 1240C for accessing the cached sets of metadata. In this hybrid indexing example, the indexes in the index array 1230C can include virtual addresses that are modified to indicate whether a corresponding buffer entry is used to cache allocation metadata for an allocation assigned to a large slot or a small slot. In one nonlimiting example, a bit (also referred to herein as a 'slot-size bit') is appended to each virtual address of an index to provide an indication as to whether the index corresponds to a buffer entry containing allocation metadata associated with an allocation assigned to a large slot or a small slot based on some predefined slot threshold size. In one example, the slot-size bit is set (e.g., value of '1') for slot sizes that exceed the slot threshold size (e.g., 512B in this example). Conversely, the slot-size bit is not set (e.g., value of '0') for slot sizes that do not exceed the slot threshold size. It should be apparent that, alternative configurations are possible, and that the slot-size bit may be set to indicate small slots and not set to indicate large slots. For small slots, which have sizes that are equal to or smaller than the slot threshold size, metadata virtual addresses (e.g., OLB 1200A of FIG. A) are used for indexing. For large slots, which have sizes that are greater than the slot threshold size, slot midpoint virtual addresses (e.g., OLB 1200B of FIG. B) are used for indexing.

The example configuration of OLB 1200C further includes a data array 1240C with populated buffer entries 1242C, 1244C, and 1246C. In the example scenario of adaptive indexing shown in FIG. 12C, OLB 1200C depicts the contents of index array 1230C and data array 1240C after each of the nine sets of metadata (e.g., 1220, 1221, 1222, 1223, 1224, 1215, 1226, 1227, and combined 1228 and 1229) in tag table 1210 have been fetched (e.g., in response to an OLB miss) and cached and indexed in OLB 1200C.

The first seven sets of metadata (e.g., individual tags without a descriptor or bounds) are associated with allocations assigned to small slots (e.g., single granules in this scenario). The seven sets of metadata 1220-1226 are stored in a single first buffer entry 1242C. By storing the multiple individual tags 1220-1226 in the single buffer entry 1242C, space usage in that buffer entry is maximized. A portion (e.g., [47:8]) of the first metadata virtual address 1212 for the seven sets of metadata 1220-1226 is stored in the corresponding first index 1232C to the first buffer entry 1242C. In addition, the slot-size bit appended to the virtual address of the first index 1232C is configured (e.g., not set, having a value of '0') to indicate that the first index 1232C corresponds to a small object buffer entry, and therefore, is based on a first metadata virtual address 1212 of a line in tag table 1210 containing the seven sets of metadata.

The eighth set of metadata 1227 is associated with an eighth memory allocation. For purposes of this example, the eighth allocation is assumed to be assigned to a large slot (e.g., 1024B or bigger). The eighth set of metadata 1227 is stored in a second buffer entry 1244C. A virtual address (e.g., [47:0]) of a midpoint in a large slot to which the eighth memory allocation is assigned is stored in the corresponding second index 1234C to the second buffer entry 1244C. In addition, the slot-size bit appended to the virtual address of the second index 1234C is configured (e.g., set to '1') to indicate that the second index 1234C corresponds to a large slot buffer entry and therefore, is based on a slot midpoint virtual address of the large slot to which the eighth memory allocation is assigned.

The ninth set of metadata (including metadata portions 1228 and 1229) is associated with a ninth memory allocation. For purposes of this example, the ninth allocation is assumed to be assigned to a large slot (e.g., 1024B or bigger). The ninth set of metadata 1228 and 1229 is stored in a third buffer entry 1246C. A virtual address (e.g., [47:0]) of a midpoint in a large slot to which the ninth memory allocation is assigned is stored in the corresponding third index 1236C to the third buffer entry 1246C. In addition, the slot-size bit appended to the virtual address of the third index 1236C is configured (e.g., set to '1') to indicate that the third index 1236C corresponds to a large slot buffer entry and therefore, is based on a slot midpoint virtual address of the large slot to which the ninth memory allocation is assigned.

Figure 13:
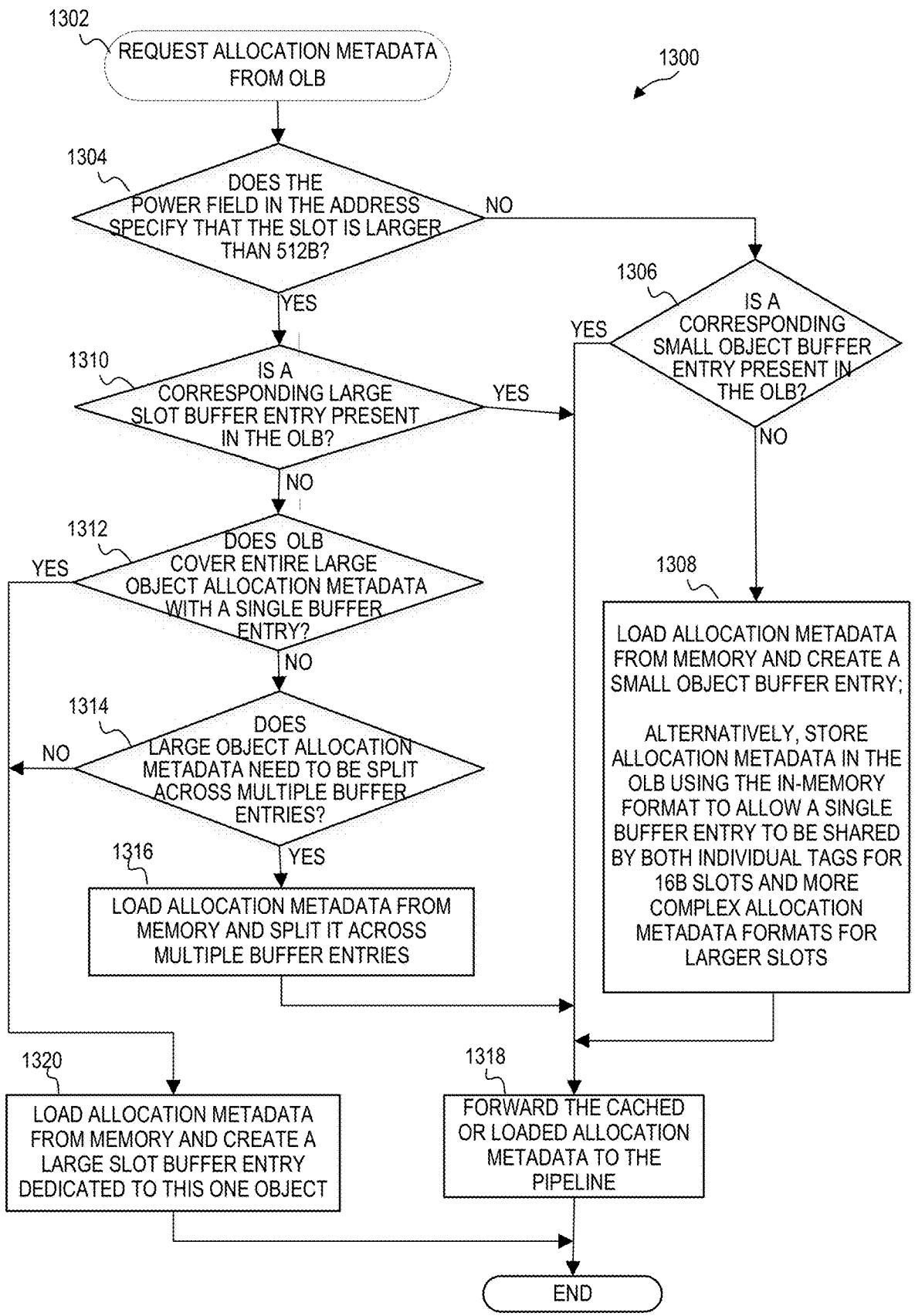
FIG. 13 is a flow diagram illustrating example operations associated with fetching allocation metadata for a tag check in connection with a memory access request according to examples.

FIG. 13 is a flow diagram 1300 illustrating example operations associated with fetching allocation metadata for a tag check in connection with a memory access request according to at least one embodiment. The memory access request may correspond to a memory access instruction to load (e.g., load instruction 118) or store (e.g., store instruction 117) data, or fetch code. The memory access instruction indicates or provides a memory address and address metadata that may be in the form of an encoded pointer similar to encoded pointer 210 of FIG. 2. In at least one embodiment, the example operations of FIG. 13 may include at least some operations needed to perform a tag check at 250 shown in FIG. 2. In one or more implementations, processor circuitry (e.g., 110, 900) and/or an integrated memory controller (IMC) (e.g., 120) and/or a separate memory controller performs one or more of the example operations illustrated in FIG. 13. In addition, an OLB miss handler (e.g., 169) may perform one or more of the example operations illustrated in FIG. 13.

As indicated at 1302, the example operations of flow diagram 1300 offer one possible technique for requesting, from an object lookaside buffer (e.g., 114, 928, 1200C), allocation metadata (e.g., a set of metadata) associated with a memory allocation containing an object (or portion thereof) to be accessed in response to receiving a memory access request indicating a memory address (e.g., pointer 210) to the object (or portion thereof).

At 1304, a determination is made as to whether a power field (e.g., size (power) field 202) in the memory address of the memory access request specifies that a slot to which the memory allocation is assigned is larger than a slot threshold size. Thus, the processor determines whether the memory allocation to be accessed contains a small object. The processor makes this determination based on the size/power metadata that is contained in the memory address and indicates the slot size. If the slot size is not greater than the slot threshold size, then the memory allocation is considered to be small and therefore, contains a small object. In this example, 512B is assumed to be the slot threshold size for consistency with other examples herein. It should be understood, however, that any other appropriate threshold sizes (e.g., 32B, 64b, 128B, 256B, 1024B, etc.) are also possible based on particular architectures, implementations, and/or needs.

At 1304, if a determination is made that the power field does not specify that the slot is larger than the slot threshold size, then the allocation to be accessed is small and contains a small object (e.g., not greater than 512 bytes). In this scenario, at 1306, a determination is made as to whether a corresponding small object buffer entry in the OLB is present. A corresponding small object buffer entry is a buffer entry in the OLB that contains a cached set of metadata associated with the memory allocation containing the small object to be accessed. Depending on the size of the small object to be accessed, the cached set of metadata (if present in the OLB) includes one of: (i) a tag, (ii) a tag and a descriptor, (iv) a tag, a descriptor, and left normal bounds, (v) a tag, a descriptor, and right normal bounds, or (vi) a tag, a descriptor, left normal bounds, and right normal bounds. The corresponding small object buffer entry can contain one or more cached sets of metadata for one or more small allocations that each contain a respective small object. The cached set of metadata (if present in the OLB) is indexed based on a metadata virtual address of the set of metadata stored in memory (e.g., in a tag table).

Once the processor determines that the object to be accessed is contained in a memory allocation assigned to a small slot (and therefore is a small object), the processor can calculate the metadata virtual address for the set of metadata. The processor can use the calculated metadata virtual address to determine whether the set of metadata is currently cached in the OLB. To calculate the metadata virtual address, a midpoint virtual address of the slot to which the memory allocation is assigned is determined. The slot midpoint virtual address can then be used to calculate a metadata virtual address. The metadata virtual address (or a portion thereof) can then be used to perform a search (e.g., lookup or find operation) in the OLB. If the metadata virtual address (or portion thereof) is found in the index array (e.g., 1230C) of the OLB, then the associated buffer entry can be accessed and an offset can be calculated to obtain the correct set of metadata.

To avoid potential collisions with other sets of metadata cached for other allocations assigned to large slots that are left byte-aligned with the small slot to which the memory allocation containing the object to be accessed is assigned, a bit may be appended to the calculated metadata virtual address. The bit can be used as part of the address to search the index array of the OLB. The bit can indicate that the metadata virtual address corresponds to a small object buffer entry (e.g., '0') rather than a large slot buffer entry (e.g., '1'). The metadata virtual address with the appended bit can be used to search for a matching memory address and appended slot-size bit (e.g., also set to '0') in one of the indexes of the index array in the OLB.

At 1306, if a determination is made that a corresponding small object buffer entry is present in the OLB, then at 1318, the cached set of metadata that is associated with a memory allocation containing the small object to be accessed and that is obtained from the OLB, is forwarded to the pipeline to perform a tag check and possibly a bounds check.

At 1306, if a determination is made that a corresponding small object buffer entry is not present in the OLB, then at 1308, allocation metadata is loaded from memory and a small object buffer entry is created in the OLB. In this embodiment, a set of metadata with multiple metadata items such as a tag and a descriptor (and bounds depending on the size of the allocation), may be expanded to duplicated tags in the OLB to shift logic complexity to the relatively infrequent walk process. Thus, instead of storing the in-memory format of a set of metadata, each item of metadata (e.g., tag, descriptor, normal bounds left, normal bounds right) in a set of metadata associated with an allocation is stored in the small object buffer entry of the OLB as a single tag. For example, for a set of metadata containing a tag and a descriptor, two tags would be stored in the small object buffer entry of the OLB. In another example, assume a set of metadata contains a tag, a descriptor, normal left bounds, and normal right bounds. In this example, four tags would be stored in the small object buffer entry of the OLB.

Alternatively, storing a set of metadata in the OLB using the in-memory format (e.g., with descriptors and potentially normal bounds) could allow a single buffer entry in the OLB to be shared by both individual tags for 16B slots and more complex metadata formats for larger slots (but not larger than the slot threshold size). If a sufficiently high cutoff between small and large slot OLB entry formats is used, then a complex metadata item in the buffer entry could handle requests for large objects spanning beyond what can be covered using duplicated tags in the single entry while still allowing metadata for other allocations to share that same OLB entry. The logic for interpreting the OLB entries could potentially become more complex.

Subsequent to the set of metadata being loaded from memory at 1308, at 1318, the loaded set of metadata, which is associated with the memory allocation containing the small object to be accessed, is forwarded to the pipeline to perform a tag check and possibly a bounds check.

With reference again to 1304, if the power field does specify that the slot is larger than the slot threshold size, then the allocation to be accessed could potentially contain a large object (e.g., greater than 512 bytes). In this scenario, at 1310, a determination is made as to whether a corresponding large slot buffer entry in the OLB is present. A corresponding large slot buffer entry is a buffer entry in the OLB that contains a cached set of metadata associated with the memory allocation containing the (potentially) large object to be accessed. Depending on the size of the large object to be accessed, the cached set of metadata (if present in the OLB) can include any one of the possible sets of metadata illustrated in FIG. 6 with the exception of a tag only for a single granule. This is because a single tag is associated with a single granule allocation, but no granule crosses the midpoint of any other slots. In some examples, the corresponding large slot buffer entry can contain only one set of metadata for the one allocation that contains the (potentially) large object. The cached set of metadata (if present in the OLB) is indexed based on a virtual address of the midpoint of the slot to which the memory allocation containing the (potentially) large object is assigned.

Once the processor determines that the object to be accessed is contained in a memory allocation assigned to a large slot (and therefore is potentially a large object), the processor can calculate the virtual address of the midpoint of the slot to which the memory allocation is assigned. The processor can use the calculated slot midpoint virtual address to determine whether a set of metadata associated with the memory allocation containing the object to be accessed is currently cached in the OLB. To calculate the slot midpoint virtual address, the slot address can first be determined based on the memory address (e.g., pointer 210) and the size (power) field (e.g., 202) stored in the memory address. The slot virtual address can then be used to determine the slot midpoint virtual address. The slot midpoint virtual address can then be used to perform a search (e.g., lookup or find operation) in the OLB. If the slot midpoint virtual address is found in the index array (e.g., 1230C) of the OLB, then the associated buffer entry can be accessed and an offset can be calculated to obtain the set of metadata from the buffer entry. It should be noted that an offset may be zero in some cases.

To avoid potential collisions with other sets of metadata cached for small allocations assigned to small slots that are left byte-aligned with the large slot to which the memory allocation containing the object to be accessed is assigned, a bit may be appended to the calculated slot midpoint virtual address. The bit can be used as part of the address to search the index array of the OLB. The bit can indicate that the metadata virtual address corresponds to a large slot buffer entry (e.g., '1') rather than a small object buffer entry (e.g., '0'). The slot midpoint virtual address with the appended bit can be used to search for a matching memory address and appended slot-size bit (e.g., also set to '1') in one of the indexes of the index array in the OLB.

At 1310, if a determination is made that a corresponding large slot buffer entry is present in the OLB, then at 1318, the cached set of metadata that is associated with a memory allocation containing the (potentially) large object to be accessed and that is obtained from the OLB, is forwarded to the pipeline to perform a tag check and a bounds check.

At 1310, if a determination is made that a corresponding large slot buffer entry is not present in the OLB, then at 1312, a determination is made as to whether the OLB covers entire large object allocation metadata with a single buffer entry in the OLB. If a determination is made at 1312 that the OLB covers the entirety of large object allocation metadata with a single buffer entry (e.g., as shown in third buffer entry 1246C for example), then at 1320, allocation metadata is loaded from memory and a large slot buffer entry dedicated to the one (potentially) large object to be accessed is created.

It should be noted that, in at least some examples, the decision at 1312 is predetermined in the logic without a decision being made as described with reference to 1312. In these examples, the logic of the example operations either covers all objects in large allocations with a single buffer entry or allows allocation metadata to be split across buffer entries. Accordingly, 1312 may be omitted in such cases.

At 1312, if a determination is made that the OLB does not always cover the entirety of large object allocation metadata with a single buffer entry (e.g., as shown in third buffer entry 1246C for example), then at 1314, a determination is made as to whether the allocation metadata associated with the memory allocation containing the (potentially) large object to be accessed needs to be split across multiple entries. For example, if the midpoint of the slot to which the memory allocation is assigned translates to a location within a line of the tag table and none of the allocation metadata (e.g., tag, descriptor, normal bounds, extended bounds) crosses a boundary of that line, then the allocation metadata does not need to be split across multiple buffer entries. In this scenario, at 1320, allocation metadata is loaded from memory and a large slot buffer entry dedicated to the one (potentially) large object to be accessed is created.

Alternatively, if the midpoint of the slot to which the memory allocation is assigned translates to a boundary of a line in the tag table, or close enough to the boundary that some of the metadata crosses the boundary, then the allocation metadata needs to be split across multiple buffer entries. In this scenario, at 1316, the allocation metadata is loaded from memory and split across multiple OLB buffer entries. At 1318, the loaded set of metadata, which is associated with the memory allocation containing the (potentially) large object to be accessed, is forwarded to the pipeline to perform a tag check and a bounds check.

Figure 14:
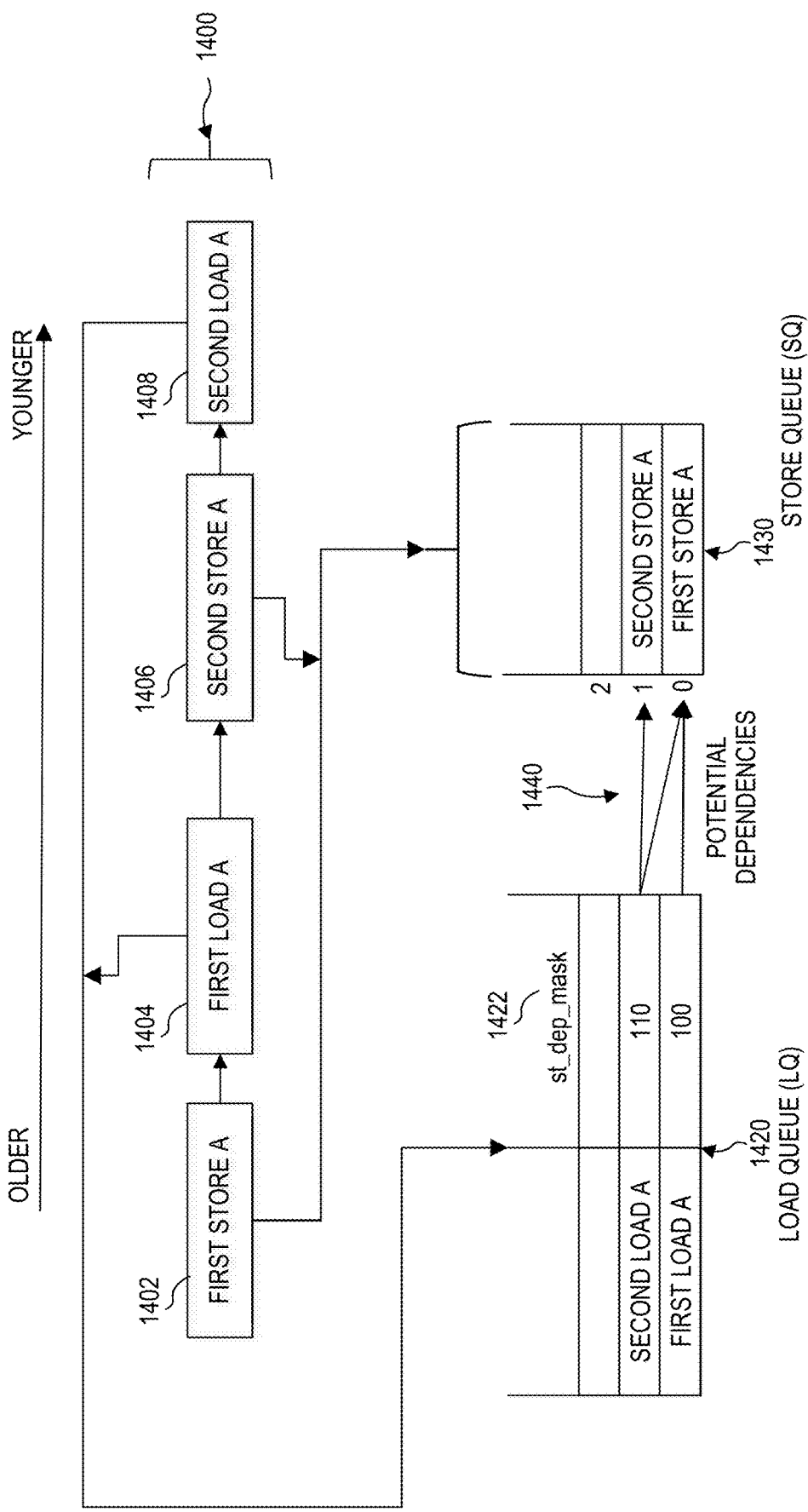
FIG. 14 illustrates a first example instruction stream and a load queue, a store queue, and a metadata-store dependency mask according to examples.

Turning to FIGS. 14, FIG. 14 illustrates one approach of an existing architecture for ordering memory instructions and tracking dependencies. In typical computer systems, ensuring correct ordering between memory instructions is important to prevent potential data hazards, such as read-after-write (RAW), write-after-read (WAR), etc. In the systems described herein, a set of metadata (e.g., tags, descriptors, bounds) associated with a memory allocation of a program is checked (e.g., tag check and/or bounds check 250) in response to receiving a memory access request from the program to determine whether the memory access should be allowed to proceed. When the checks are performed on a set of metadata, it is important that the process uses current metadata. Otherwise, a memory safety violation could potentially go undetected. The sets of metadata associated with respective memory allocations of a program, however, are stored in memory (e.g., tag table 150, 1210A, 1210B, 1210C), but may also be stored or cached in various other components of the system during runtime. Accordingly, new memory instruction ordering techniques are needed to resolve issues arising between allocation metadata store and load operations.

The following code sequence illustrates an example where memory mis-ordering for tags could potentially happen:

| | |
|---|---|
| Char *ptr = malloc(size) | // Heap Alloc (1) |
| __tag__store__routine( ); | // Store tags (2) |
| ptr[0] = 'a'; | // Tagged mem access (3) |

In the above example code sequence, at (1), a new allocation in heap memory is created. At (2) a memory allocator performs an update to generate a set of metadata associated with the new allocation and to store the set of metadata in another area of memory. The set of metadata can include a tag for the new allocation. In addition, depending on the size of the new allocation, the set of metadata can also include a descriptor and potentially bounds of the new allocation. At (3), a memory access is performed using a tagged pointer (ptr) that was created at (1) for the new allocation. The tagged pointer is encoded with the tag for the new allocation. One example format of the ptr could be an encoded pointer 210 of FIG. 2. The memory access at (3) needs to use the most recent version of the set of metadata generated at (2). Otherwise, an older version of metadata may be accessed and result in a memory safety violation.

Allocation metadata is accessed within the processor to perform safety checks for a memory access request. Accessing allocation metadata, however, is not performed through the normal memory path. In the above code sequence, the tagged memory access at (3) is allowed to speculatively invoke a tag fetch (load) operation, because the previous tag store at (2) can only be executed after being committed. This behavior could result in the tag fetch operation (e.g., performed in connection with the tagged memory access) being executed before the set of metadata associated with the new allocation is stored in the tag table. Thus, the memory access at (3) could potentially allow an old allocation metadata to be accessed for the safety check(s), and cause an unnecessary memory safety failure to occur.

One technique to ensure correct ordering for of memory instructions to protect accesses of allocation metadata is to insert a memory fence (mfence) instruction at (3), which is after the instruction to store the set of metadata at (2). The memory fence instruction prevents any out-of-order execution of memory instructions (e.g., any instructions younger than or prior to the mfence instruction) by stalling the pipeline stage until the fence is retired. Consequently, the mfence instruction can block every later instruction in the program until all the memory operations preceding the mfence instruction have fully completed. While effective at preventing unnecessary memory safety check violations, the memory fence instruction can cause a significant amount of performance overhead.

| | |
|---|---|
| Char *ptr = malloc(size) | // Heap Alloc (1) |
| __tag__store__routine( ); | // Store tags (2) |
| mfence; | // Ensure mem ordering (3) |
| ptr[0] = 'a'; | // Tagged mem access (4) |

In some architectures, a store dependency mask is maintained by the processor to keep track of potential dependencies in an instruction stream. FIG. 14 illustrates an example instruction stream 1400 running on an out-of-order architecture that maintains this type of dependency mask. In FIG. 14, the example instruction stream 1400 includes, from oldest to youngest, a first store A 1402, a first load A 1404, a second store A 1406, and a second load A 1408. The load instructions 1404 and 1408 are added to a load queue 1420, and the store instructions 1402 and 1406 are added to a store queue 1430.

A store dependency mask 1422 may be used to keep track of the stores that are currently active (e.g., loaded in the store queue 1430) within the processor and to control data access operations. The store dependency mask 1422 may be implemented as a bit vector having an n-bit length, where n is the size of the store queue 1430. Because three entries are illustrated in store queue 1430, n=3 and therefore, the dependency mask 1422 has three bits. The $n^{th}$ bit is set when an older store is present in the $n^{th}$ entry of a store queue. The processor maintains the bit vector 1422 for each of the upcoming memory accesses to indicate potential dependencies on older stores in the instruction stream that are actually being processed in parallel in this out-of-order architecture. As illustrated in FIG. 14, potential dependencies 1440 correspond to the bit vectors 1422. The potential dependencies 1440 illustrate that the first load A 1404 is potentially dependent only on the first store A 1402. Thus, in bit vector 1422 corresponding to the first load A 1404, only the first bit is set. The second load A 1408 is potentially dependent on both the first store A 1402 and the second store A 1406. Thus, in the bit vector 1422 corresponding to the second load A 1408, the first and second bits are set.

Data to be loaded (also referred to herein as 'load data') for a load instruction could be fetched from multiple places in the system. For example, the load data could come from a prior store that has not yet sent data to be stored (also referred to herein as 'store data') out to the cache yet (e.g., store-to-load forwarding). In this scenario, if the processor can determine that the newer load is dependent on the older store, but that older store has not committed the store data to the cache, then the processor may internally forward the store data to the load instruction that is being executed in parallel. Another possibility is that the data needs to be loaded from the cache. If the load is not dependent on an outstanding store, then the load should access the cache to pull in the data.

Whenever a processor is ready to obtain the data for a load instruction, a corresponding load dependency mask is checked to determine whether any outstanding store instruction (e.g., a store instruction in the store queue) has the same address. If any outstanding store instruction with the same address is found, the load may be cancelled and retried after all outstanding stores, on which the load instruction is potentially dependent, are committed. In some architectures, the processor may provide store-to-load forwarding if the load is dependent on an outstanding store has store data, but has not sent the store data to cache. The store dependency mask bits are cleared when store entries in the store queue 1430 are dequeued from the store queue.

Figure 15:
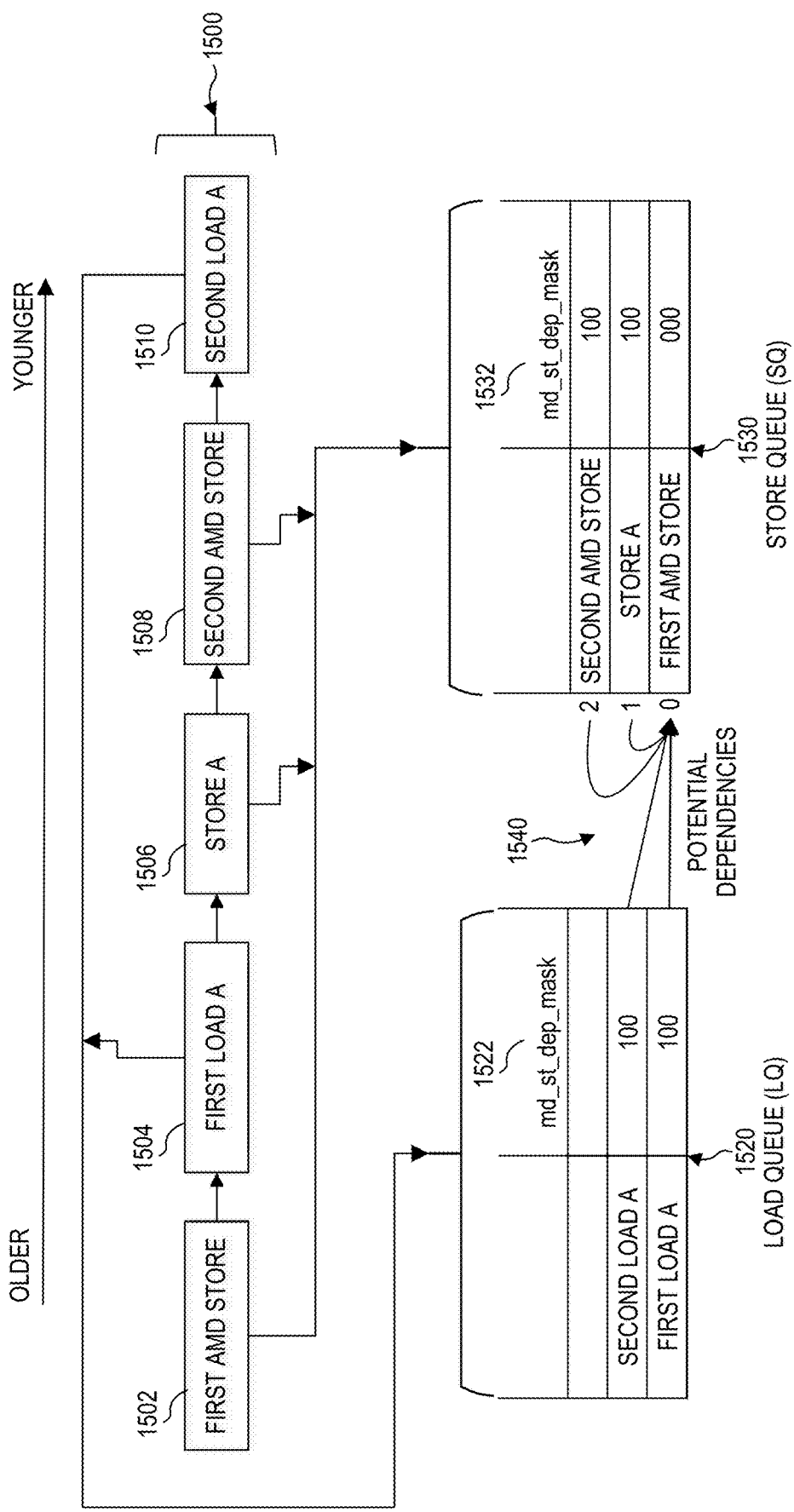
FIG. 15 illustrates a second example instruction stream and a load queue, a store queue, and a metadata-store dependency mask according to examples.

FIG. 15, illustrates a technique for tracking memory access dependencies related to allocation metadata (e.g., tags, descriptors bounds) according to an embodiment. The technique illustrated in FIG. 15 mitigates issues that can occur when accessing allocation metadata and which are typically mitigated using techniques (e.g., mfence instruction) that cause significant performance overhead.

In the embodiment shown in FIG. 15, metadata-store dependency masks 1522 and 1532 (md_st_dep_mask) are used to mitigate issues with memory instruction ordering for allocation metadata that is accessed for memory safety checks. The metadata-store dependency masks 1522 and 1532 are implemented in both a load queue 1520 and a store queue 1530 of the architecture in one embodiment. Thus, a data store could potentially be dependent on an older allocation metadata store, and that dependency can be indicated in the bit vector 1532 associated with that data store. In addition, an allocation metadata store could potentially be dependent on an older allocation metadata store, and that dependency can be indicated in the bit vector 1532 associated with the younger allocation metadata store. This could occur for example, if allocation metadata (e.g., tag, descriptor, bounds) is used to control access to the allocation metadata space (e.g., tag table) in memory.

An example instruction stream 1500 is illustrated running on an out-of-order architecture that implements metadata-store dependency masks 1522 and 1532. In FIG. 15, the example instruction stream 1500 includes, from oldest to youngest, a first allocation metadata (AMD) store 1502, a first load A 1504, a store A 1506, a second allocation metadata (AMD) store 1508, and a second load A 1510, where 'A' is the address being accessed by some of the instructions in the instruction stream 1500. The load instructions 1504 and 1510 are added to the load queue 1520, and the store instruction 1506 and store metadata instructions 1502 and 1508 are added to the store queue 1530.

The metadata-store dependency masks 1522 and 1532 may be used to control the memory safety operations (e.g., tag and bounds checks 250). The metadata-store dependency mask 1522 for the load queue 1520 may be used to keep track of the stores that are currently active (e.g., loaded in the store queue 1430) within the processor relative to load instructions. The metadata-store dependency mask 1532 for the store queue 1530 may be used for currently active store instructions to keep track of the other currently active stores within the processor. The store dependency masks 1522 and 1532 may each be implemented as a bit vector having an n-bit length, where n is the size of the store queue 1530. Because three entries are illustrated in store queue 1530, n=3 and therefore, the dependency masks 1522 and 1532 have three bits. The $n^{th}$ bit is set when an older store is present in the $n^{th}$ entry of a store queue. The processor maintains the bit vectors 1522 and 1532 for each of the upcoming memory accesses (loads and stores) to indicate potential dependencies on older stores in the instruction stream that are actually being processed in parallel in this out-of-order architecture.

As illustrated in FIG. 15, potential dependencies 1540 correspond to the bit vectors 1522 and 1532. For the load queue 1520, the potential dependencies 1540 illustrate that the first load A 1504 and the second load A 1510 are both potentially dependent only on the first allocation metadata store 1502. Thus, in the load queue bit vectors 1522 corresponding to the first load A 1504 and the second load A 1510, only the first bit is set. For the store queue 1530, the potential dependencies 1540 illustrate that the store A 1506 and the second allocation metadata store 1508 are both potentially dependent only on the first allocation metadata store 1502. Thus, in the store queue bit vectors 1532 corresponding to the first load A 1504 and the second load A 1510, only the first bit is set.

In one possible approach, the processor determines whether any potentially dependent AMD store is present in the store queue 1530 before any allocation metadata fetch operation is scheduled. If an AMD store is present in the store queue, then the allocation metadata fetch operation waits until all AMD stores, on which the allocation metadata fetch operation is dependent, are committed. This embodiment improves performance relative to fencing or blocking (e.g., mfence) all future memory instructions until the currently outstanding store instructions are finished. The metadata-store dependency mask obviates the need to insert fence instructions. Thus, while potentially dependent instructions may need to wait for certain outstanding instructions to be completed, other out-of-order execution of memory instructions can continue. This conservative approach may require less hardware to be implemented and may be particularly advantageous when the allocation metadata updates are relatively infrequent.

In a second possible approach, the processor could identify allocation metadata stores, and then identify the metadata memory address for the allocation metadata location (e.g., in tag table 150, 1210A, 1210B, 1210C) that is being updated by the allocation metadata store, and/or the memory address of the associated memory allocation. The processor could further inspect subsequent memory instructions that are potentially dependent on the allocation metadata store. The processor could identify the metadata memory addresses from which allocation metadata would be fetched for memory safety operations associated with the subsequent memory instructions. If the processor determines that the identified metadata memory addresses of the allocation metadata store and the subsequent memory instructions are different locations, then the processor could allow the subsequent memory instructions to proceed.

In the second approach, processor needs a way to identify the allocation metadata stores. In one example, the allocation metadata stores may be in the form of specific, known instructions for storing the allocation metadata (e.g., MoveTag). If specific, known instructions for storing allocation metadata are not available, then a particular range of memory where allocation metadata is stored may be searched. In another example, specific pages of memory may be identified as storing allocation metadata by using a page table entry (PTE) bit in a page table of virtual-to-physical translation paging structures to mark those pages. This second approach may require more complex hardware to be implemented, but may be particularly advantageous when the allocation metadata updates are frequent and/or and delays to deliver instructions to the pipeline need to be minimized.

Figure 16:
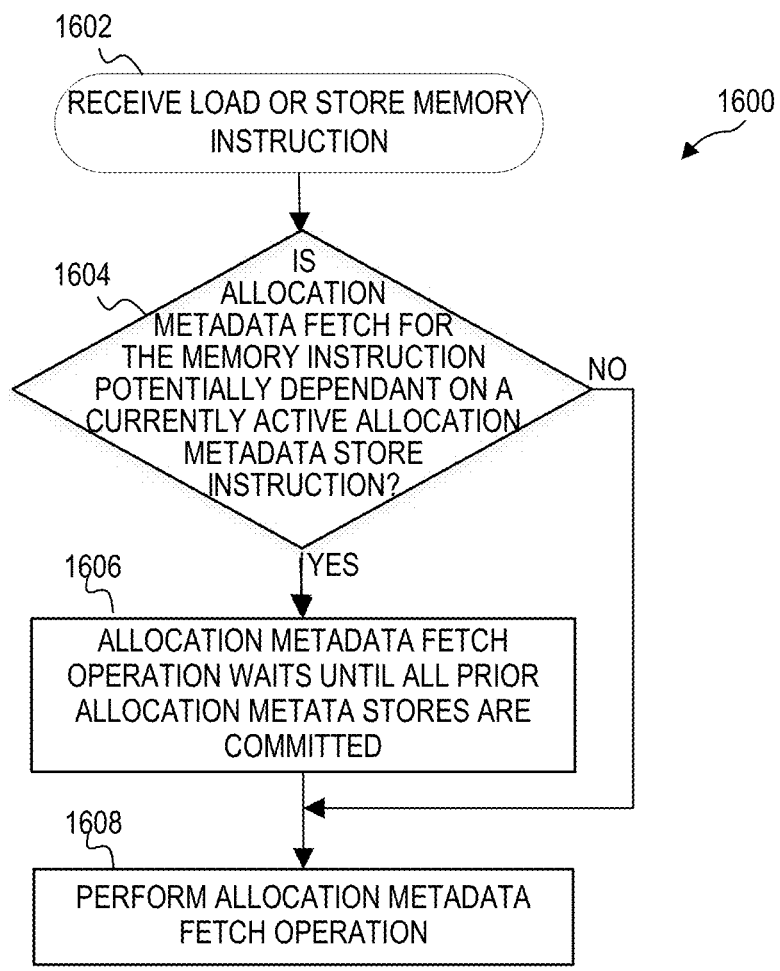
FIG. 16 is a flow diagram illustrating example operations for memory ordering associated with allocation metadata accesses according to examples.

FIG. 16 is a flow diagram illustrating example operations for memory ordering associated with allocation metadata accesses according to examples. Allocation metadata accesses may be performed when updating allocation metadata (e.g., in response to creating a new allocation) or when memory safety checks (e.g., tag check, bounds check) are to be performed for a memory access request. In one or more examples, processor circuitry (e.g., 110, 900) and/or an integrated memory controller (IMC) (e.g., 120) and/or a separate memory controller performs one or more of the example operations illustrated in FIG. 16.

At 1602, a load or store memory instruction is received by the processor.

At 1604, the memory instruction may be added to the load or store queue (or a combined load/store queue). The processor can determine whether an allocation metadata fetch to be performed for the memory instruction is potentially dependent on a currently active allocation metadata store instruction. A metadata-store dependency mask may be used to determine the potential dependency.

If a determination is made at 1604 that the allocation metadata fetch for the memory instruction is potentially dependent on one or more currently active allocation metadata store instructions, then the allocation metadata fetch waits until all prior allocation metadata store instructions, upon which the allocation metadata fetch is potentially dependent, are committed. Once all prior allocation metadata store instructions upon which the allocation metadata fetch is potentially dependent are committed, the allocation metadata fetch operation can be performed at 1608.

If a determination is made at 1604 that the allocation metadata fetch for the memory instruction is not potentially dependent on any currently active allocation metadata store instructions, then the allocation metadata fetch operation can be performed at 1608.

Figure 17:
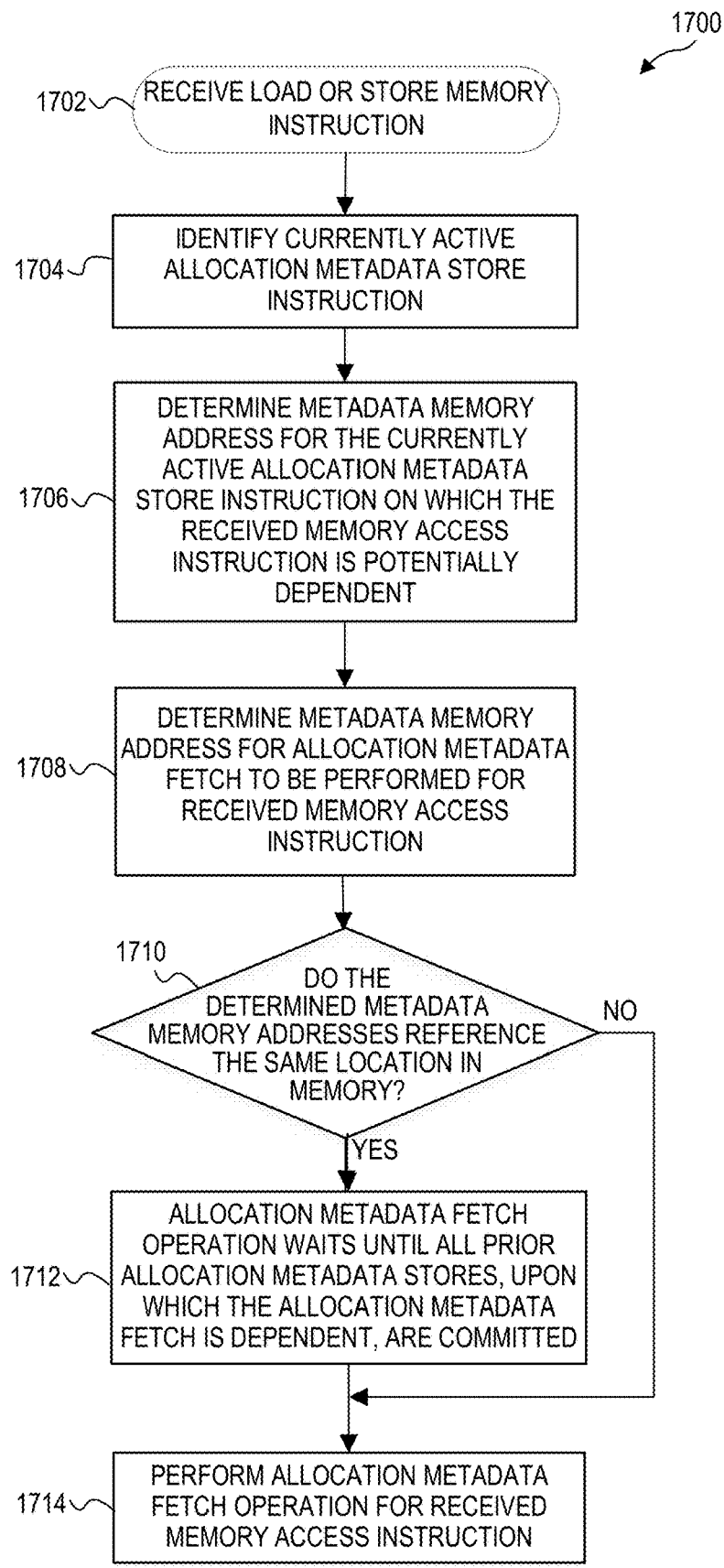
FIG. 17 is a flow diagram illustrating other example operations for memory ordering associated with allocation metadata accesses according to examples.

FIG. 17 is a flow diagram illustrating other example operations for memory ordering associated with allocation metadata accesses according to examples. Allocation metadata accesses may be performed when updating allocation metadata (e.g., in response to creating a new allocation) or when memory safety checks (e.g., tag check, bounds check) are to be performed for a memory access request. In one or more examples, processor circuitry (e.g., 110, 900) and/or an integrated memory controller (IMC) (e.g., 120) and/or a separate memory controller performs one or more of the example operations illustrated in FIG. 17.

At 1702, a load or store memory instruction is received by the processor.

At 1704, the processor identifies a currently active allocation metadata store instruction (e.g., in a store queue 1530). The processor can determine whether the received memory instruction is potentially dependent on a currently active allocation metadata store instruction. A metadata-store dependency mask may be used to determine the potential dependency.

At 1706, the processor determines a metadata memory address (e.g., virtual address) for the currently active allocation metadata store instruction on which the received memory instruction is potentially dependent.

At 1708, the processor determines a metadata memory address (e.g., virtual address) for an allocation metadata fetch to for memory safety checks (e.g., tag check, bounds check) to be performed for the received memory access the memory instruction.

At 1710, a determination is made as to whether the determined metadata memory addresses reference the same location in memory.

If a determination is made at 1710 that the determined metadata memory addresses reference the same location in memory, then at 1712, the allocation metadata fetch waits until all prior allocation metadata store instructions, upon which the allocation metadata fetch has been determined to be dependent, are committed. Once all prior allocation metadata store instructions upon which the allocation metadata fetch is dependent are committed, the allocation metadata fetch operation can be performed at 1714.

If a determination is made at 1710 that the allocation metadata fetch for the memory instruction is not dependent on any currently active allocation metadata store instructions, then the allocation metadata fetch operation can be performed at 1714.

Example Computer Architectures

Detailed below are descriptions of example computer architectures. Other system designs and configurations known in the arts for laptop, desktop, and handheld personal computers (PC)s, personal digital assistants, engineering workstations, servers, disaggregated servers, network devices, network hubs, switches, routers, embedded processors, digital signal processors (DSPs), graphics devices, video game devices, set-top boxes, micro controllers, cell phones, portable media players, hand-held devices, and various other electronic devices, are also suitable. In general, a variety of systems or electronic devices capable of incorporating a processor and/or other execution logic as disclosed herein are generally suitable. Embodiments of a memory safety system as previously described herein may be implemented using one or more of the architectures described below.

Figure 18:
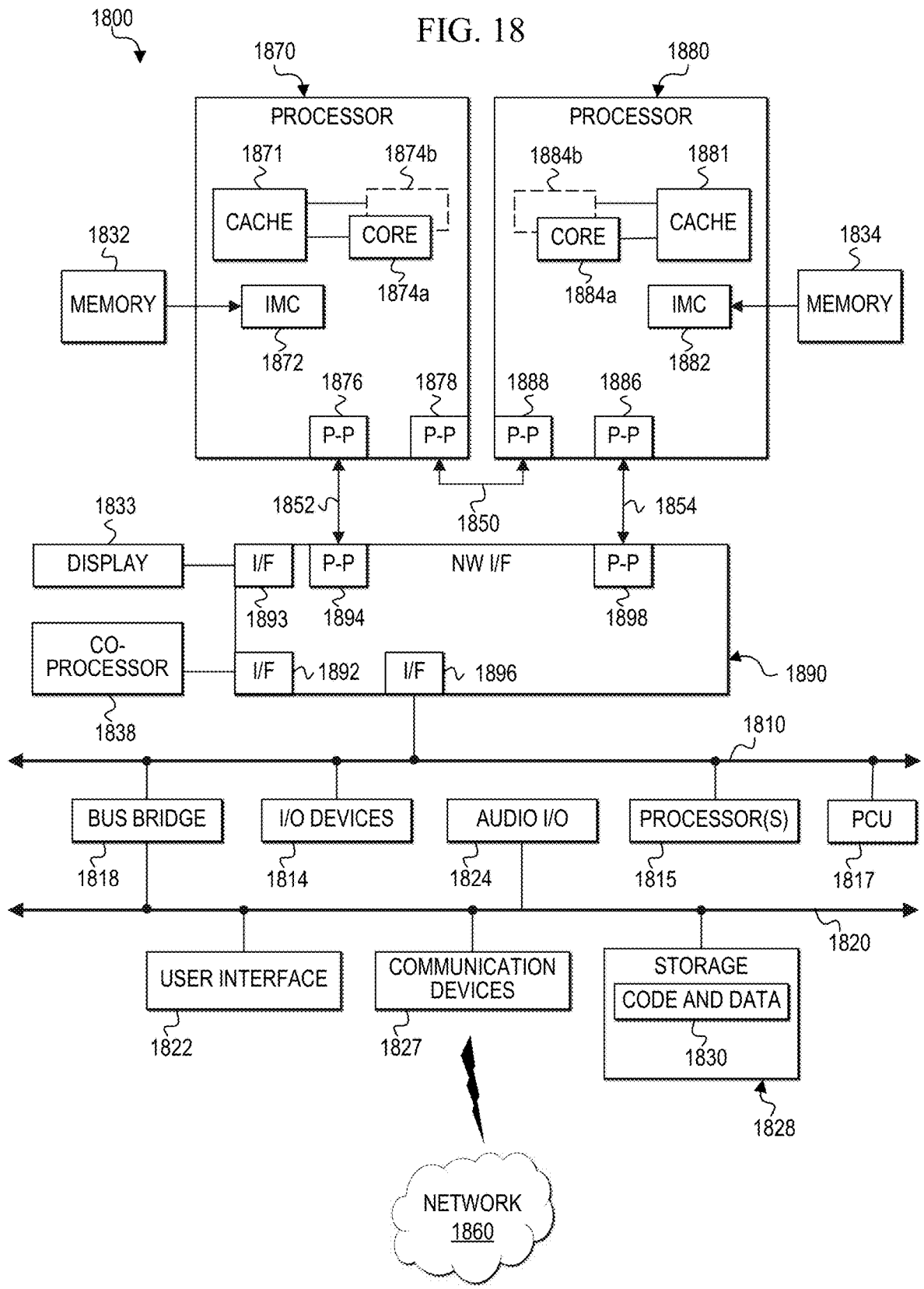
FIG. 18 illustrates an exemplary system.

FIG. 18 illustrates an example computing system and is one example architecture of computing system 100. Multiprocessor system 1800 is an interfaced system and includes a plurality of processors or cores including a first processor 1870 and a second processor 1880 coupled via an interface 1850 such as a point-to-point (P-P) interconnect, a fabric, and/or bus. In some examples, the first processor 1870 and the second processor 1880 are homogeneous. In some examples, first processor 1870 and the second processor 1880 are heterogenous. Though the example system 1800 is shown to have two processors, the system may have three or more processors, or may be a single processor system. In some examples, the computing system is a system on a chip (SoC).

Processors 1870 and 1880 may be implemented as single core processors 1874a and 1884a or multi-core processors 1874a-1874b and 1884a-1884b. Processors 1870 and 1880 may each include a cache 1871 and 1881 used by their respective core or cores. A shared cache (not shown) may be included in either processor or outside of both processors, yet connected with the processors via P-P interconnect, such that either or both processors' local cache information may be stored in the shared cache if a processor is placed into a low power mode.

Processors 1870 and 1880 are shown including integrated memory controller (IMC) circuitry 1872 and 1882, respectively. Processor 1870 also includes interface circuits 1876 and 1878; similarly, second processor 1880 includes interface circuits 1886 and 1888. Processors 1870, 1880 may exchange information via the interface 1850 using interface circuits 1878, 1888. IMCs 1872 and 1882 couple the processors 1870, 1880 to respective memories, namely a memory 1832 and a memory 1834, which may be portions of main memory locally attached to the respective processors.

Processors 1870, 1880 may each exchange information with a network interface (NW I/F) 1890 via individual interfaces 1852, 1854 using interface circuits 1876, 1894, 1886, 1898. The network interface 1890 (e.g., one or more of an interconnect, bus, and/or fabric, and in some examples is a chipset) may optionally exchange information with a coprocessor 1838 via an interface circuit 1892. In some examples, the coprocessor 1838 is a special-purpose processor, such as, for example, a high-throughput processor, a network or communication processor, compression engine, graphics processor, general purpose graphics processing unit (GPGPU), neural-network processing unit (NPU), embedded processor, or the like. Network interface 1890 may also provide information to a display 1833 using an interface circuitry 1893, for display to a human user.

A shared cache (not shown) may be included in either processor 1870, 1880 or outside of both processors, yet connected with the processors via an interface such as P-P interconnect, such that either or both processors' local cache information may be stored in the shared cache if a processor is placed into a low power mode.

Network interface 1890 may be coupled to a first interface 1810 via interface circuit 1896. In some examples, first interface 1810 may be an interface such as a Peripheral Component Interconnect (PCI) interconnect, a PCI Express interconnect or another I/O interconnect. In some examples, first interface 1810 is coupled to a power control unit (PCU) 1817, which may include circuitry, software, and/or firmware to perform power management operations with regard to the processors 1870, 1880 and/or co-processor 1838. PCU 1817 provides control information to a voltage regulator (not shown) to cause the voltage regulator to generate the appropriate regulated voltage. PCU 1817 also provides control information to control the operating voltage generated. In various examples, PCU 1817 may include a variety of power management logic units (circuitry) to perform hardware-based power management. Such power management may be wholly processor controlled (e.g., by various processor hardware, and which may be triggered by workload and/or power, thermal or other processor constraints) and/or the power management may be performed responsive to external sources (such as a platform or power management source or system software).

PCU 1817 is illustrated as being present as logic separate from the processor 1870 and/or processor 1880. In other cases, PCU 1817 may execute on a given one or more of cores (not shown) of processor 1870 or 1880. In some cases, PCU 1817 may be implemented as a microcontroller (dedicated or general-purpose) or other control logic configured to execute its own dedicated power management code, sometimes referred to as P-code. In yet other examples, power management operations to be performed by PCU 1817 may be implemented externally to a processor, such as by way of a separate power management integrated circuit (PMIC) or another component external to the processor. In yet other examples, power management operations to be performed by PCU 1817 may be implemented within BIOS or other system software.

Various I/O devices 1814 may be coupled to first interface 1810, along with a bus bridge 1818 which couples first interface 1810 to a second interface 1820. In some examples, one or more additional processor(s) 1815, such as coprocessors, high throughput many integrated core (MIC) processors, GPGPUs, accelerators (such as graphics accelerators or digital signal processing (DSP) units), field programmable gate arrays (FPGAs), or any other processor, are coupled to first interface 1810. In some examples, second interface 1820 may be a low pin count (LPC) interface. Various devices may be coupled to second interface 1820 including, for example, a user interface 1822 (such as a keyboard, mouse, touchscreen, or other input devices), communication devices 1827 (such as modems, network interface devices, or other types of communication devices that may communicate through a computer network 1860), and storage circuitry 1828. Storage circuitry 1828 may be one or more non-transitory machine-readable storage media as described below, such as a disk drive or other mass storage device which may include instructions/code and data 1830. Further, an audio I/O 1824 may be coupled to second interface 1820. Note that other architectures than the point-to-point architecture described above are possible. For example, instead of the point-to-point architecture, a system such as multiprocessor system 1800 may implement a multi-drop interface or other such architecture.

Example Core Architectures, Processors, and Computer Architectures

Processor cores may be implemented in different ways, for different purposes, and in different processors. For instance, implementations of such cores may include: 1) a general purpose in-order core intended for general-purpose computing; 2) a high-performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput) computing. Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip (SoC) that may be included on the same die as the described CPU (sometimes referred to as the application core(s) or application processor(s)), the above described coprocessor, and additional functionality. Example core architectures are described next, followed by descriptions of example processors and computer architectures.

Figure 19:
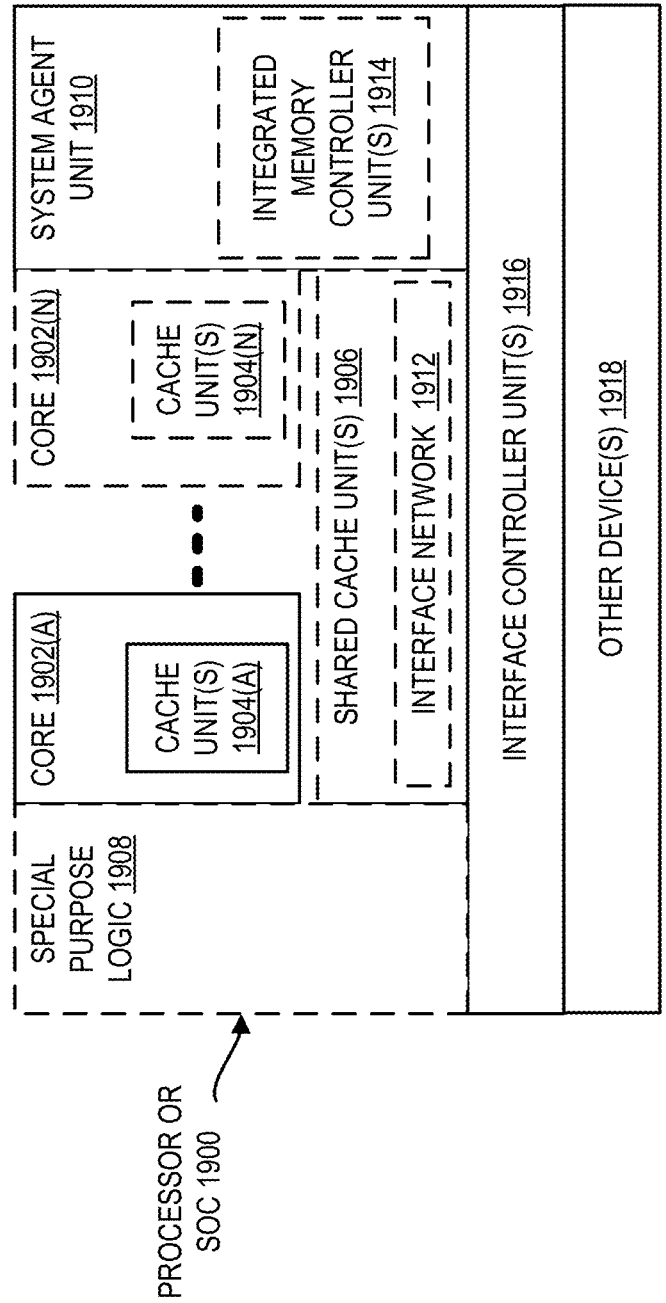
FIG. 19 illustrates a block diagram of an example processor and/or System on a Chip (SoC) that may have one or more cores and an integrated memory controller.

FIG. 19 illustrates a block diagram of an example processor and/or SoC 1900 that may have one or more cores and an integrated memory controller. Processor/SoC 1900 is one example architecture of processors previously described herein (e.g., 110, 330, etc.) The solid lined boxes illustrate a processor 1900 with a single core 1902(A), system agent unit circuitry 1910, and a set of one or more interface controller unit(s) circuitry 1916, while the optional addition of the dashed lined boxes illustrates an alternative processor 1900 with multiple cores 1902(A)-(N), a set of one or more integrated memory controller unit(s) circuitry 1914 in the system agent unit circuitry 1910, and special purpose logic 1908, as well as a set of one or more interface controller units circuitry 1916. Note that the processor 1900 may be one of the processors 1870 or 1880, or co-processor 1838 or 1815 of FIG. 18.

Thus, different implementations of the processor 1900 may include: 1) a CPU with the special purpose logic 1908 being integrated graphics and/or scientific (throughput) logic (which may include one or more cores, not shown), and the cores 1902(A)-(N) being one or more general purpose cores (e.g., general purpose in-order cores, general purpose out-of-order cores, or a combination of the two); 2) a coprocessor with the cores 1902(A)-(N) being a large number of special purpose cores intended primarily for graphics and/or scientific (throughput); and 3) a coprocessor with the cores 1902(A)-(N) being a large number of general purpose in-order cores. Thus, the processor 1900 may be a general-purpose processor, coprocessor or special-purpose processor, such as, for example, a network or communication processor, compression engine, graphics processor, GPGPU (general purpose graphics processing unit), a high throughput many integrated core (MIC) coprocessor (including 30 or more cores), embedded processor, or the like. The processor may be implemented on one or more chips. The processor 1900 may be a part of and/or may be implemented on one or more substrates using any of a number of process technologies, such as, for example, complementary metal oxide semiconductor (CMOS), bipolar CMOS (BiCMOS), P-type metal oxide semiconductor (PMOS), or N-type metal oxide semiconductor (NMOS).

A memory hierarchy includes one or more levels of cache unit(s) circuitry 1904(A)-(N) within the cores 1902(A)-(N), a set of one or more shared cache unit(s) circuitry 1906, and external memory (not shown) coupled to the set of integrated memory controller unit(s) circuitry 1914. The set of one or more shared cache unit(s) circuitry 1906 may include one or more mid-level caches, such as level 2 (L2), level 3 (L3), level 4 (L4), or other levels of cache, such as a last level cache (LLC), and/or combinations thereof. While in some examples interface network circuitry 1912 (e.g., a ring interconnect) interfaces the special purpose logic 1908 (e.g., integrated graphics logic), the set of shared cache unit(s) circuitry 1906, and the system agent unit circuitry 1910, alternative examples use any number of well-known techniques for interfacing such units. In some examples, coherency is maintained between one or more of the shared cache unit(s) circuitry 1906 and cores 1902(A)-(N). In some examples, interface controller units circuitry 1916 couple the cores 1902 to one or more other devices 1918 such as one or more I/O devices, storage, one or more communication devices (e.g., wireless networking, wired networking, etc.), etc.

In some examples, one or more of the cores 1902(A)-(N) are capable of multi-threading. The system agent unit circuitry 1910 includes those components coordinating and operating cores 1902(A)-(N). The system agent unit circuitry 1910 may include, for example, power control unit (PCU) circuitry and/or display unit circuitry (not shown). The PCU may be or may include logic and components needed for regulating the power state of the cores 1902(A)-(N) and/or the special purpose logic 1908 (e.g., integrated graphics logic). The display unit circuitry is for driving one or more externally connected displays.

The cores 1902(A)-(N) may be homogenous in terms of instruction set architecture (ISA). Alternatively, the cores 1902(A)-(N) may be heterogeneous in terms of ISA; that is, a subset of the cores 1902(A)-(N) may be capable of executing an ISA, while other cores may be capable of executing only a subset of that ISA or another ISA.

Example Core Architectures—In-Order and Out-of-Order Core Block Diagram

Figures 20A, 20B:
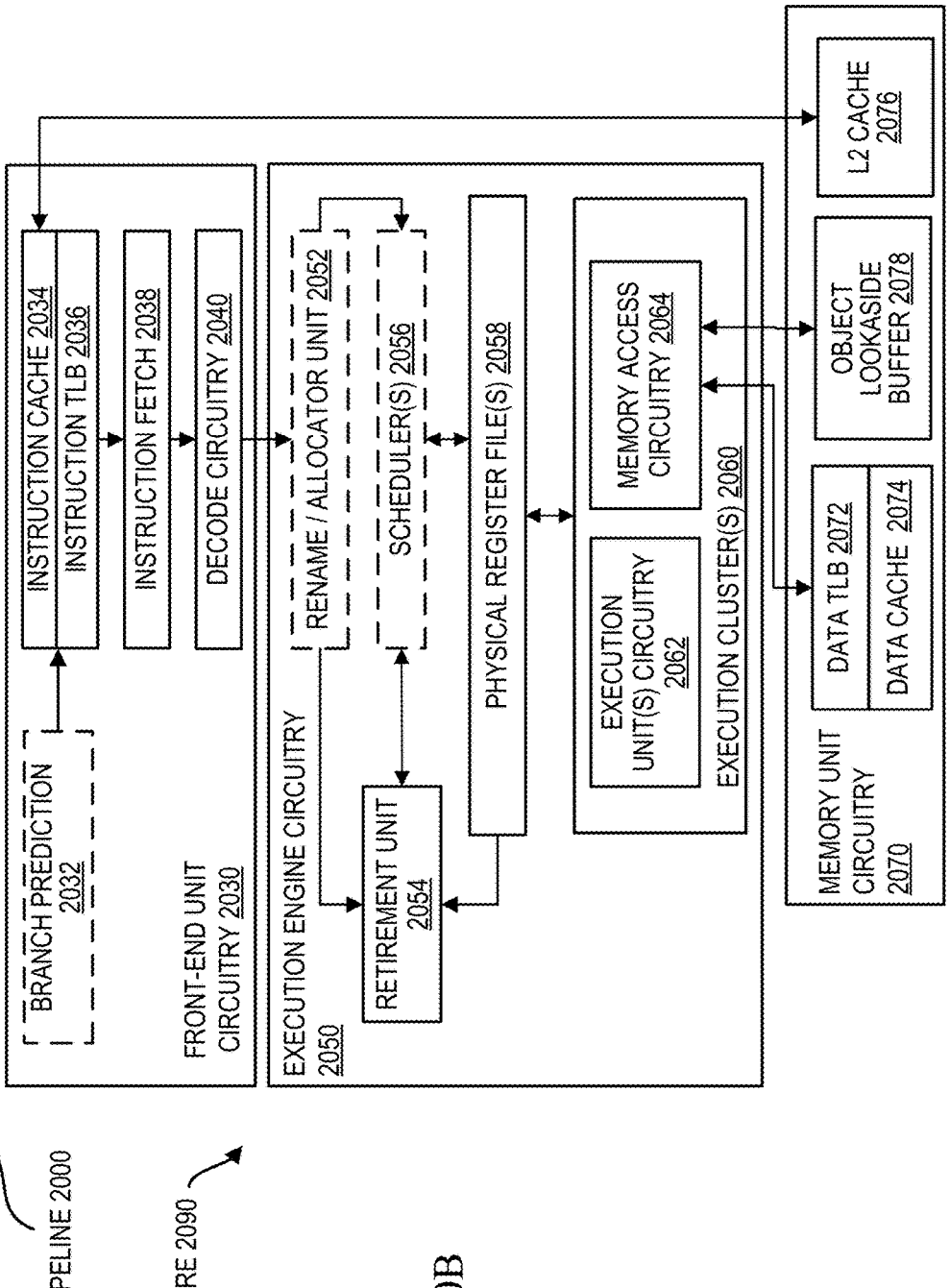
FIG. 20A is a block diagram illustrating both an example in-order pipeline and an example register renaming, out-of-order issue/execution pipeline according to examples.
FIG. 20B is a block diagram illustrating both an example in-order architecture core and an example register renaming, out-of-order issue/execution architecture core to be included in a processor according to examples.

FIG. 20A is a block diagram illustrating both an example in-order pipeline and an example register renaming, out-of-order issue/execution pipeline according to examples. FIG. 20B is a block diagram illustrating both an example in-order architecture core and an example register renaming, out-of-order issue/execution architecture core to be included in a processor according to examples. The solid lined boxes in FIGS. 20A-(B) illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described. Core 2090 is one example architecture of cores previously described herein (e.g., 332, etc.) or a portion of processors previously described herein (e.g., 110, 330, etc.).

In FIG. 20A, a processor pipeline 2000 includes a fetch stage 2002, an optional length decoding stage 2004, a decode stage 2006, an optional allocation (Alloc) stage 2008, an optional renaming stage 2010, a schedule (also known as a dispatch or issue) stage 2012, an optional register read/memory read stage 2014, an execute stage 2016, a write back/memory write stage 2018, an optional exception handling stage 2022, and an optional commit stage 2024. One or more operations can be performed in each of these processor pipeline stages. For example, during the fetch stage 2002, one or more instructions are fetched from instruction memory, and during the decode stage 2006, the one or more fetched instructions may be decoded, addresses (e.g., load store unit (LSU) addresses) using forwarded register ports may be generated, and branch forwarding (e.g., immediate offset or a link register (LR)) may be performed. In one example, the decode stage 2006 and the register read/memory read stage 2014 may be combined into one pipeline stage. In one example, during the execute stage 2016, the decoded instructions may be executed, LSU address/data pipelining to an Advanced Microcontroller Bus (AMB) interface may be performed, multiply and add operations may be performed, arithmetic operations with branch results may be performed, etc.

By way of example, the example register renaming, out-of-order issue/execution architecture core of FIG. 20B may implement the pipeline 2000 as follows: 1) the instruction fetch circuitry 2038 performs the fetch and length decoding stages 2002 and 2004; 2) the decode circuitry 2040 performs the decode stage 2006; 3) the rename/allocator unit circuitry 2052 performs the allocation stage 2008 and renaming stage 2010; 4) the scheduler(s) circuitry 2056 performs the schedule stage 2012; 5) the physical register file(s) circuitry 2058 and the memory unit circuitry 2070 perform the register read/memory read stage 2014; the execution cluster(s) 2060 perform the execute stage 2016; 6) the memory unit circuitry 2070 and the physical register file(s) circuitry 2058 perform the write back/memory write stage 2018; 7) various circuitry may be involved in the exception handling stage 2022; and 8) the retirement unit circuitry 2054 and the physical register file(s) circuitry 2058 perform the commit stage 2024.

FIG. 20B shows a processor core 2090 including front-end unit circuitry 2030 coupled to execution engine unit circuitry 2050, and both are coupled to memory unit circuitry 2070. The core 2090 may be a reduced instruction set architecture computing (RISC) core, a complex instruction set architecture computing (CISC) core, a very long instruction word (VLIW) core, or a hybrid or alternative core type. As yet another option, the core 2090 may be a special-purpose core, such as, for example, a network or communication core, compression engine, coprocessor core, general purpose computing graphics processing unit (GPGPU) core, graphics core, or the like.

The front-end unit circuitry 2030 may include branch prediction circuitry 2032 coupled to instruction cache circuitry 2034, which is coupled to an instruction translation lookaside buffer (TLB) 2036, which is coupled to instruction fetch circuitry 2038, which is coupled to decode circuitry 2040. In one example, the instruction cache circuitry 2034 is included in the memory unit circuitry 2070 rather than the front-end circuitry 2030. The decode circuitry 2040 (or decoder) may decode instructions, and generate as an output one or more micro-operations, micro-code entry points, microinstructions, other instructions, or other control signals, which are decoded from, or which otherwise reflect, or are derived from, the original instructions. The decode circuitry 2040 may further include address generation unit (AGU, not shown) circuitry. In one example, the AGU generates an LSU address using forwarded register ports, and may further perform branch forwarding (e.g., immediate offset branch forwarding, LR register branch forwarding, etc.). The decode circuitry 2040 may be implemented using various different mechanisms. Examples of suitable mechanisms include, but are not limited to, look-up tables, hardware implementations, programmable logic arrays (PLAs), microcode read only memories (ROMs), etc. In one example, the core 2090 includes a microcode ROM (not shown) or other medium that stores microcode for certain macroinstructions (e.g., in decode circuitry 2040 or otherwise within the front-end circuitry 2030). In one example, the decode circuitry 2040 includes a micro-operation (micro-op) or operation cache (not shown) to hold/cache decoded operations, micro-tags, or micro-operations generated during the decode or other stages of the processor pipeline 2000. The decode circuitry 2040 may be coupled to rename/allocator unit circuitry 2052 in the execution engine circuitry 2050.

The execution engine circuitry 2050 includes the rename/allocator unit circuitry 2052 coupled to retirement unit circuitry 2054 and a set of one or more scheduler(s) circuitry 2056. The scheduler(s) circuitry 2056 represents any number of different schedulers, including reservations stations, central instruction window, etc. In some examples, the scheduler(s) circuitry 2056 can include arithmetic logic unit (ALU) scheduler/scheduling circuitry, ALU queues, address generation unit (AGU) scheduler/scheduling circuitry, AGU queues, etc. The scheduler(s) circuitry 2056 is coupled to the physical register file(s) circuitry 2058. Each of the physical register file(s) circuitry 2058 represents one or more physical register files, different ones of which store one or more different data types, such as scalar integer, scalar floating-point, packed integer, packed floating-point, vector integer, vector floating-point, status (e.g., an instruction pointer that is the address of the next instruction to be executed), etc. In one example, the physical register file(s) circuitry 2058 includes vector registers unit circuitry, writemask registers unit circuitry, and scalar register unit circuitry. These register units may provide architectural vector registers, vector mask registers, general-purpose registers, etc. The physical register file(s) circuitry 2058 is coupled to the retirement unit circuitry 2054 (also known as a retire queue or a retirement queue) to illustrate various ways in which register renaming and out-of-order execution may be implemented (e.g., using a reorder buffer(s) (ROB(s)) and a retirement register file(s); using a future file(s), a history buffer(s), and a retirement register file(s); using a register maps and a pool of registers; etc.). The retirement unit circuitry 2054 and the physical register file(s) circuitry 2058 are coupled to the execution cluster(s) 2060. The execution cluster(s) 2060 includes a set of one or more execution unit(s) circuitry 2062 and a set of one or more memory access circuitry 2064. The execution unit(s) circuitry 2062 may perform various arithmetic, logic, floating-point or other types of operations (e.g., shifts, addition, subtraction, multiplication) and on various types of data (e.g., scalar integer, scalar floating-point, packed integer, packed floating-point, vector integer, vector floating-point). While some examples may include a number of execution units or execution unit circuitry dedicated to specific functions or sets of functions, other examples may include only one execution unit circuitry or multiple execution units/execution unit circuitry that all perform all functions. The scheduler(s) circuitry 2056, physical register file(s) circuitry 2058, and execution cluster(s) 2060 are shown as being possibly plural because certain examples create separate pipelines for certain types of data/operations (e.g., a scalar integer pipeline, a scalar floating-point/packed integer/packed floating-point/vector integer/vector floating-point pipeline, and/or a memory access pipeline that each have their own scheduler circuitry, physical register file(s) circuitry, and/or execution cluster—and in the case of a separate memory access pipeline, certain examples are implemented in which only the execution cluster of this pipeline has the memory access unit(s) circuitry 2064). It should also be understood that where separate pipelines are used, one or more of these pipelines may be out-of-order issue/execution and the rest in-order.

In some examples, the execution engine unit circuitry 2050 may perform load store unit (LSU) address/data pipelining to an Advanced Microcontroller Bus (AMB) interface (not shown), and address phase and writeback, data phase load, store, and branches.

The set of memory access circuitry 2064 is coupled to the memory unit circuitry 2070, which includes data TLB circuitry 2072 coupled to data cache circuitry 2074 coupled to level 2 (L2) cache circuitry 2076. In one example, the memory access circuitry 2064 may include load unit circuitry, store address unit circuitry, and store data unit circuitry, each of which is coupled to the data TLB circuitry 2072 in the memory unit circuitry 2070. The instruction cache circuitry 2034 is further coupled to the level 2 (L2) cache circuitry 2076 in the memory unit circuitry 2070. In one example, the instruction cache 2034 and the data cache 2074 are combined into a single instruction and data cache (not shown) in L2 cache circuitry 2076, level 3 (L3) cache circuitry (not shown), and/or main memory. The L2 cache circuitry 2076 is coupled to one or more other levels of cache and eventually to a main memory.

The memory unit circuitry 2070 also includes an object lookaside buffer (OLB) 2078, which is coupled to memory access circuitry 2064. The OLB 2078 is one example of OLBs (e.g., 114, 928, 1200A, 1200B, 1200C) previously described herein.

The core 2090 may support one or more instructions sets (e.g., the x86 instruction set architecture (optionally with some extensions that have been added with newer versions); the MIPS instruction set architecture; the ARM instruction set architecture (optionally with optional additional extensions such as NEON)), including the instruction(s) described herein. In one example, the core 2090 includes logic to support a packed data instruction set architecture extension (e.g., AVX1, AVX2), thereby allowing the operations used by many multimedia applications to be performed using packed data.

Example Execution Unit(s) Circuitry

Figure 21:
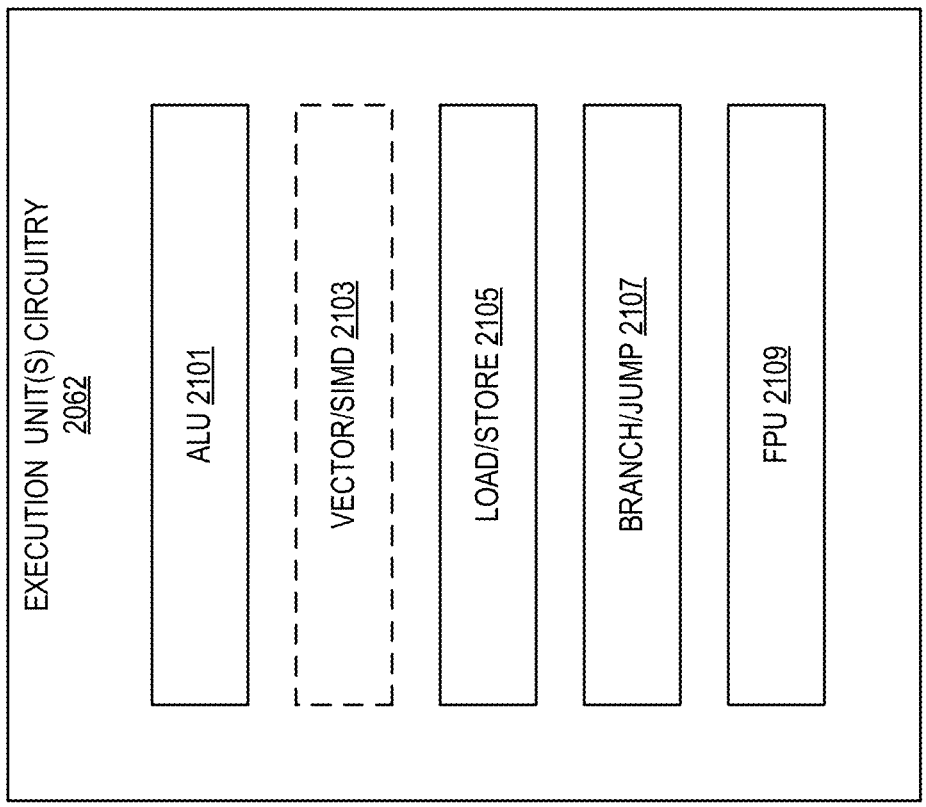
FIG. 21 illustrates examples of execution unit(s) circuitry.

FIG. 21 illustrates examples of execution unit(s) circuitry, such as execution unit(s) circuitry 2062 of FIG. 20B. As illustrated, execution unit(s) circuitry 2062 may include one or more ALU circuits 2101, optional vector/single instruction multiple data (SIMD) circuits 2103, load/store circuits 2105, branch/jump circuits 2107, and/or Floating-point unit (FPU) circuits 2109. ALU circuits 2101 perform integer arithmetic and/or Boolean operations. Vector/SIMD circuits 2103 perform vector/SIMD operations on packed data (such as SIMD/vector registers). Load/store circuits 2105 execute load and store instructions to load data from memory into registers or store from registers to memory. Load/store circuits 2105 may also generate addresses. Branch/jump circuits 2107 cause a branch or jump to a memory address depending on the instruction. FPU circuits 2109 perform floating-point arithmetic. The width of the execution unit(s) circuitry 2062 varies depending upon the example and can range from 16-bit to 1,024-bit, for example. In some examples, two or more smaller execution units are logically combined to form a larger execution unit (e.g., two 128-bit execution units are logically combined to form a 256-bit execution unit).

Figure 22:
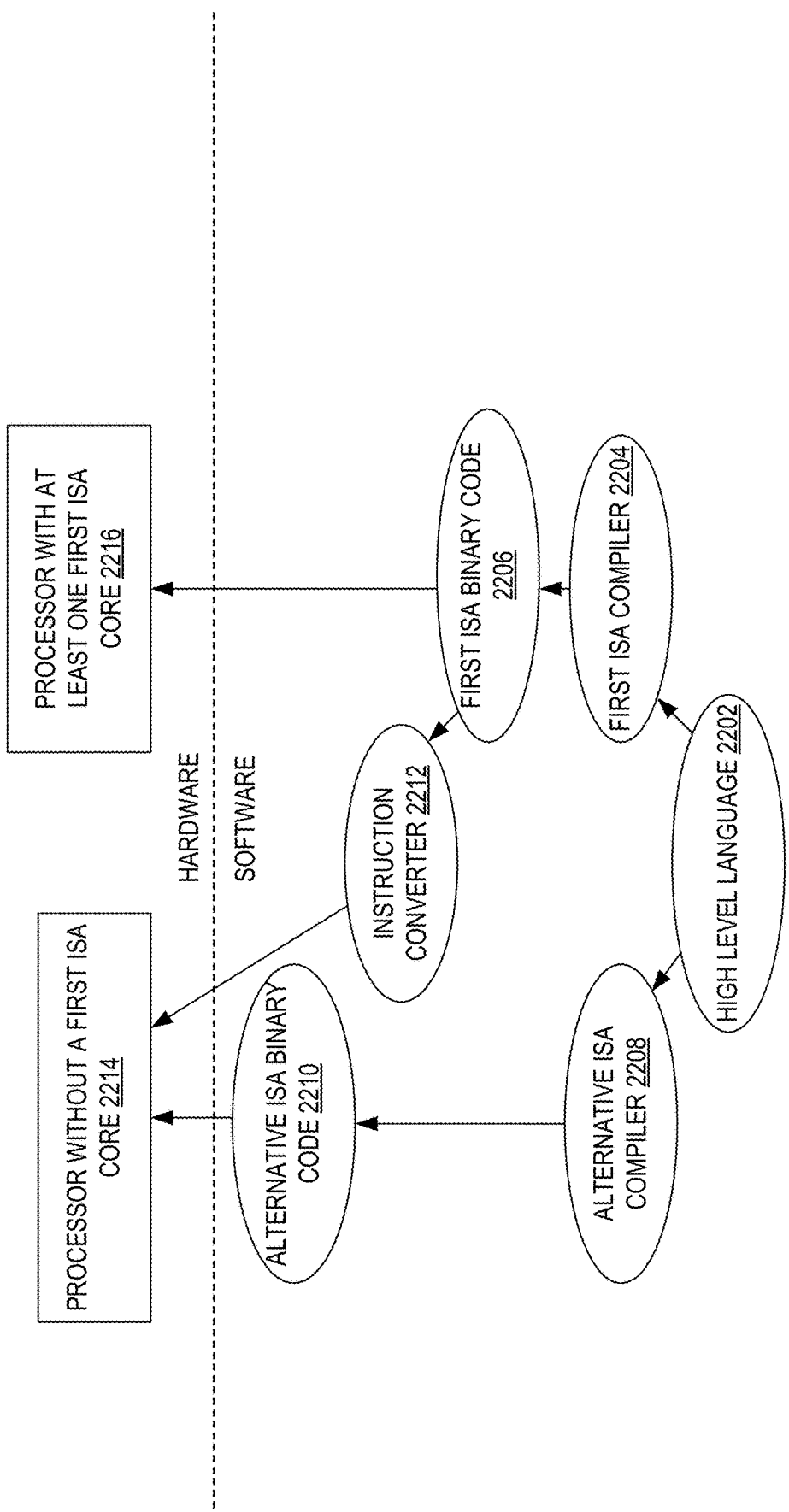
FIG. 22 is a block diagram illustrating the use of a software instruction converter to convert binary instructions in a source instruction set architecture to binary instructions in a target instruction set architecture according to examples.

FIG. 22 is a block diagram illustrating the use of a software instruction converter to convert binary instructions in a source ISA to binary instructions in a target ISA according to examples. In the illustrated example, the instruction converter is a software instruction converter, although alternatively the instruction converter may be implemented in software, firmware, hardware, or various combinations thereof. FIG. 22 shows a program in a high-level language 2202 may be compiled using a first ISA compiler 2204 to generate first ISA binary code 2206 that may be natively executed by a processor with at least one first ISA core 2216. The processor with at least one first ISA core 2216 represents any processor that can perform substantially the same functions as an Intel® processor with at least one first ISA core by compatibly executing or otherwise processing (1) a substantial portion of the first ISA or (2) object code versions of applications or other software targeted to run on an Intel processor with at least one first ISA core, in order to achieve substantially the same result as a processor with at least one first ISA core. The first ISA compiler 2204 represents a compiler that is operable to generate first ISA binary code 2206 (e.g., object code) that can, with or without additional linkage processing, be executed on the processor with at least one first ISA core 2216. Similarly, FIG. 22 shows the program in the high-level language 2202 may be compiled using an alternative ISA compiler 2208 to generate alternative ISA binary code 2210 that may be natively executed by a processor without a first ISA core 2214. The instruction converter 2212 is used to convert the first ISA binary code 2206 into code that may be natively executed by the processor without a first ISA core 2214. This converted code is not necessarily to be the same as the alternative ISA binary code 2210; however, the converted code will accomplish the general operation and be made up of instructions from the alternative ISA. Thus, the instruction converter 2212 represents software, firmware, hardware, or a combination thereof that, through emulation, simulation or any other process, allows a processor or other electronic device that does not have a first ISA processor or core to execute the first ISA binary code 2206.

References to "one example," "an example," "examples," "one embodiment," "an embodiment," "embodiments," etc., indicate that the example or embodiment described may include a particular feature, structure, or characteristic, but every example or embodiment may not necessarily include the particular feature, structure, or characteristic. Moreover, such phrases are not necessarily referring to the same example or embodiment. Further, when a particular feature, structure, or characteristic is described in connection with an example or embodiment, it is submitted that it is within the knowledge of one skilled in the art to affect such feature, structure, or characteristic in connection with other examples or embodiments whether or not explicitly described.

With regard to this specification generally, unless expressly stated to the contrary, use of the phrases 'at least one of' and 'one or more of' refers to any combination of the named elements, conditions, activities, messages, entries, paging structures, or devices. For example, 'at least one of X, Y, and Z' and 'one or more of X, Y, and Z' is intended to mean any of the following: 1) at least one X, but not Y and not Z; 2) at least one Y, but not X and not Z; 3) at least one Z, but not X and not Y; 4) at least one X and at least one Y, but not Z; 5) at least one X and at least one Z, but not Y; 6) at least one Y and at least one Z, but not X; or 7) at least one X, at least one Y, and at least one Z.

Additionally, unless expressly stated to the contrary, the terms 'first', 'second', 'third', etc., are intended to distinguish the particular items (e.g., element, condition, module, activity, operation, claim element, messages, protocols, interfaces, devices etc.) they modify, but are not intended to indicate any type of order, rank, importance, temporal sequence, or hierarchy. For example, 'first X' and 'second X' are intended to designate two separate X elements that are not necessarily limited by any order, rank, importance, temporal sequence, or hierarchy of the two elements, unless specifically stated to the contrary.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of "embodiment" and other exemplarily language does not necessarily refer to the same embodiment or the same example, but may refer to different and distinct embodiments, as well as potentially the same embodiment.

Embodiments of the mechanisms disclosed herein may be implemented in hardware, software, firmware, or a combination of such implementation approaches. Embodiments of this disclosure may be implemented, at least partially, as computer programs or program code executing on programmable systems comprising at least one processor, a storage system (including volatile and non-volatile memory and/or storage elements), at least one input device, and at least one output device.

The architectures presented herein are provided by way of example only and are intended to be non-exclusive and non-limiting. Furthermore, the various parts disclosed are intended to be logical divisions only and need not necessarily represent physically separate hardware and/or software components. Certain computing systems may provide memory elements in a single physical memory device, and in other cases, memory elements may be functionally distributed across many physical devices. In the case of virtual machine managers or hypervisors, all or part of a function may be provided in the form of software or firmware running over a virtualization layer to provide the disclosed logical function.

It is also important to note that the operations in the preceding flowcharts and diagrams illustrating interactions, illustrate only some of the possible activities that may be executed by, or within, computing system 105 using the approaches disclosed herein for providing HLAT with integrity protection and optionally, encryption protection, of the HLAT-protected memory. Some of these operations may be deleted or removed where appropriate, or these operations may be modified or changed considerably without departing from the scope of the present disclosure. In addition, the timing of these operations may be altered considerably. For example, the timing and/or sequence of certain operations may be changed relative to other operations to be performed before, after, or in parallel to the other operations, or based on any suitable combination thereof. The preceding operational flows have been offered for purposes of example and discussion. Substantial flexibility is provided by embodiments described herein in that any suitable arrangements, chronologies, configurations, and timing mechanisms may be provided without departing from the teachings of the present disclosure.

Other Notes and Examples

The following examples pertain to embodiments in accordance with this specification. The system, apparatus, method, and machine readable storage medium embodiments can include one or a combination of the following examples.

The following examples pertain to embodiments in accordance with this specification. Example A1 provides a processor including circuitry communicatively coupled to a buffer, and the circuitry to: receive a memory access request based on a memory address in a first memory allocation of a program, and the first memory allocation is assigned to a first slot of memory apportioned into a plurality of slots, calculate a first index based, at least in part, on whether a first size of the first slot exceeds a slot threshold size, and determine whether the buffer includes a first buffer entry corresponding to the first index and containing a first set of metadata associated with the first memory allocation.

Example A2 comprises the subject matter of Example A1, and the buffer is to store a plurality of tags in a plurality of buffer entries, the plurality of tags to be associated respectively with a plurality of memory allocations of the program.

Example A3 comprises the subject matter of any one of Examples A1-A2, and the circuitry is further to set a bit in the first index to indicate whether the first size of the first slot exceeds the slot threshold size.

Example A4 comprises the subject matter of any one of Examples A1-A3, and based on determining that the first slot is less than or equal to the slot threshold size, the first index is to be calculated by determining a first metadata virtual address of the first set of metadata in the memory.

Example A5 comprises the subject matter of any one of Examples A1-A4, and the circuitry is further to determine that the first slot is less than or equal to the slot threshold size, determine that no buffer entry corresponding to the first index is included in the buffer, and execute one or more instructions stored in the memory to load a set of metadata associated with the first memory allocation from the memory, and create the first buffer entry using the first set of metadata.

Example A6 comprises the subject matter of Example A5, and the circuitry is to execute the one or more instructions further to determine that the first set of metadata includes a first tag and one or more other metadata items, generate one or more duplicated tags based on the first tag, and substitute the one or more other metadata items to be stored in the first buffer entry with the one or more duplicated tags.

Example A7 comprises the subject matter of Example A5, and to create the first buffer entry is to include storing each metadata item in first set of metadata in the first buffer entry.

Example A8 comprises the subject matter of any one of Examples A1-A3, and based on determining that the first slot is greater than the slot threshold size, the first index is to be calculated by determining a first midpoint of the first slot.

Example A9 comprises the subject matter of any one of Examples A1-A3, or A8, and the circuitry is further to determine that the first slot is greater than the slot threshold size, determine that no buffer entry corresponding to the first index is included in the buffer, and execute one or more instructions stored in the memory to load a set of metadata associated with the first memory allocation from the memory, and create the first buffer entry using the first set of metadata, and the first buffer entry contains only metadata items from the first set of metadata.

Example A10 comprises the subject matter of Example A9, and the first set of metadata is to be loaded from a table in the memory, the first set of metadata to be indexed in the table based on a first midpoint of the first slot.

Example A11 comprises the subject matter of any one of Examples A1-A3, or A8, and the circuitry is further to determine that the first slot is greater than the slot threshold size, determine that no buffer entry corresponding to the first index is included in the buffer, determine that the first set of metadata is to be split across two or more buffer entries, and execute one or more instructions stored in the memory to create the two or more buffer entries, and split the first set of metadata across the two or more buffer entries.

Example A12 comprises the subject matter of any one of Examples A1-A3, or A8, and the circuitry is further to determine that the first slot is greater than the slot threshold size, determine that no buffer entry corresponding to the first index is included in the buffer, and execute one or more instructions stored in the memory to determine that the first set of metadata is to be contained in a single buffer entry, and create the single buffer entry containing the first set of metadata.

Example A13 comprises the subject matter of any one of Examples A1-A4, or A8, and the circuitry is further to determine that the buffer includes the first buffer entry corresponding to the first index, and use the first set of metadata in the first buffer entry to perform a tag check or to perform a tag check and a bounds check.

Example A14 comprises the subject matter of any one of Examples A1-A13, or A8, and the circuitry is further to determine the first size of the first slot based on pointer metadata encoded in a pointer containing the memory address.

Example A15 comprises the subject matter of any one of Examples A1-A14, and the first set of metadata includes one of a tag, a tag and a descriptor, or a tag, a descriptor, and bounds.

Example S1 provides a system including a memory apportioned into a plurality of slots, and a processor communicatively coupled to the memory. The processor includes a buffer and circuitry communicatively coupled to the buffer, the circuitry to receive a memory access request based on a memory address in a first memory allocation of a program, and the first memory allocation is assigned to a first slot of the memory, calculate a first index based, at least in part, on whether a first size of the first slot exceeds a slot threshold size, and determine whether the buffer includes a first buffer entry corresponding to the first index and containing a first set of metadata associated with the first memory allocation.

Example S2 comprises the subject matter of Example S1, and the buffer is to store a plurality of tags in a plurality of buffer entries, the plurality of tags to be associated respectively with a plurality of memory allocations of the program.

Example S3 comprises the subject matter of any one of Examples S1-S2, and the circuitry is further to set a bit in the first index to indicate whether the first size of the first slot exceeds the slot threshold size.

Example S4 comprises the subject matter of any one of Examples S1-S3, and based on determining that the first slot is less than or equal to the slot threshold size, the first index is to be calculated by determining a first metadata virtual address of the first set of metadata in the memory.

Example S5 comprises the subject matter of any one of Examples S1-S4, and the circuitry is further to determine that the first slot is less than or equal to the slot threshold size, determine that no buffer entry corresponding to the first index is included in the buffer, and execute one or more instructions stored in the memory to load a set of metadata associated with the first memory allocation from the memory, and create the first buffer entry using the first set of metadata.

Example S6 comprises the subject matter of Example S5, and the circuitry is to execute the one or more instructions further to determine that the first set of metadata includes a first tag and one or more other metadata items, generate one or more duplicated tags based on the first tag, and substitute the one or more other metadata items to be stored in the first buffer entry with the one or more duplicated tags.

Example S7 comprises the subject matter of Example S5, and and to create the first buffer entry is to include storing each metadata item in first set of metadata in the first buffer entry.

Example S8 comprises the subject matter of any one of Examples S1-S3, and based on determining that the first slot is greater than the slot threshold size, the first index is to be calculated by determining a first midpoint of the first slot.

Example S9 comprises the subject matter of any one of Examples S1-S3, or S8, and the circuitry is further to determine that the first slot is greater than the slot threshold size, determine that no buffer entry corresponding to the first index is included in the buffer, and execute one or more instructions stored in the memory to load a set of metadata associated with the first memory allocation from the memory, and create the first buffer entry using the first set of metadata, and the first buffer entry contains only metadata items from the first set of metadata.

Example S10 comprises the subject matter of Example S9, and the first set of metadata is to be loaded from a table in the memory, the first set of metadata to be indexed in the table based on a first midpoint of the first slot.

Example S11 comprises the subject matter of any one of Examples S1-S3, or S8, and the circuitry is further to determine that the first slot is greater than the slot threshold size, determine that no buffer entry corresponding to the first index is included in the buffer, determine that the first set of metadata is to be split across two or more buffer entries, and execute one or more instructions stored in the memory to create the two or more buffer entries, and split the first set of metadata across the two or more buffer entries.

Example S12 comprises the subject matter of any one of Examples S1-S3, or S8, and the circuitry is further to determine that the first slot is greater than the slot threshold size, determine that no buffer entry corresponding to the first index is included in the buffer, and execute one or more instructions stored in the memory to determine that the first set of metadata is to be contained in a single buffer entry, and create the single buffer entry containing the first set of metadata.

Example S13 comprises the subject matter of any one of Examples S1-S4, or S8, and the circuitry is further to determine that the buffer includes the first buffer entry corresponding to the first index, and use the first set of metadata in the first buffer entry to perform a tag check or to perform a tag check and a bounds check.

Example S14 comprises the subject matter of any one of Examples S1-S13, or S8, and the circuitry is further to determine the first size of the first slot based on pointer metadata encoded in a pointer containing the memory address.

Example S15 comprises the subject matter of any one of Examples S1-S14, and the first set of metadata includes one of a tag, a tag and a descriptor, or a tag, a descriptor, and bounds.

Example M1 provides a method comprising: receiving, by a processor, a memory access request based on a memory address in a first memory allocation of a program, and the first memory allocation is assigned to a first slot of memory apportioned into a plurality of slots. The method further comprises calculating a first index based, at least in part, on whether a first size of the first slot exceeds a slot threshold size, and determining whether a buffer includes a first buffer entry corresponding to the first index and containing a first set of metadata associated with the first memory allocation.

Example M2 comprises the subject matter of Example M1, and the buffer stores a plurality of tags in a plurality of buffer entries, the plurality of tags associated respectively with a plurality of memory allocations of the program.

Example M3 comprises the subject matter of any one of Examples M1-M2, and further comprises setting a bit in the first index to indicate whether the first size of the first slot exceeds the slot threshold size.

Example M4 comprises the subject matter of any one of Examples M1-M3, and based on determining that the first slot is less than or equal to the slot threshold size, the first index is calculated by determining a first metadata virtual address of the first set of metadata in the memory.

Example M5 comprises the subject matter of any one of Examples M1-M4, and further comprises determining that the first slot is less than or equal to the slot threshold size, determining that no buffer entry corresponding to the first index is included in the buffer, loading a set of metadata associated with the first memory allocation from the memory, and creating the first buffer entry using the first set of metadata.

Example M6 comprises the subject matter of Example M5, and further comprises determining that the first set of metadata includes a first tag and one or more other metadata items, generating one or more duplicated tags based on the first tag, and substituting the one or more other metadata items to be stored in the first buffer entry with the one or more duplicated tags.

Example M7 comprises the subject matter of Example M5, and the creating the first buffer entry includes storing each metadata item in first set of metadata in the first buffer entry.

Example M8 comprises the subject matter of any one of Examples M1-M3, and based on determining that the first slot is greater than the slot threshold size, the first index is calculated by determining a first midpoint of the first slot.

Example M9 comprises the subject matter of any one of Examples M1-M3, or M8, and further comprises determining that the first slot is greater than the slot threshold size, determining that no buffer entry corresponding to the first index is included in the buffer, loading a set of metadata associated with the first memory allocation from the memory, and creating the first buffer entry using the first set of metadata, and the first buffer entry contains only metadata items from the first set of metadata.

Example M10 comprises the subject matter of Example M9, and the first set of metadata is loaded from a table in the memory, and the first set of metadata is indexed in the table based on a first midpoint of the first slot.

Example M11 comprises the subject matter of any one of Examples M1-M3, or M8, and further comprises executing one or more instructions stored in the memory to determining that the first slot is greater than the slot threshold size, determining that no buffer entry corresponding to the first index is included in the buffer, determining that the first set of metadata is to be split across two or more buffer entries, creating the two or more buffer entries, and splitting the first set of metadata across the two or more buffer entries.

Example M12 comprises the subject matter of any one of Examples M1-M3, or M8, and further comprises determining that the first slot is greater than the slot threshold size, determining that no buffer entry corresponding to the first index is included in the buffer, determining that the first set of metadata is to be contained in a single buffer entry, and creating the single buffer entry containing the first set of metadata.

Example M13 comprises the subject matter of any one of Examples M1-M4, or M8, and further comprises determining that the buffer includes the first buffer entry corresponding to the first index, and using the first set of metadata in the first buffer entry to perform a tag check or to perform a tag check and a bounds check.

Example M14 comprises the subject matter of any one of Examples M1-M13, or M8, and further comprises determining the first size of the first slot based on pointer metadata encoded in a pointer containing the memory address.

Example M15 comprises the subject matter of any one of Examples M1-M14, and the first set of metadata includes one of a tag, a tag and a descriptor, or a tag, a descriptor, and bounds.

Example X1 provides an apparatus comprising means for performing the method of any one of Examples M1-M15.

Example X2 comprises the subject matter of Example X1 can optionally include that the means for performing the method comprises at least one processor and at least one memory element.

Example X3 comprises the subject matter of Example X2 can optionally include that the at least one memory element comprises machine readable instructions that when executed, cause the apparatus to perform the method of any one of the preceding Examples.

Example X4 comprises the subject matter of any one of Examples X1-X3 can optionally include that the apparatus is one of a computing system, a processing element, or a system-on-a-chip.

Example X5 provides at least one machine readable storage medium comprising instructions, where the instructions when executed realize an apparatus, realize a system, or implement a method as in any one of the preceding Examples.

The invention claimed is:

1. A processor, comprising:
    circuitry communicatively coupled to a buffer, the circuitry to:
        receive a first memory access request based on a first memory address in a first memory allocation of a program, wherein the first memory allocation is assigned to a first slot of memory apportioned into a plurality of slots;
        calculate a first index based on the first slot being less than or equal to a slot threshold size;
        store a first set of metadata associated with the first memory allocation in a first buffer entry of the buffer based, at least in part, on the first index, wherein the first buffer entry is to include at least a second set of metadata, the second set of metadata associated with a second memory allocation assigned to a second slot that is less than or equal to the slot threshold size; and
        perform a tag check based on at least a portion of the first set of metadata in the first buffer entry and a first tag encoded in a pointer to the first memory address.

2. The processor of claim 1, wherein the buffer is to store a plurality of tags in a plurality of buffer entries, the plurality of tags to be associated respectively with a plurality of memory allocations of the program.

3. The processor of claim 1, wherein the circuitry is further to:
set a bit in the first index to indicate whether the first slot exceeds the slot threshold size.

4. The processor of claim 1, wherein the circuitry is further to:
execute one or more instructions stored in the memory to:
create the first buffer entry using the first set of metadata and the first index.

5. The processor of claim 4, wherein the circuitry is to execute the one or more instructions further to:
determine that the first set of metadata includes the first tag and one or more other metadata items;
generate one or more duplicated tags based on the first tag; and
substitute the one or more other metadata items to be stored in the first buffer entry with the one or more duplicated tags.

6. The processor of claim 1, wherein the circuitry is further to:
receive a third memory access request based on a third memory address in a third memory allocation of the program, wherein the third memory allocation is assigned to a third slot of the plurality of slots, wherein based on the third slot being greater than the slot threshold size, a third index is to be calculated by determining a midpoint of the third slot.

7. The processor of claim 6, wherein the circuitry is further to:
determine that the first third slot is greater than the slot threshold size;
determine that no buffer entry corresponding to the first third index is included in the buffer; and
execute one or more instructions stored in the memory to:
load a third set of metadata associated with the first third memory allocation from the memory; and
create a third buffer entry using the third set of metadata and the third index, wherein the third buffer entry contains only metadata items from the third set of metadata.

8. The processor of claim 7, wherein the third set of metadata is to be loaded from a table in the memory.

9. The processor of claim 6, wherein the circuitry is further to:
determine that a third set of metadata associated with the third memory allocation is to be split across two or more buffer entries; and
execute one or more instructions stored in the memory to:
create the two or more buffer entries using the third set of metadata and at least the third index; and
split the first set of metadata across the two or more buffer entries.

10. The processor of claim 6, wherein the circuitry is further to:
determine that the third slot is greater than the slot threshold size;
determine that no buffer entry corresponding to the first third index is included in the buffer, and
execute one or more instructions stored in the memory to:
determine that a third set of metadata is to be contained in a single buffer entry; and
create the single buffer entry containing the third set of metadata.

11. The processor of claim 1, wherein the circuitry is further to:
determine that the buffer includes the first buffer entry corresponding to the first index; and
use the first set of metadata in the first buffer entry to perform the tag check and a bounds check.

12. The processor of claim 1, wherein the circuitry is further to:
determine a first size of the first slot based on pointer metadata encoded in the pointer to the first memory address.

13. The processor of claim 1, wherein the first set of metadata includes one of:
a tag;
a tag and a descriptor, or
a tag, a descriptor, and bounds.

14. A system, comprising:
a memory apportioned into a plurality of slots; and
a processor communicatively coupled to the memory, the processor including:
a buffer; and
circuitry communicatively coupled to the buffer, the circuitry to:
receive a memory access request based on a memory address in a first memory allocation of a program, wherein the first memory allocation is assigned to a first slot of the memory;
calculate a first index based on the first slot being less than or equal to a slot threshold size;
store a first set of metadata associated with the first memory allocation in a first buffer entry of the buffer based, at least in part, on the first index, wherein the first buffer entry is to include at least a second set of metadata, the second set of metadata associated with a second memory allocation assigned to a second slot that is less than or equal to the slot threshold size; and
perform a tag check based on at least a portion of the first set of metadata in the first buffer entry and a tag encoded in a pointer to the memory address.

15. The system of claim 14, wherein based on determining that the first slot is less than or equal to the slot threshold size, the first index is to be calculated by determining a first metadata virtual address of the first set of metadata in the memory.

16. A method, comprising:
receiving, by a processor, a memory access request based on a memory address in a first memory allocation of a program, wherein the first memory allocation is assigned to a first slot of memory apportioned into a plurality of slots;
calculating a first index based on the first slot being greater than a slot threshold size;
storing a first set of metadata associated with the first memory allocation consecutively in a buffer entry of a buffer based, at least in part, on the first index; and
performing a tag check based on at least a portion of the first set of metadata in the buffer entry and a tag encoded in a pointer to the memory address.

17. The method of claim 16, wherein based on determining that the first slot is greater than the slot threshold size, the first index is calculated by determining a first midpoint of the first slot.

18. One or more machine readable media including instructions stored thereon, wherein the instructions, when executed by a processor, cause the processor to perform operations comprising:
receiving a memory access request based on a memory address in a first memory allocation of a program, wherein the first memory allocation is assigned to a first slot of memory apportioned into a plurality of slots;

calculating a first index based on the first slot being greater than a slot threshold size;

storing a first set of metadata associated with the first memory allocation consecutively in a buffer entry of a buffer based, at least in part, on the first index; and performing a tag check based on at least a portion of the first set of metadata in the buffer entry and a tag encoded in a pointer to the memory address.

19. The one or more machine readable media of claim 18, wherein the first set of metadata is to be loaded from two or more lines in a table in the memory, the first set of metadata to be indexed in the table based on a first midpoint of the first slot.

20. The one or more machine readable media of claim 18, wherein based on the first slot being greater than the slot threshold size, the first index is calculated by determining a midpoint of the first slot.

21. The processor of claim 1, wherein based on the first slot being less than or equal to the slot threshold size, the first index is to be calculated by determining a first metadata virtual address of the first set of metadata in the memory, wherein the first set of metadata is to be stored in the first buffer entry based, in part, on an offset.

* * * * *